United States Patent
Leonard

(10) Patent No.: US 11,204,076 B2
(45) Date of Patent: Dec. 21, 2021

(54) INERTIA-ACTUATED VALVE ASSEMBLIES AS WELL AS GAS SPRING AND GAS DAMPER ASSEMBLIES, SUSPENSION SYSTEMS AND METHODS INCLUDING SAME

(71) Applicant: Firestone Industrial Products Company, LLC, Nashville, TN (US)

(72) Inventor: Joshua R. Leonard, Noblesville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 16/860,148

(22) Filed: Apr. 28, 2020

(65) Prior Publication Data

US 2020/0256418 A1    Aug. 13, 2020

Related U.S. Application Data

(62) Division of application No. 15/851,737, filed on Dec. 21, 2017, now Pat. No. 10,677,308.

(Continued)

(51) Int. Cl.
*F16K 24/04*      (2006.01)
*F16F 9/36*        (2006.01)
(Continued)

(52) U.S. Cl.
CPC .............. *F16F 9/365* (2013.01); *B60G 11/27* (2013.01); *B60G 17/0485* (2013.01);
(Continued)

(58) Field of Classification Search
CPC ........ F16F 9/365; F16F 9/0454; F16F 9/0418; F16F 9/504; F16F 9/057; F16F 9/5126;
(Continued)

(56) References Cited

U.S. PATENT DOCUMENTS 3,212,769 A   10/1965   Kanichiro
4,325,541 A    4/1982   Korosladanyi
(Continued)

FOREIGN PATENT DOCUMENTS

ER         0044435        1/1982
JP         H07238969      9/1995
(Continued)

OTHER PUBLICATIONS

European Search Report for corresponding European Application No. 17211252.6 dated May 30, 2018.

*Primary Examiner* — Xuan Lan Nguyen
(74) *Attorney, Agent, or Firm* — Thomas R. Kingsbury; Matthew P. Dugan

(57) ABSTRACT

An inertia-actuated valve assembly includes a valve housing, a valve body and a biasing element. The valve housing includes a groove that has an open end fluidically accessible from along one side thereof. The valve housing includes a flow channel extending therethrough in fluid communication with the groove from along an opposing side of the valve housing. The valve body is positioned within the groove of the valve housing such that the valve body and the valve housing are axially co-extensive along at least a portion thereof. The biasing element operatively engages the valve body and generates a biasing force urging the valve body in a first axial direction. The biasing force is greater than a predetermined dynamic gas pressure threshold value multiplied by a pressure area and is less than or approximately equal to a valve body mass multiplied by 2.5 times the nominal acceleration due to gravity.

20 Claims, 35 Drawing Sheets

Related U.S. Application Data

(60) Provisional application No. 62/441,207, filed on Dec. 31, 2016.

(51) Int. Cl.
| | |
|---|---|
| *F16F 9/504* | (2006.01) |
| *F16F 9/05* | (2006.01) |
| *B60G 11/27* | (2006.01) |
| *B60G 17/048* | (2006.01) |
| *F16F 9/04* | (2006.01) |
| *F16F 9/512* | (2006.01) |

(52) U.S. Cl.
CPC .......... *F16F 9/0418* (2013.01); *F16F 9/0454* (2013.01); *F16F 9/057* (2013.01); *F16F 9/504* (2013.01); *B60G 2204/126* (2013.01); *B60G 2206/424* (2013.01); *B60G 2500/20* (2013.01); *F16F 9/049* (2013.01); *F16F 9/0472* (2013.01); *F16F 9/5126* (2013.01)

(58) Field of Classification Search
CPC ......... F16F 9/0472; F16F 9/049; B60G 11/27; B60G 17/0485; F16K 24/044
USPC ............................................ 267/64.16–64.27
See application file for complete search history.

(56) References Cited

U.S. PATENT DOCUMENTS

| | | | |
|---|---|---|---|
| 6,161,821 | A | 12/2000 | Leno |
| 6,422,543 | B1 | 6/2002 | Fejerdy |
| 6,695,294 | B2 | 2/2004 | Miller |
| 8,641,051 | B2 | 2/2014 | Pavuk |
| 9,254,727 | B2 | 2/2016 | Moulik |
| 9,695,901 | B2 | 7/2017 | Leonard |
| 9,738,131 | B2 | 8/2017 | Keeler |
| 9,809,075 | B2 | 11/2017 | Bounds |
| 2006/0208404 | A1 | 9/2006 | Cmich |
| 2006/0226586 | A1 | 10/2006 | Levy |
| 2011/0115140 | A1 | 5/2011 | Moulik |
| 2011/0140324 | A1 | 6/2011 | Naber |
| 2012/0074626 | A1 | 3/2012 | Lee |
| 2014/0246817 | A1 | 9/2014 | Bounds |
| 2014/0345450 | A1 | 11/2014 | Leonard |
| 2015/0008627 | A1 | 1/2015 | Leonard |
| 2015/0217617 | A1 | 8/2015 | Leonard |
| 2016/0101663 | A1 | 4/2016 | Leonard |
| 2016/0121682 | A1 | 5/2016 | Leonard |

FOREIGN PATENT DOCUMENTS

| | | |
|---|---|---|
| WO | WO 2013/181241 | 12/2013 |
| WO | WO 2014/036541 | 3/2014 |
| WO | WO 2015/065989 | 5/2015 |

INERTIA-ACTUATED VALVE ASSEMBLIES AS WELL AS GAS SPRING AND GAS DAMPER ASSEMBLIES, SUSPENSION SYSTEMS AND METHODS INCLUDING SAME

This application is a divisional of U.S. patent application Ser. No. 15/851,737, filed on Dec. 21, 2017, which claims the benefit of U.S. Provisional Application No. 62/441,207, filed on Dec. 31, 2016, the subject matter of which is hereby incorporated herein by reference in its entirety.

BACKGROUND

The subject matter of the present disclosure broadly relates to the art of gas spring devices and, more particularly, to inertia-actuated valve assemblies dimensioned for use within gas spring assemblies that include a spring chamber and one or more additional chambers. In some cases, inertia-actuated valve assemblies can be included within gas spring and gas damper assemblies that include a spring chamber as well as a damping chamber with an optional elongated passage in fluid communication between the spring chamber and the damping chamber. Suspension systems including one or more of such assemblies as well as methods of assembly are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and gas damper assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles and/or components thereof.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring elements as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In many applications involving vehicle suspension systems, it may be desirable to utilize spring elements that have as low of a spring rate as is practical, as the use of lower spring rate elements can provide improved ride quality and comfort compared to spring elements having higher spring rates. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of road inputs into the sprung mass and will, thus, provide a more comfortable ride.

Such suspension systems also commonly include one or more dampers or damping components that are operative to dissipate energy associated with undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. One example of such damping components are conventional shock absorbers that are commonly used in vehicle suspension systems.

In other arrangements, however, the dampers or damping components can be of a type and kind that utilizes gas rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Pat. No. 7,213,799. Generally, there is some resistance to the movement of pressurized gas through these passages or ports, and this resistance acts to dissipate energy associated with the gas spring portion and thereby provide some measure of damping.

One factor that may be limiting the broader adoption and use of gas spring and gas damper assemblies may relate to the challenge of balancing desired performance levels with size and/or space limitations associated with the particular application and/or use for which the gas spring and gas damper assemblies are intended. As one example, motorized vehicles commonly include significant packaging and/or space limitations that can reduce the area that is available adjacent the gas spring and gas damper assembly. As such, in some cases, a reduced volume of pressurized gas may be used. In other cases, the desired volume of pressurized gas may be provided in a remote location relative to the gas spring and gas damper assembly. In either case, some decrease in damping performance of conventional constructions may result.

Accordingly, it is desired to develop gas spring and gas damper assemblies as well as a suspension system including one or more of such assemblies that overcome the foregoing and/or other difficulties associated with known constructions, and/or which may otherwise advance the art of gas spring and gas damper assemblies as well as components thereof and suspension systems and methods including the same.

BRIEF DESCRIPTION

One example of an inertia-actuated valve assembly in accordance with the subject matter of the present disclosure can be dimensioned for securement along an associated end member of an associated gas spring assembly. The inertia-actuated valve assembly can include a valve housing, a valve body and a biasing element. The valve housing can be dimensioned for securement along the associated end member and in fixed relation thereto. The valve housing can have a longitudinal axis and can include a housing wall portion extending peripherally about the longitudinal axis with a first housing side and a second housing side facing opposite the first housing side. The valve housing can include a groove extending into housing wall portion from along the second side such that the groove has an open end fluidically accessible from along the second side. The valve housing can include at least one flow channel extending through the housing wall portion and in fluid communication with the groove from along the first side of the valve housing. The valve body can extend peripherally about the axis and can be positioned within the groove of the valve housing such that the valve body and the valve housing are axially co-extensive along at least a portion thereof. The valve body can have a valve body mass and a pressure area. The biasing element can operatively engage at least the valve body and can generate a biasing force operative to urge the valve body in a first axial direction toward the first side of the valve housing. The biasing force can having a magnitude that is greater than a predetermined dynamic gas pressure threshold value multiplied by the pressure area. The predetermined dynamic gas pressure value can correspond to an internal pressure experienced by the associated gas spring assembly during a predetermined condition of use. The biasing force can also have a magnitude that is less than or approximately equal to the valve body mass multiplied by two and one-half times the nominal acceleration due to gravity.

In some cases, an inertia-actuated valve assembly in accordance with the foregoing paragraph can include the spiral configuration of the elongated damping passage disposed in a plane oriented transverse to the longitudinal axis.

One example of a gas spring assembly in accordance with the subject matter of the present disclosure can include a flexible spring member having a longitudinal axis. The flexible spring member can include a flexible wall extending longitudinally between first and second ends and peripherally about the axis to at least partially define a spring chamber. A first end member can be operatively secured to the first end of the flexible spring member such that a substantially fluid-tight seal is formed therebetween. A second end member can be disposed in spaced relation to the first end member and can be operatively secured to the second end of the flexible spring member such that a substantially fluid-tight seal is formed therebetween. The second end member can at least partially define an end member chamber. An inertia-actuated valve assembly according to either of the two foregoing paragraphs can be operatively disposed along the second end member in fluid communication between the spring chamber and the end member chamber.

In some cases, a gas spring assembly according to the foregoing paragraph can include a gas damper.

One example of a suspension system in accordance with the subject matter of the present disclosure can include a pressurized gas system that includes a pressurized gas source and a control device. The suspension system can also include at least one gas spring and gas damper assembly according to the two foregoing paragraphs. The at least one gas spring and gas damper assembly can be disposed in fluid communication with the pressurized gas source through the control device such that pressurized gas can be selectively transferred into and out of the spring chamber.

One example of a method of manufacturing a gas spring assembly in accordance with the subject matter of the present disclosure can include providing a flexible spring member having a longitudinal axis. The flexible spring member can include a flexible wall extending longitudinally between first and second ends and peripherally about the axis to at least partially define a spring chamber. The method can also include providing a first end member and securing the first end member across the first end of the flexible spring member such that a substantially fluid-tight seal is formed therebetween. The method can further include providing a second end member and securing the second end member across the second end of the flexible spring member such that a substantially fluid-tight seal is formed therebetween. The second end member can include an end member chamber. The method can also include providing an inertia-actuated valve assembly and operatively connecting the valve assembly along the second end member in fluid communication between the spring chamber and the end member chamber. The inertia-actuated valve assembly can include a valve housing, a valve body and a biasing element.

DETAILED DESCRIPTION

Turning now to the drawings, it is to be understood that the showings are for purposes of illustrating examples of the subject matter of the present disclosure and that the drawings are not intended to be limiting. Additionally, it will be appreciated that the drawings are not to scale and that portions of certain features and/or elements may be exaggerated for purposes of clarity and/or ease of understanding.

Figure 1:
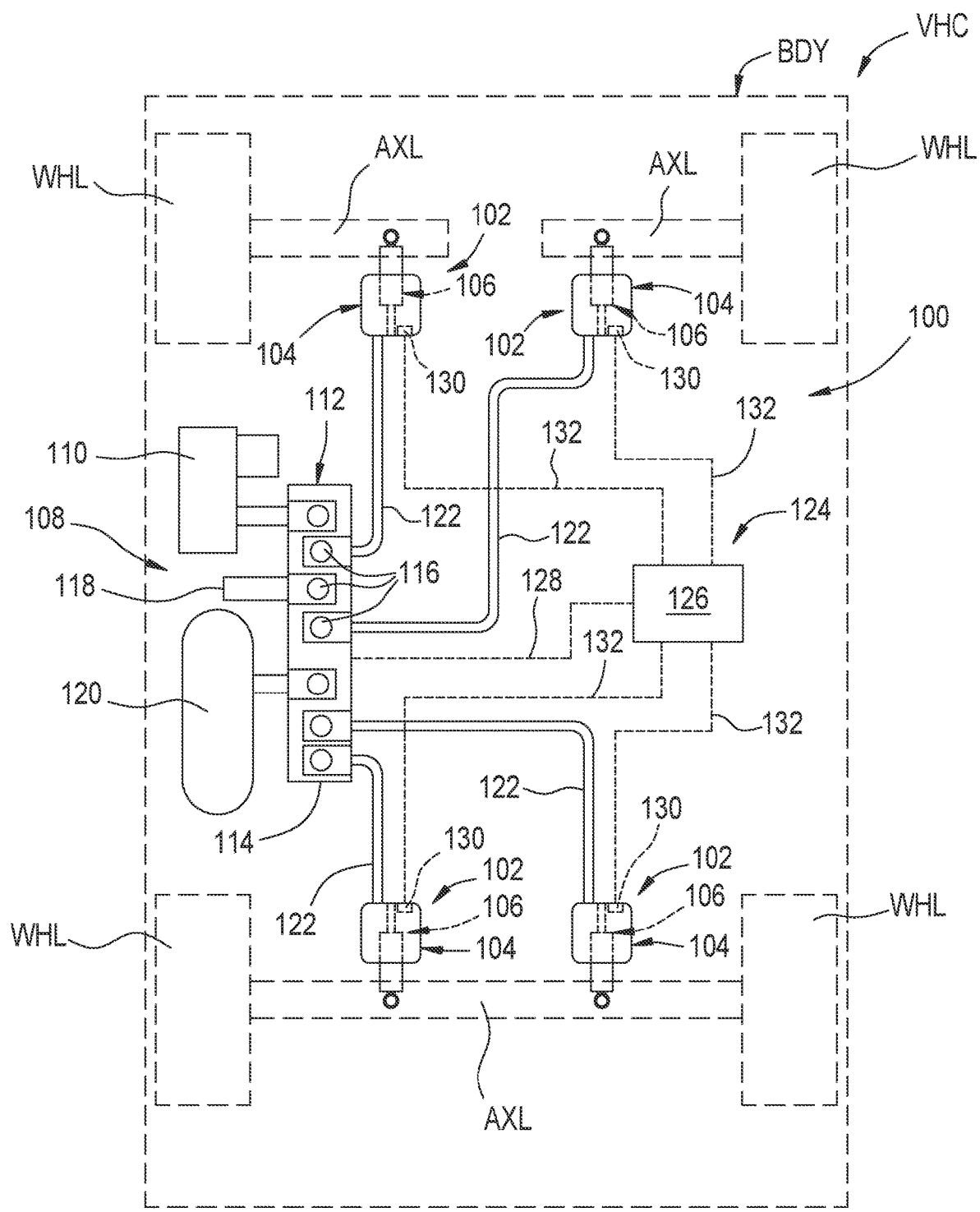
FIG. 1 is a schematic representation of one example of a suspension system of an associated vehicle that includes one or more gas spring and gas damper assemblies in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

For example, in the arrangement shown, suspension system 100 can include a plurality of gas spring and gas damper assemblies 102 that are operatively connected between the sprung and unsprung masses of the vehicle. Depending on desired performance characteristics and/or other factors, the suspension system may, in some cases, also include damping members (not shown) of a typical construction that are provided separately from assemblies 102 and secured between the sprung and unsprung masses in a conventional manner. In a preferred arrangement, however, gas spring and gas damper assemblies 102 will be sized, configured and operative to provide the desired performance characteristics for the suspension system without the use of additional damping members (e.g., conventional struts or shock absorbers) that are separately provided.

In the arrangement shown in FIG. 1, suspension system 100 includes four gas spring and gas damper assemblies 102, one of which is disposed toward each corner of the associated vehicle adjacent a corresponding wheel WHL. However, it will be appreciated that any other suitable number of gas spring and gas damper assemblies could alternately be used in any other configuration and/or arrangement. As shown in FIG. 1, gas spring and gas damper assemblies 102 are supported between axles AXL and body BDY of associated vehicle VHC, and include a gas spring 104 and a gas damper 106. It will be recognized that gas springs 104 are shown and described in connection with FIG. 1 as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring and gas damper assemblies for selectively supplying pressurized gas (e.g., air) thereto and selectively transferring pressurized gas therefrom. In the exemplary embodiment shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas.

Valve assembly 112 is in communication with gas springs 104 and/or gas dampers 106 of assemblies 102 through suitable gas transfer lines 122. As such, pressurized gas can be selectively transferred into and/or out of the gas springs and/or the gas dampers through valve assembly 112 by selectively operating valves 116, such as to alter or maintain vehicle height at one or more corners of the vehicle, for example.

Suspension system 100 can also include a control system 124 that is capable of communication with any one or more systems and/or components (not shown) of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

Control system 124 can also, optionally, include one or more height (or distance) sensing devices 130, such as, for example, may be operatively associated with the gas spring assemblies and capable of outputting or otherwise generating data, signals and/or other communications having a relation to a height of the gas spring assemblies or a distance between other components of the vehicle. Height sensing devices 130 can be in communication with ECU 126, which can receive the height or distance signals therefrom. The height sensing devices can be in communication with ECU 126 in any suitable manner, such as through conductors or leads 132, for example. Additionally, it will be appreciated that the height sensing devices can be of any suitable type, kind and/or construction, such as may operate using sound, pressure, light and/or electromagnetic waves, for example.

Figure 6:
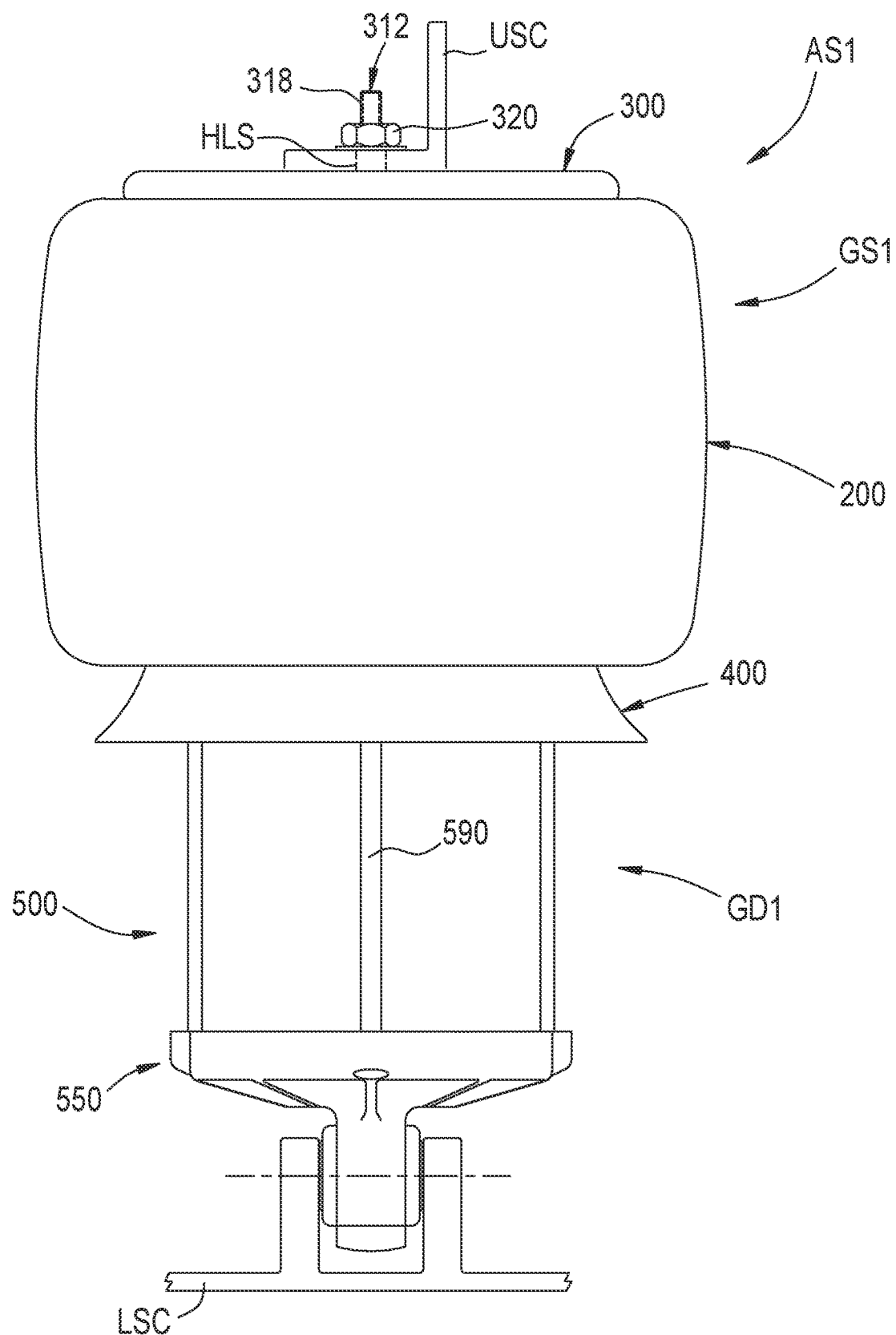
FIG. 6 is a side elevation view of the exemplary gas spring and gas damper assembly in FIGS. 2-5.
Figure 7:
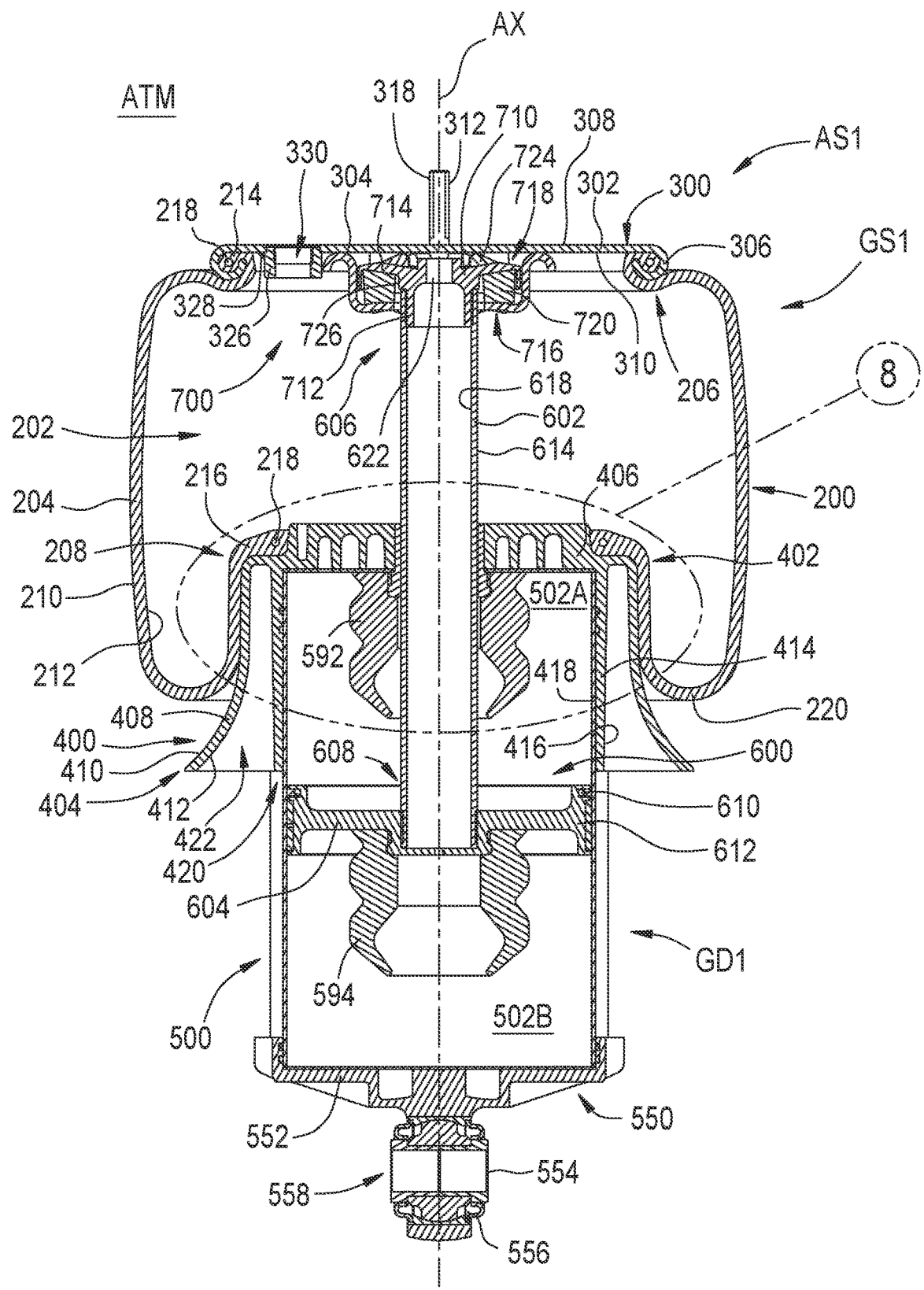
FIG. 7 is a cross-sectional side view of the exemplary gas spring and gas damper assembly in FIGS. 2-6 taken from along line 7-7 in FIG. 4.
Figure 8:
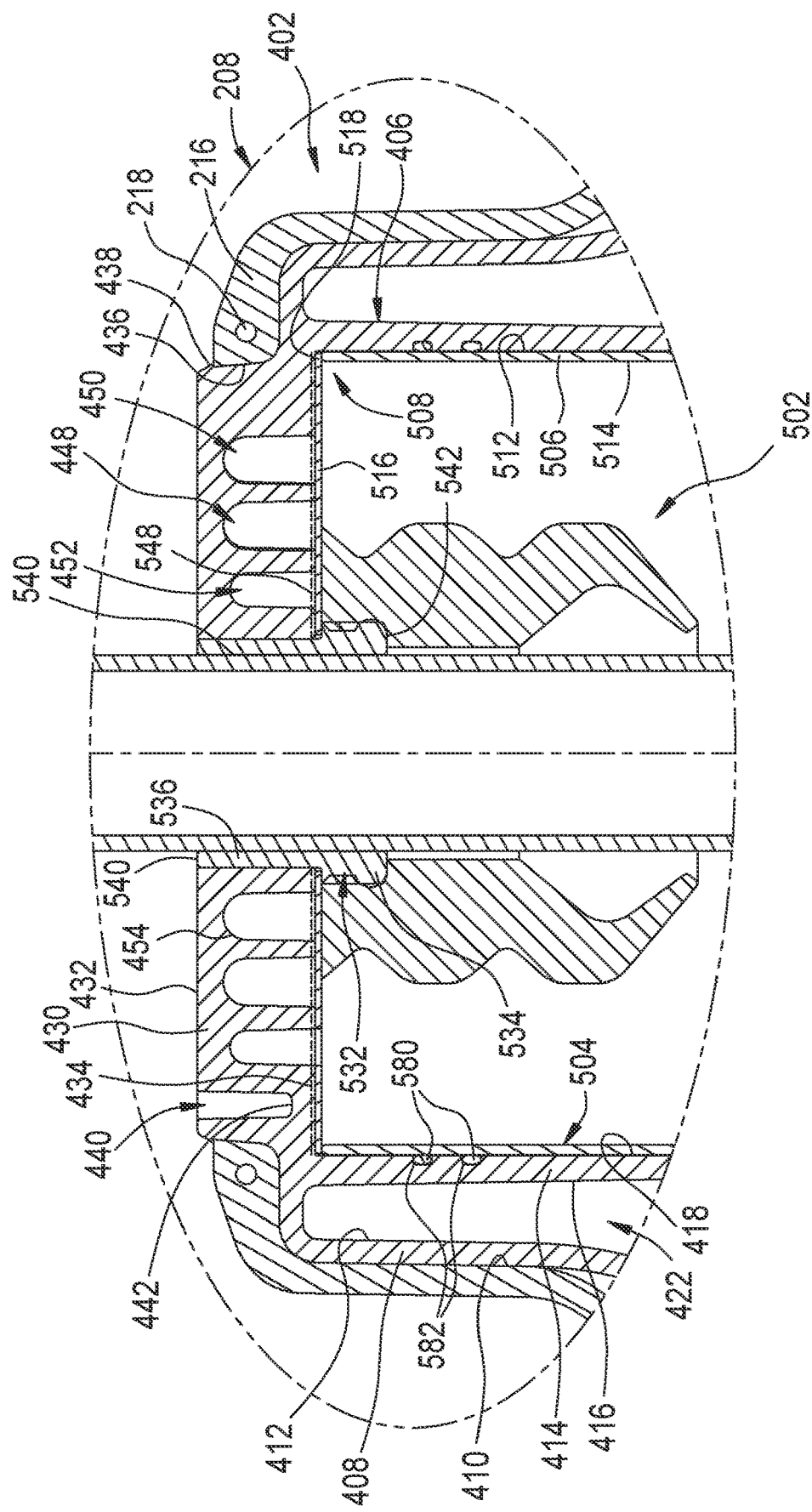
FIG. 8 is a greatly enlarged view of the portion of the exemplary gas spring and gas damper assembly in FIGS. 2-7 that is identified as Detail 8 in FIG. 7.
Figure 9:
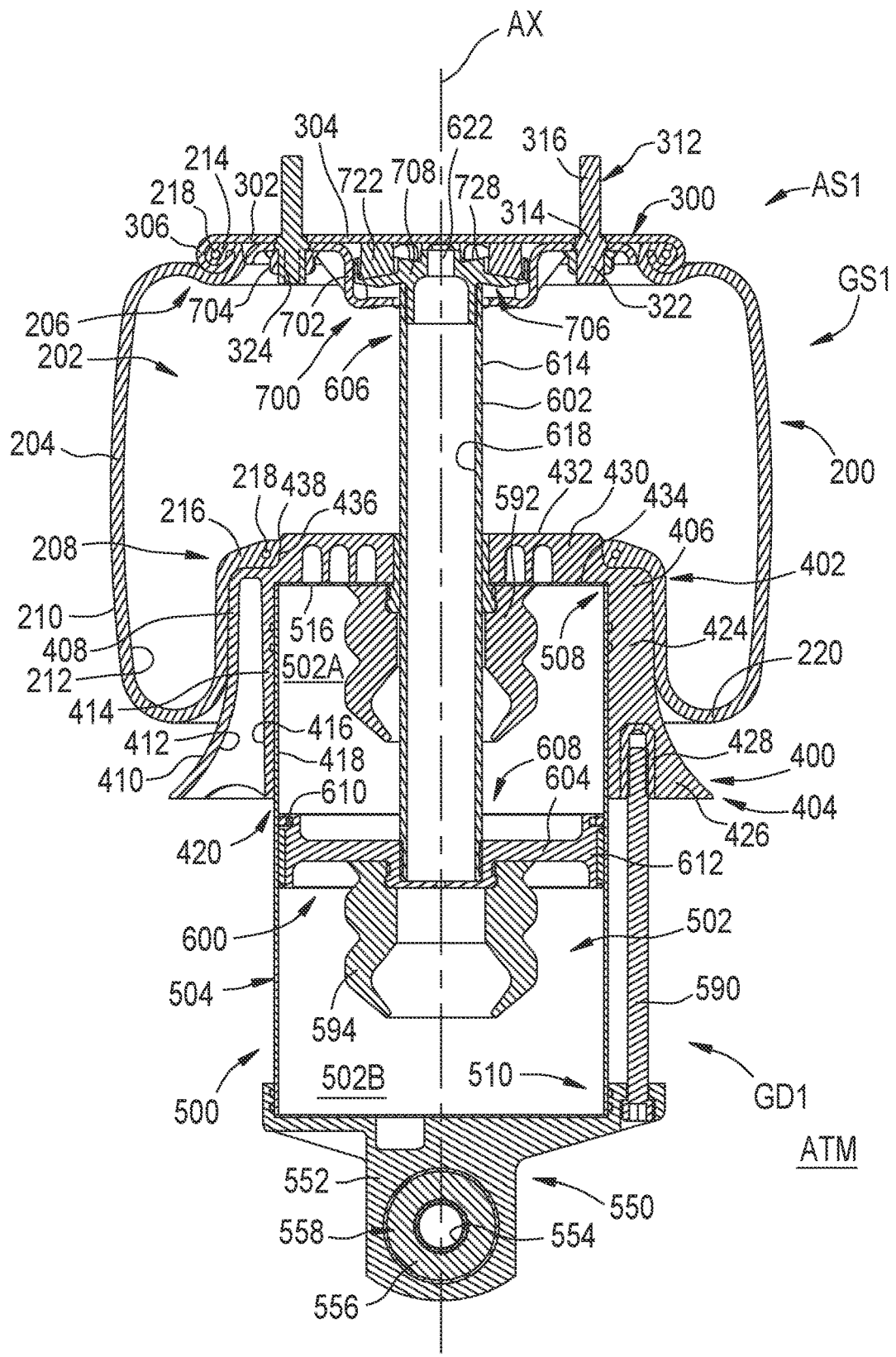
FIG. 9 is a cross-sectional side view of the exemplary gas spring and gas damper assembly in FIGS. 2-8 taken from along line 9-9 in FIG. 4.
Figure 10:
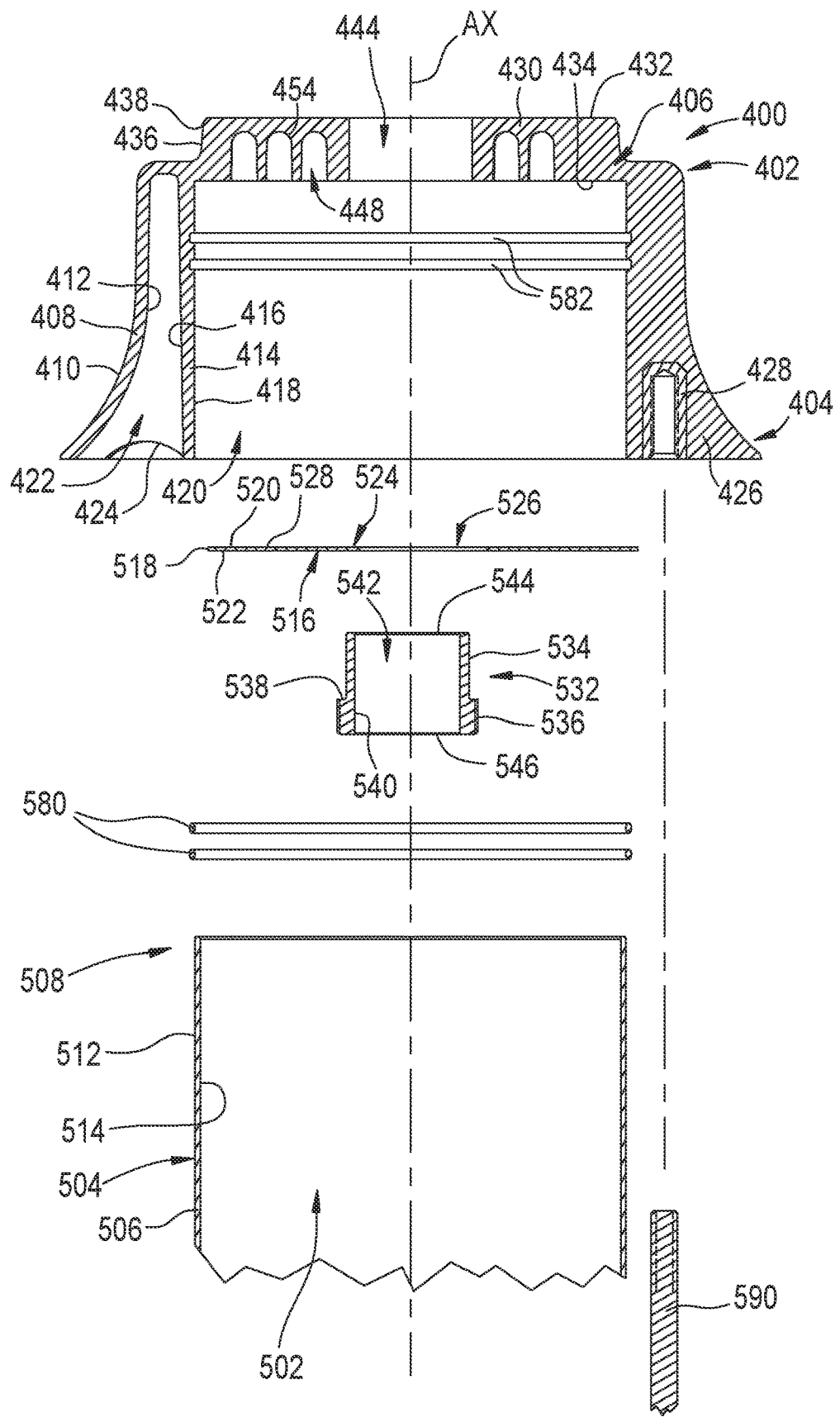
FIG. 10 is an exploded view, in partial cross section, of one portion of the gas spring and gas damper assembly in FIGS. 2-9.
Figure 11:
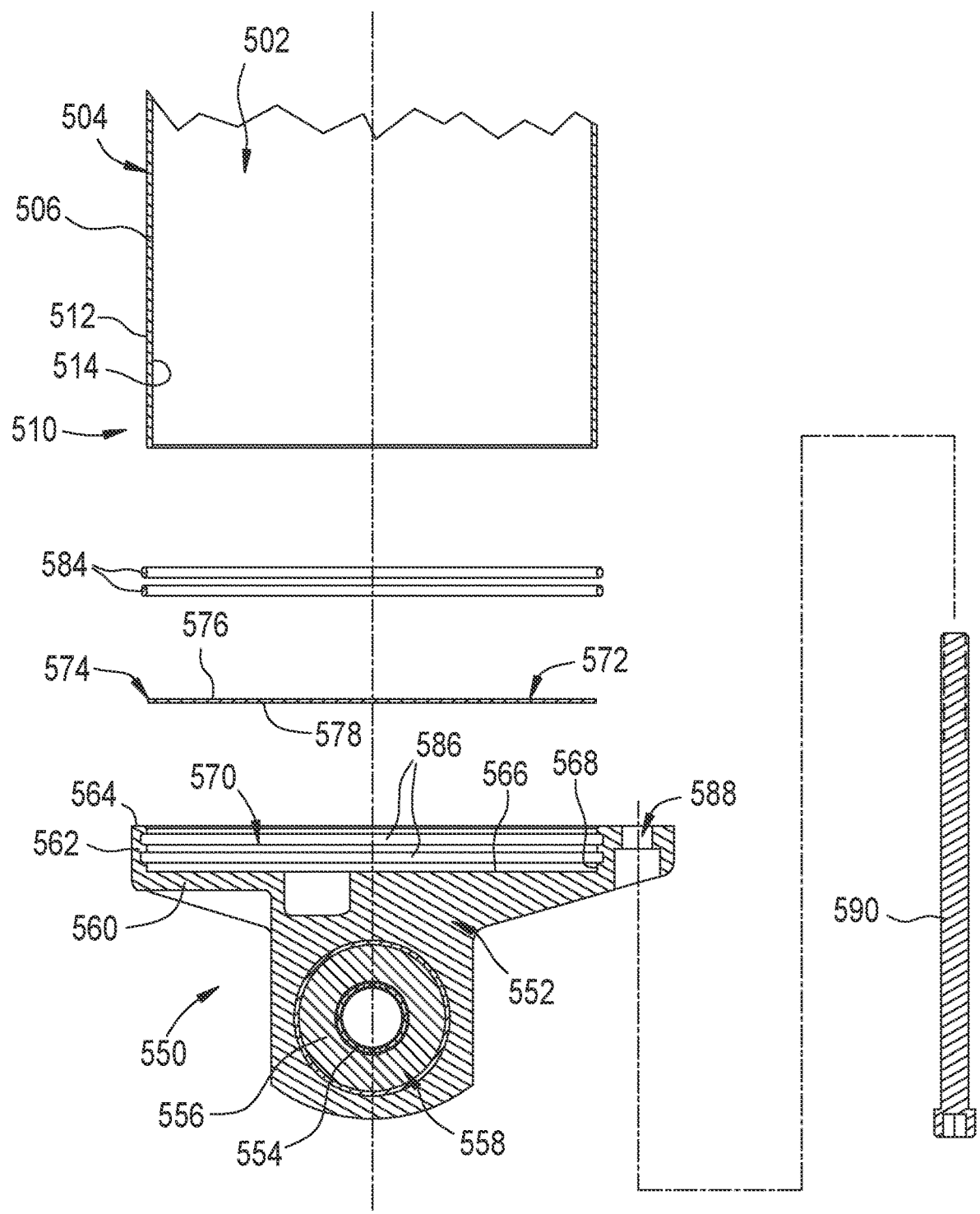
FIG. 11 is an exploded view, in partial cross section, of another portion of the gas spring and gas damper assembly in FIGS. 2-10.
Figure 12:
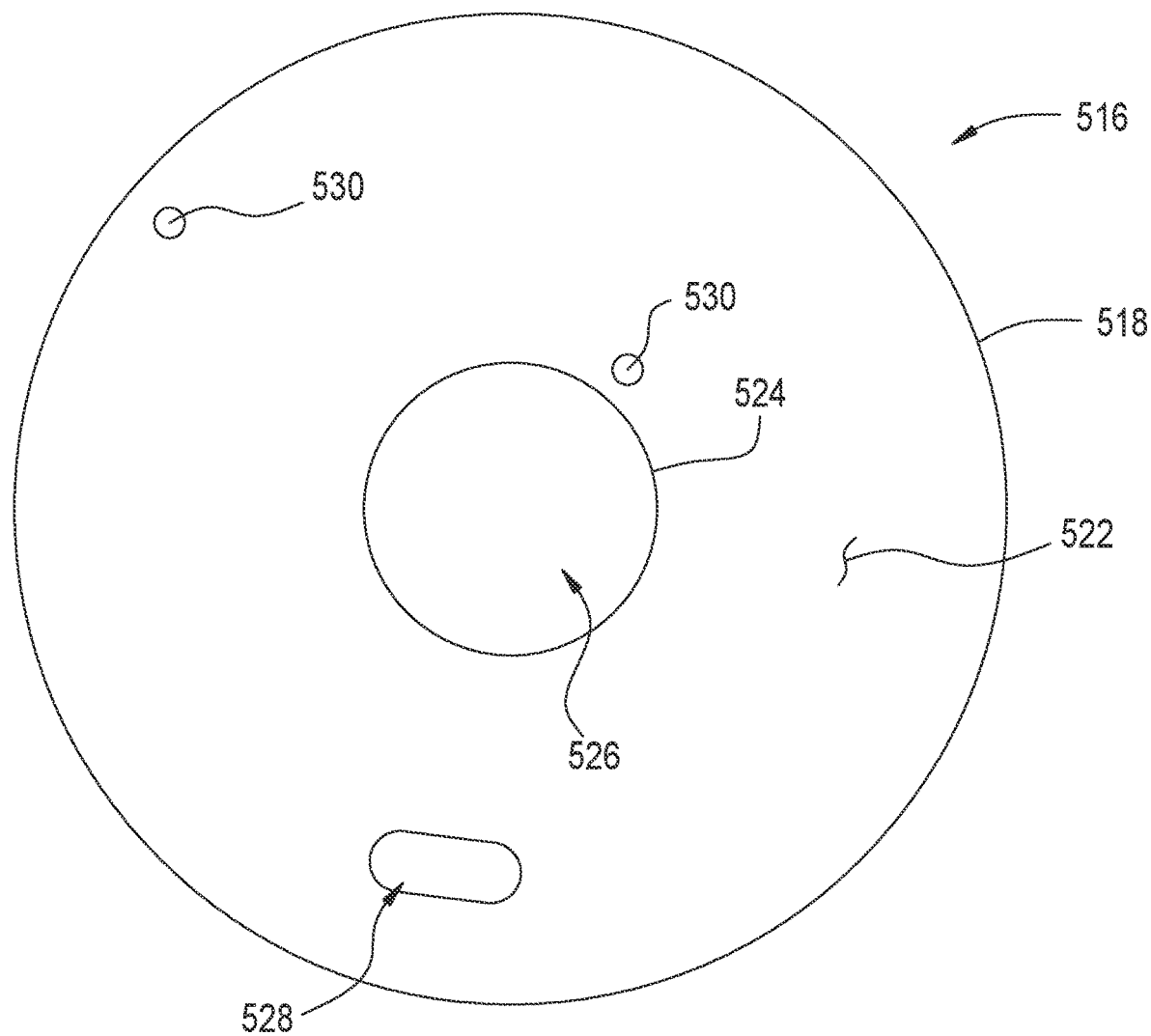
FIG. 12 is a top plan view of one example of an end plate of the gas spring and gas damper assembly in FIGS. 2-11.
Figure 13:
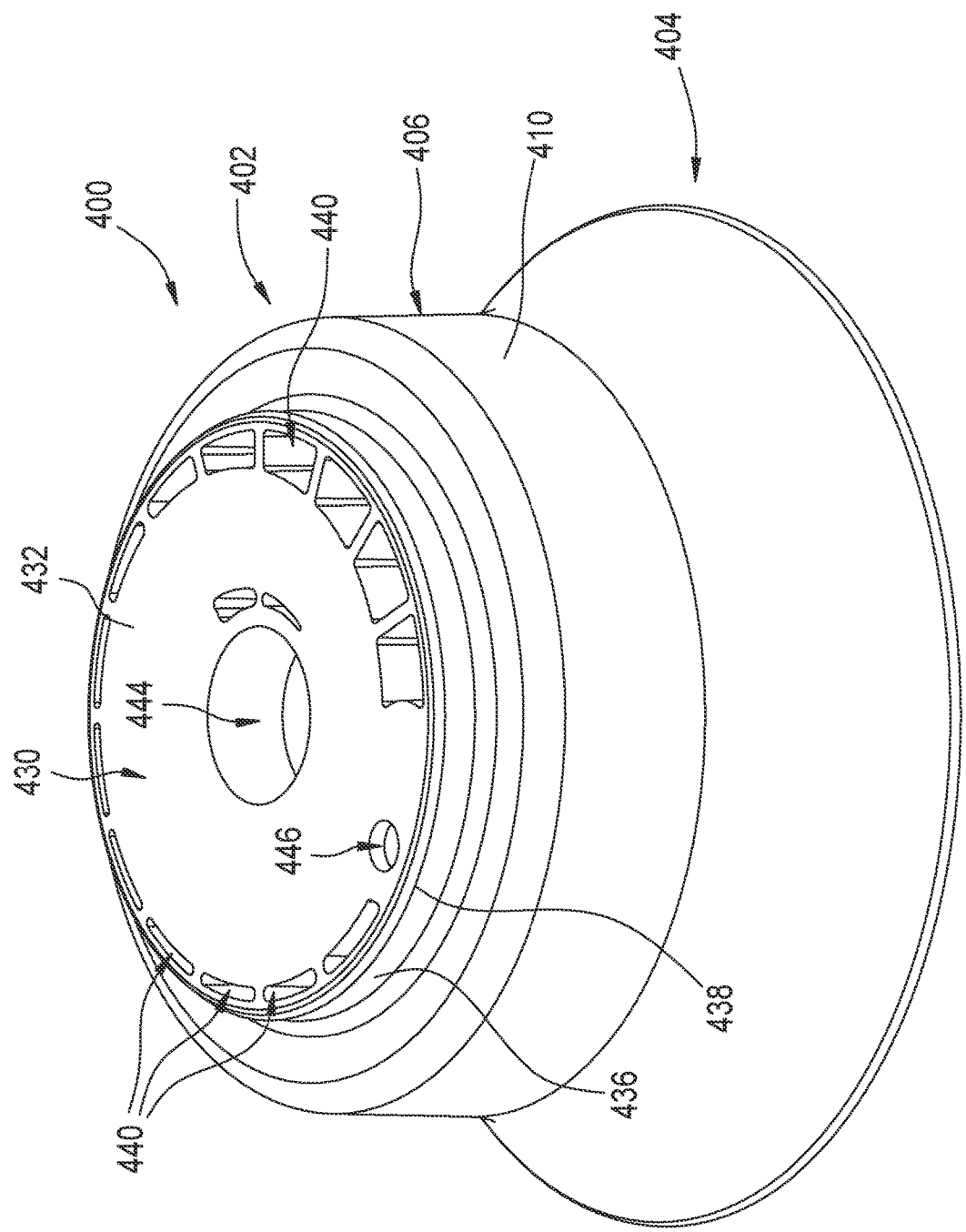
FIG. 13 is a top perspective view of one example of an end member such as is shown in FIGS. 2-11.
Figure 14:
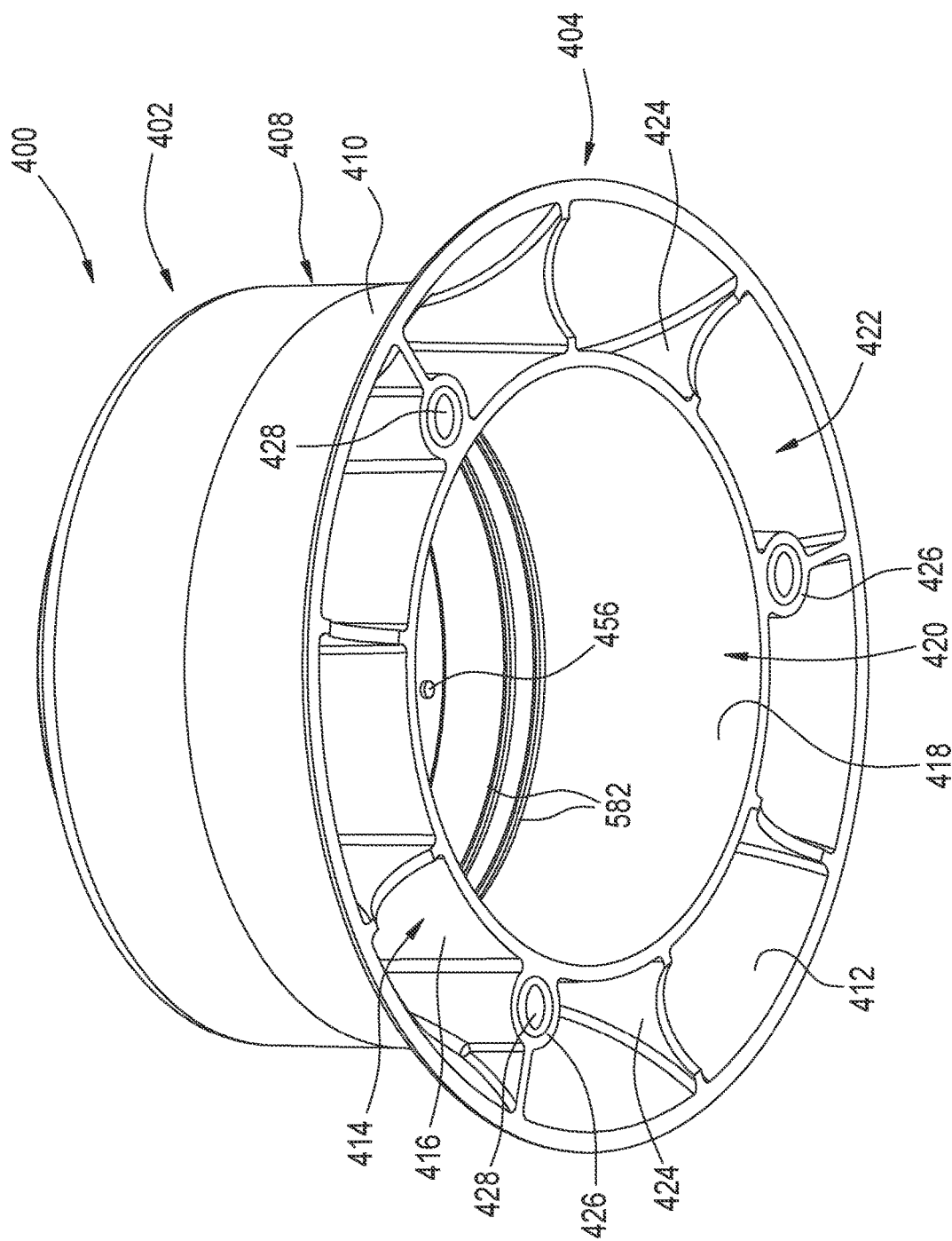
FIG. 14 is a bottom perspective view of the exemplary end member in FIG. 13.
Figure 15:
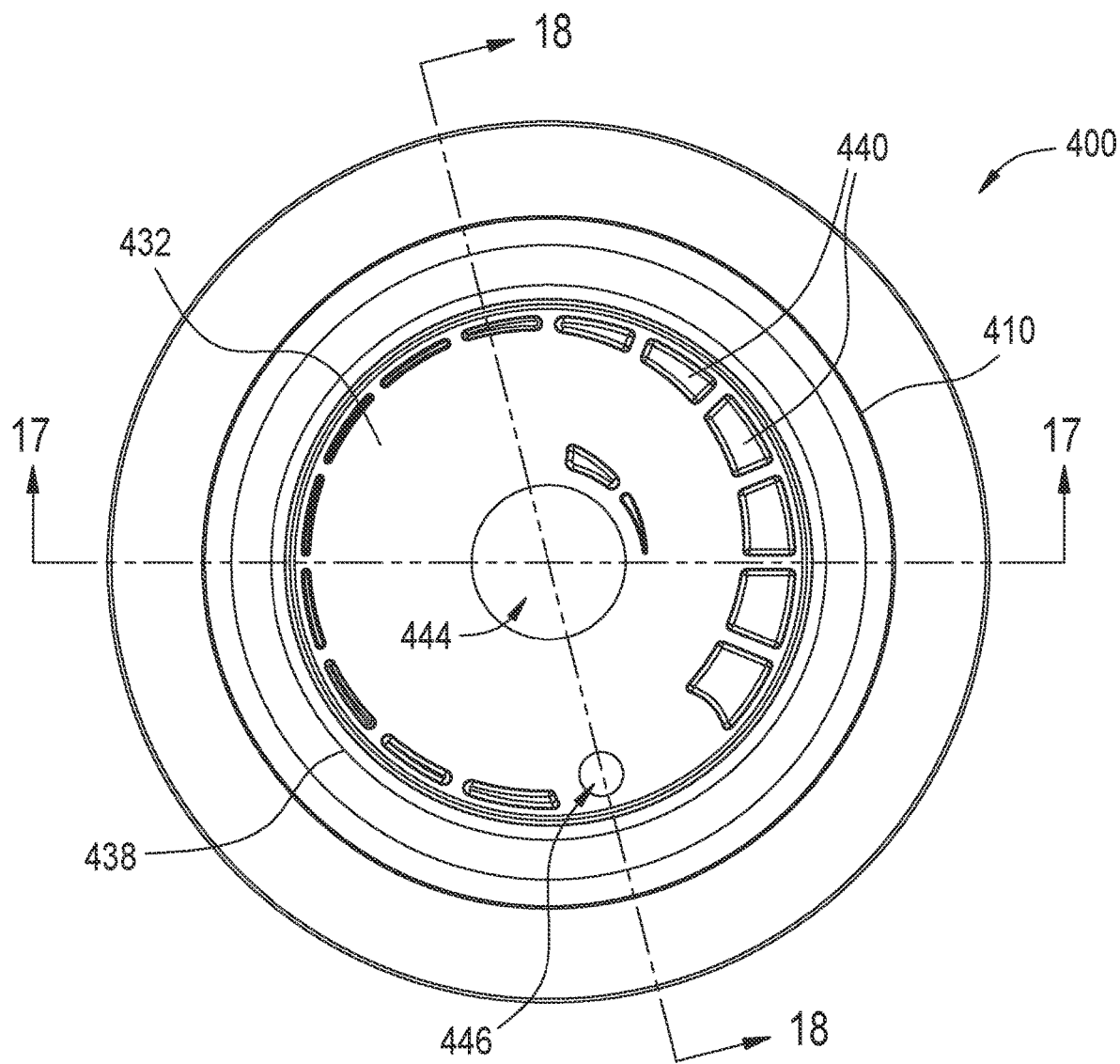
FIG. 15 is a top plan view of the exemplary end member in FIGS. 13 and 14.
Figure 16:
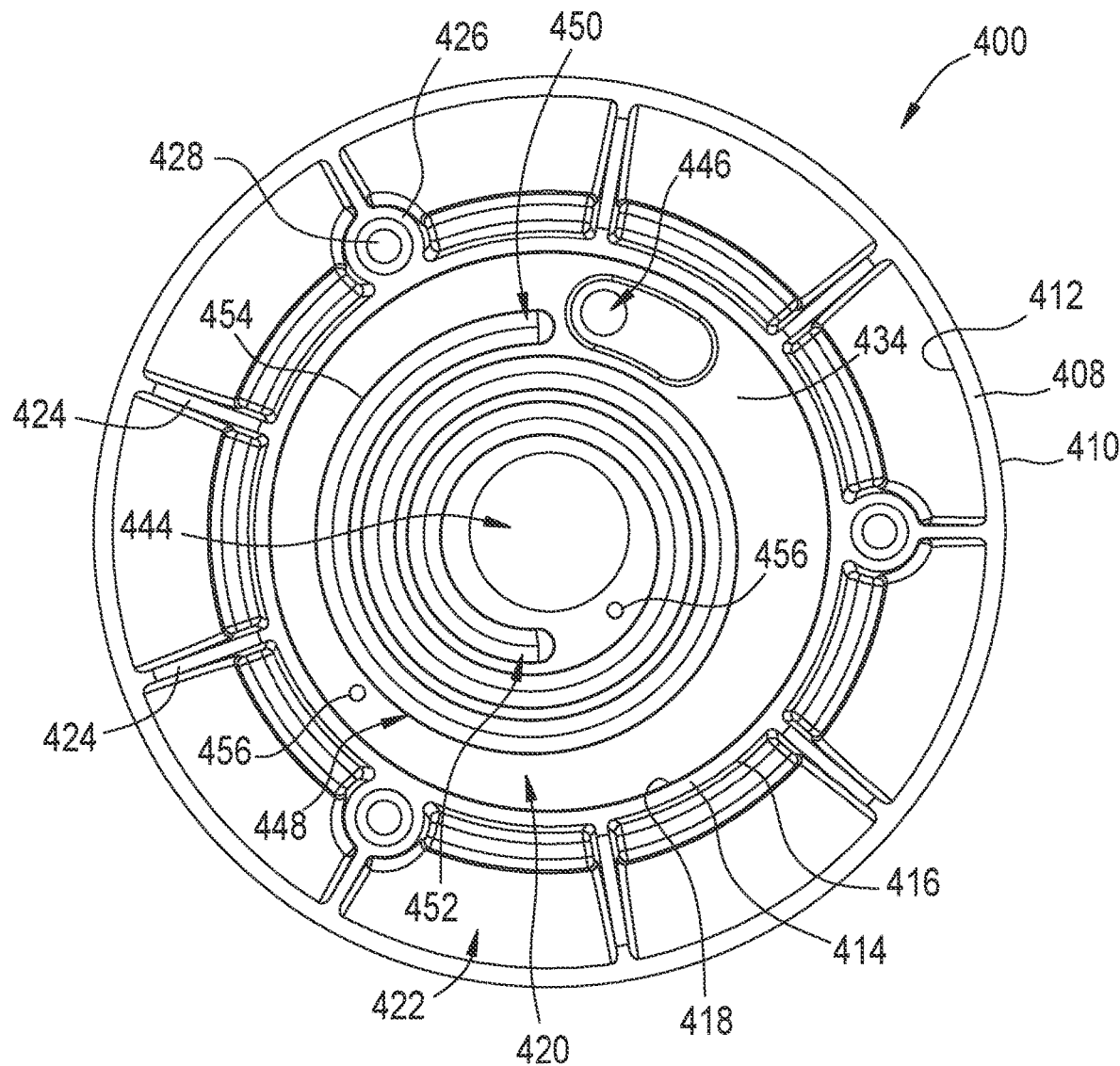
FIG. 16 is a bottom plan view of the exemplary end member in FIGS. 13-15.
Figure 17:
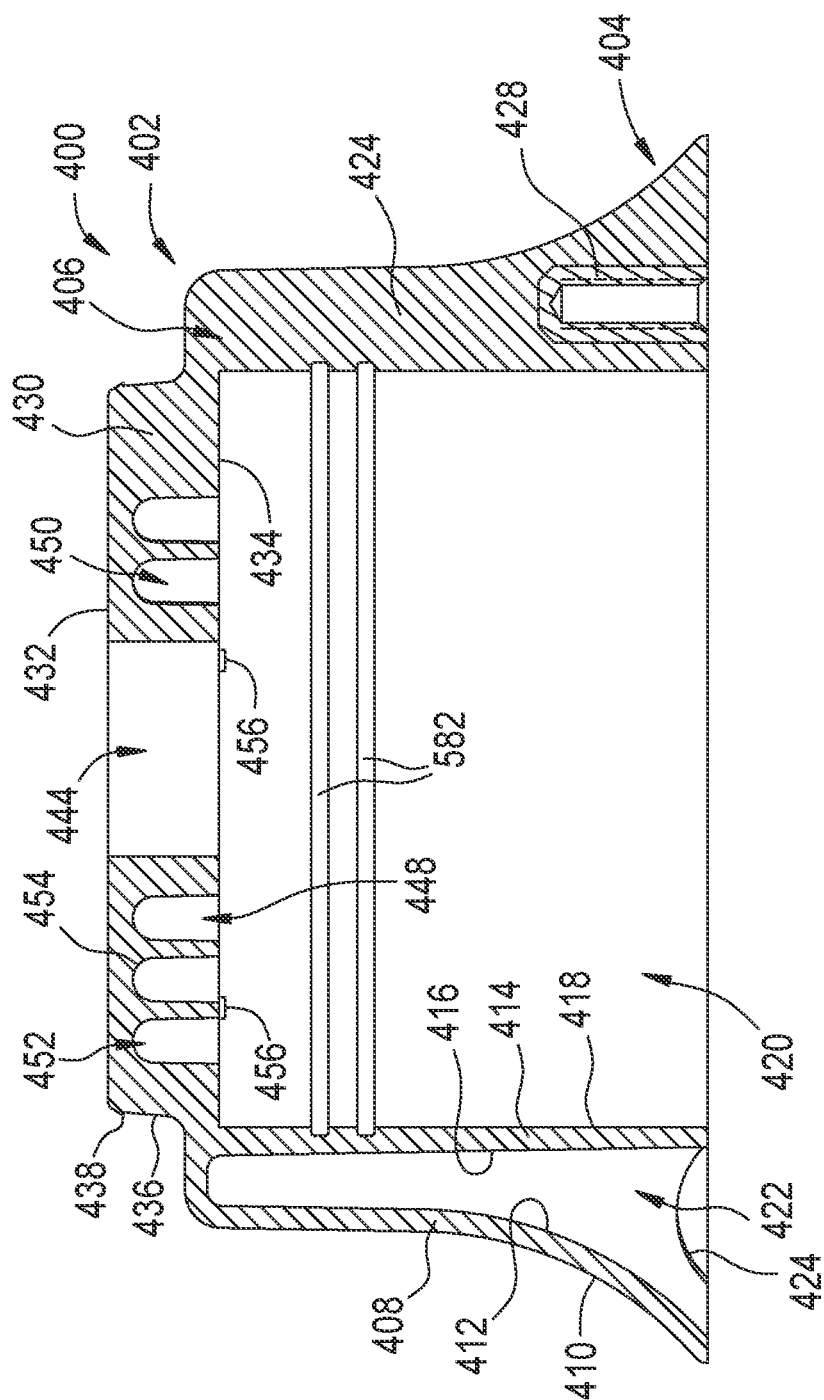
FIG. 17 is a cross-section side view of the exemplary end member in FIGS. 13-16 taken from along line 17-17 in FIG. 15.
Figure 18:
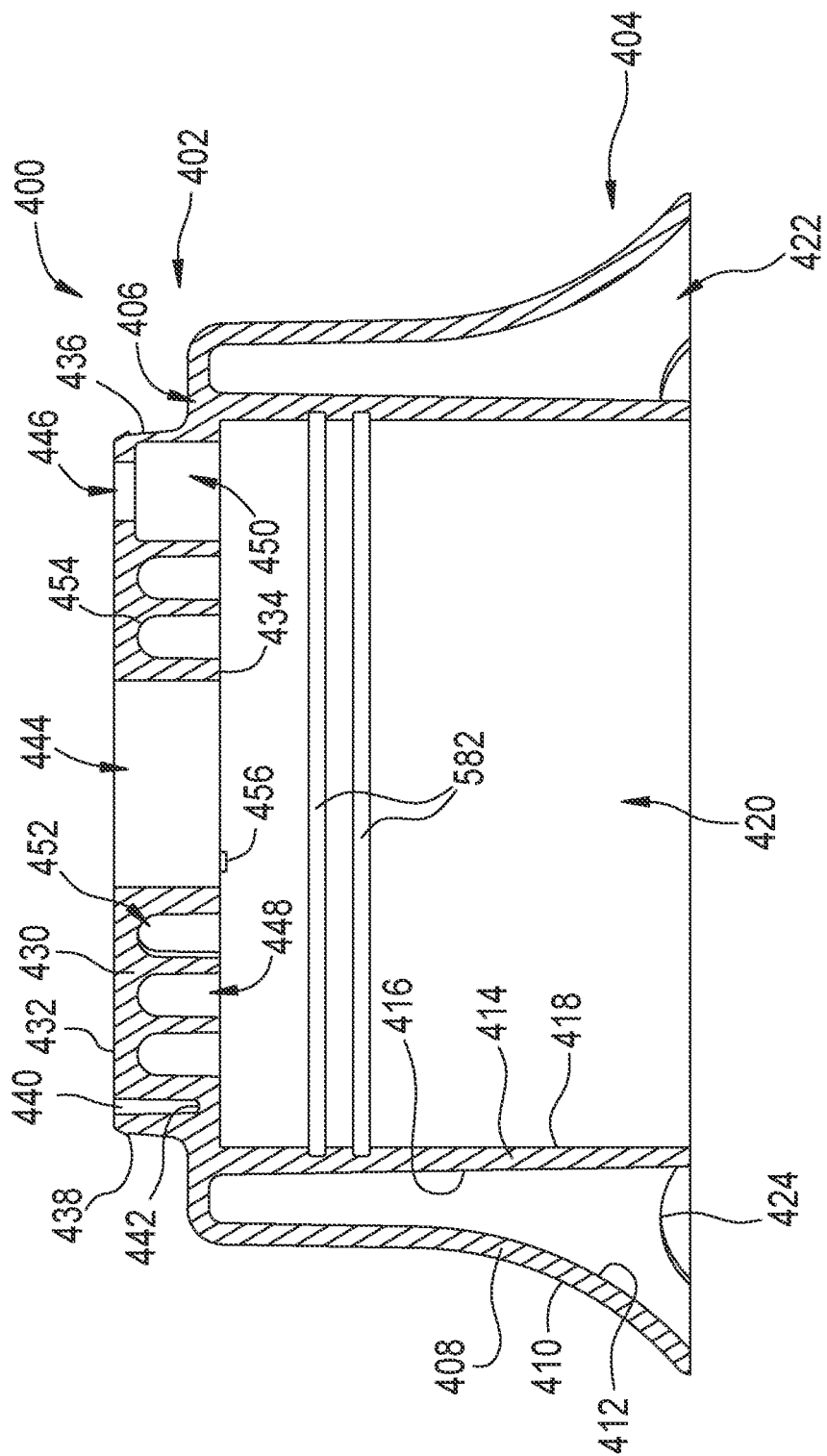
FIG. 18 is a cross-section side view of the exemplary end member in FIGS. 13-17 taken from along line 18-18 in FIG. 15.
Figure 19:
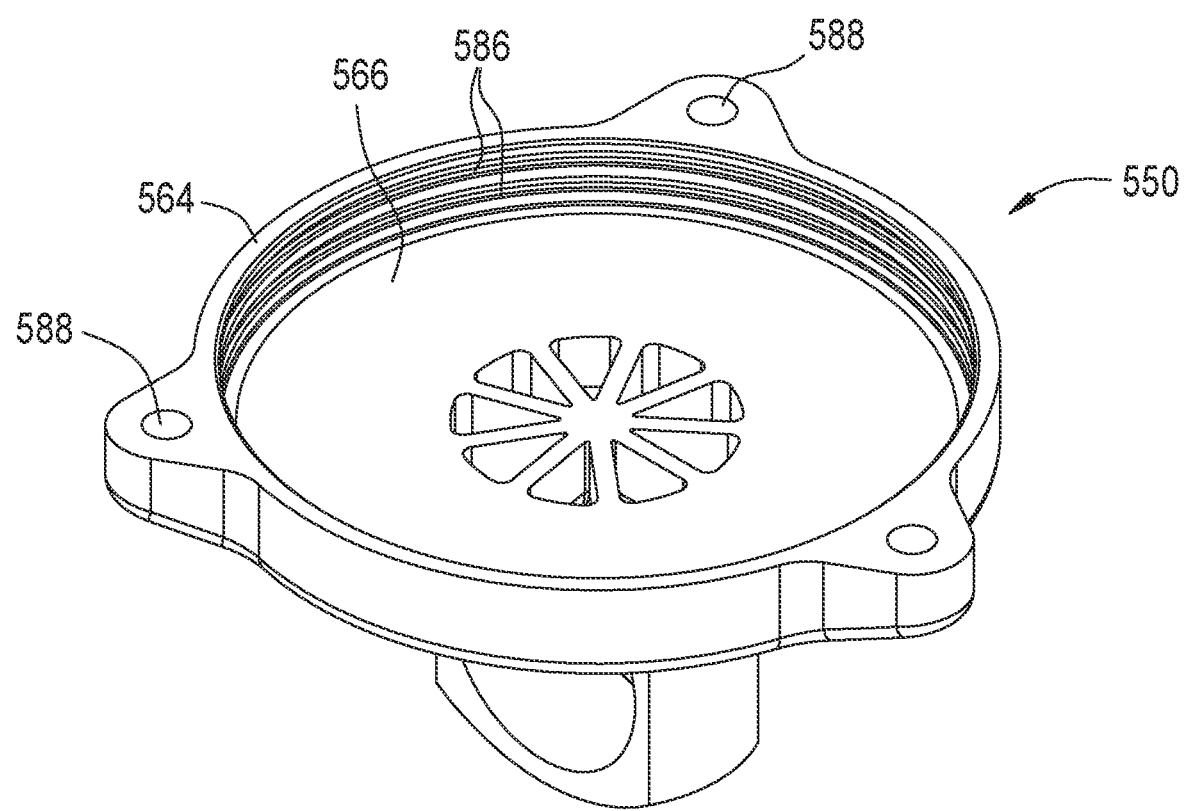
FIG. 19 is a top perspective view of one example of an end cap of an exemplary damper housing of a gas spring and gas damper assembly such as is shown in FIGS. 2-11.
Figure 20:
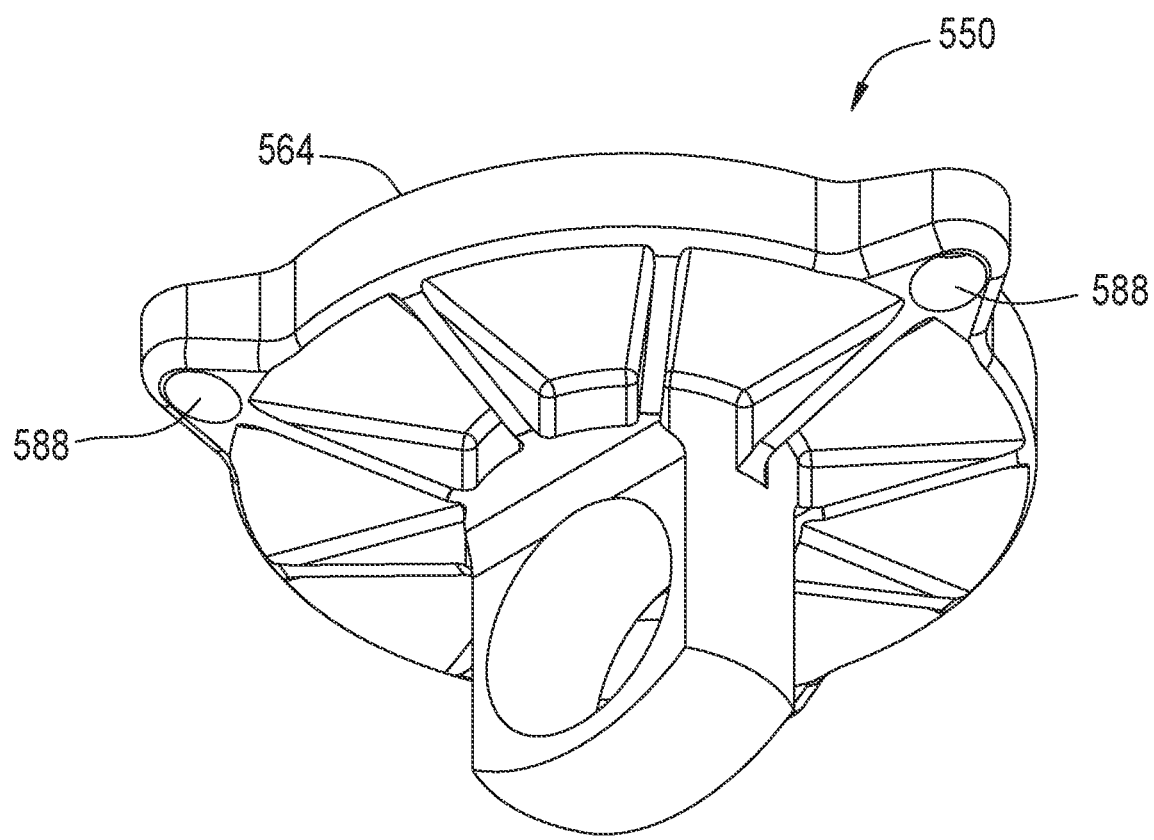
FIG. 20 is a bottom perspective view of the exemplary end cap in FIG. 19.
Figure 21:
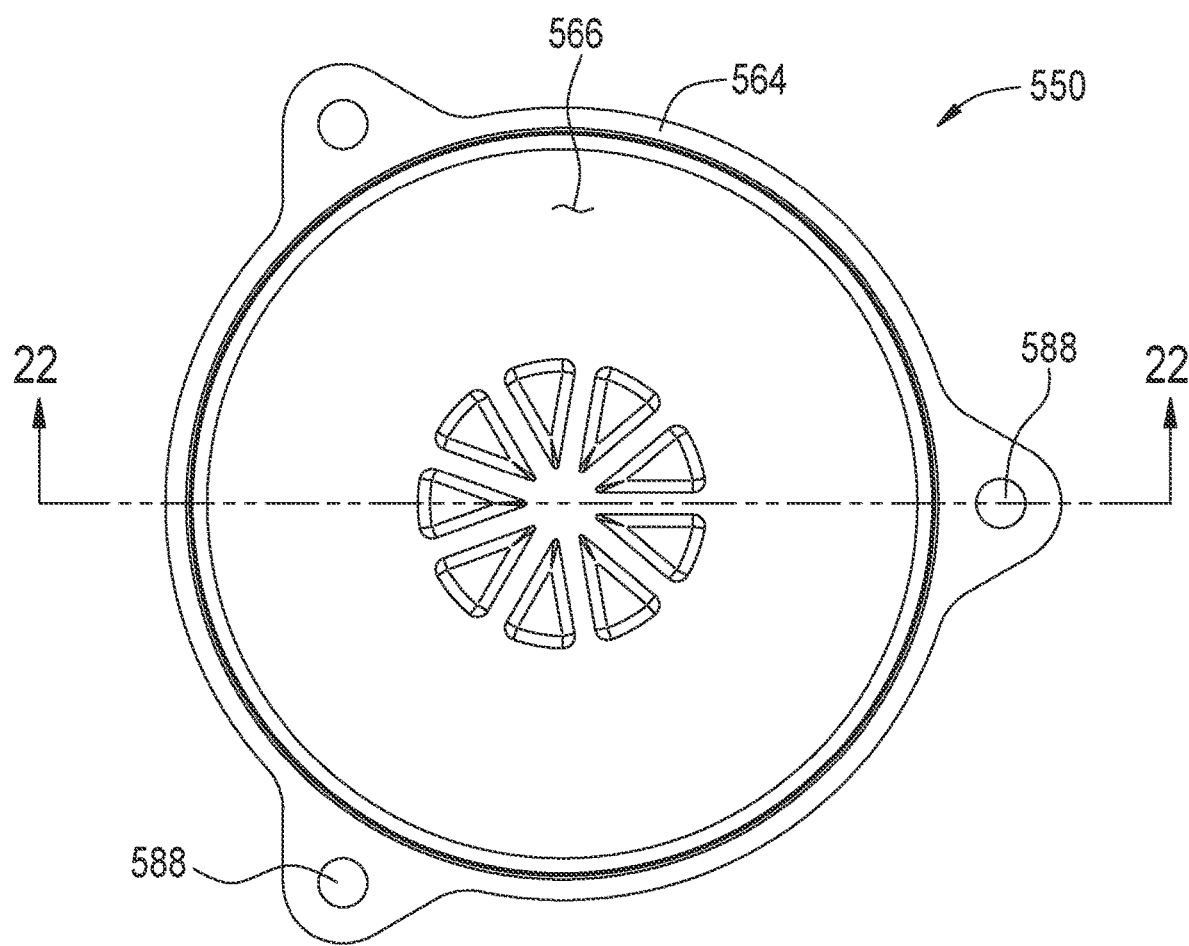
FIG. 21 is a top plan view of the exemplary end cap in FIGS. 19 and 20.
Figure 22:
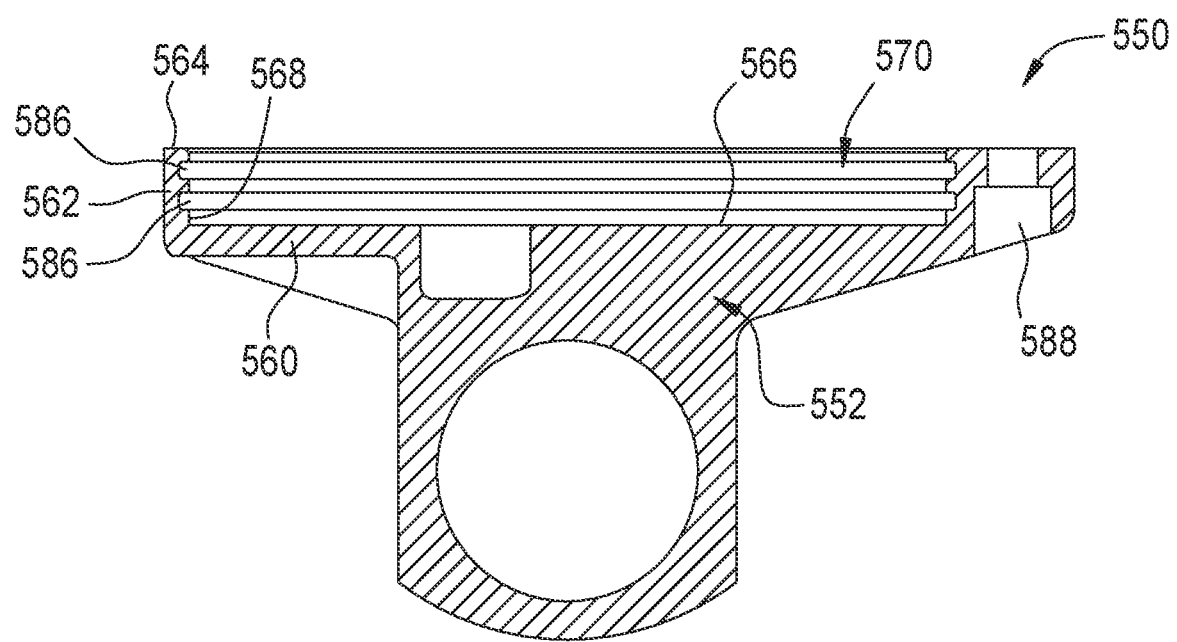
FIG. 22 is a cross-section side view of the exemplary end cap in FIGS. 19-21 taken from along line 22-22 in FIG. 21.

Having described an example of a suspension system (e.g., suspension system 100) that can include gas spring and gas damper assemblies in accordance with the subject matter of the present disclosure, one example of a gas spring and gas damper assembly will now be described in connection with FIGS. 2-11. As shown therein, one example of a gas spring and gas damper assembly AS1, such as may be suitable for use as one or more of gas spring and gas damper assemblies 102 in FIG. 1, for example. Gas spring and gas damper assembly AS1 is shown as including a gas spring (or gas spring assembly) GS1, such as may correspond to one of gas springs 104 in FIG. 1, for example, and a gas damper (or gas damper assembly) GD1, such as may correspond to one of gas dampers 106 in FIG. 1, for example. Gas spring assembly GS1 and gas damper assembly GD1 can be operatively secured to one another and fluidically coupled with one another in any suitable manner, such as is described hereinafter, for example. A longitudinal axis AX extends lengthwise along assembly AS1, as shown in FIGS. 7 and 9.

Gas spring assembly GS1 can include a flexible spring member 200 that can extend peripherally around axis AX and can be secured between opposing end members (or end member assemblies) 300 and 400 in a substantially fluid-tight manner such that a spring chamber 202 is at least partially defined therebetween. Gas damper assembly GD1 can include a damper housing 500 that is operatively supported on or along end member 400 and a damper rod assembly 600 that is operatively associated with damper housing 500. An end mount 700 can operatively connect damper rod assembly 600 with end member 300.

It will be appreciated that flexible spring member 200 can be of any suitable size, shape, construction and/or configuration. Additionally, the flexible spring member can be of any type and/or kind, such as a rolling lobe-type or convoluted bellows-type construction, for example. Flexible spring member 200 is shown in FIGS. 2-7, 9, 23 and 24 as including a flexible wall 204 that can be formed in any suitable manner and from any suitable material or combination of materials. For example, the flexible wall can include one or more filament-reinforced, elastomeric plies or layers and/or one or more un-reinforced, elastomeric plies or layers. Typically, one or more filament-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 204 can extend in a generally longitudinal direction between opposing ends 206 and 208. Additionally, flexible wall 204 can include an outer surface 210 and an inner surface 212. The inner surface can at least partially define spring chamber 202 of gas spring assembly GS1. Flexible wall 204 can include an outer or cover ply (not identified) that at least partially forms outer surface 210. Flexible wall 204 can also include an inner or liner ply (not identified) that at least partially forms inner surface 212. In some cases, flexible wall 204 can further include one or more reinforcing plies (not shown) disposed between outer and inner surfaces 210 and 212. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 200 can include any feature or combination of features suitable for forming a substantially fluid-tight connection with end member 300 and/or end member 400. As one example, flexible spring member 200 can include a mounting bead 214 disposed along end 206 of flexible wall 204 and a mounting bead 216 disposed along end 208 of the flexible wall. In some cases, the mounting bead, if provided, can, optionally, include a reinforcing element, such as an endless, annular bead wire 218, for example.

Gas spring and gas damper assembly AS1 can be disposed between associated sprung and unsprung masses of an associated vehicle in any suitable manner. For example, one component can be operatively connected to the associated sprung mass with another component disposed toward and operatively connected to the associated unsprung mass. As illustrated in FIG. 6, for example, end member 300 can be operatively disposed along a first or upper structural component USC, such as associated vehicle body BDY in FIG. 1, for example, and can be secured thereon in any suitable manner. As another example, damper housing 500 can be operatively disposed along a second or lower structural component LSC, such as one of associated axles AXL in FIG. 1, for example, and can be secured thereon in any suitable manner.

Additionally, it will be appreciated that the end members can be of any suitable type, kind, construction and/or configuration, and can be operatively connected or otherwise secured to the flexible spring member in any suitable manner. In the exemplary arrangement shown in FIGS. 2-4, 6, 7 and 9, for example, end member 300 is of a type commonly referred to as a bead plate and includes an end member wall 302 with an inner wall portion 304 and an outer peripheral wall portion 306. End member 300 is disposed along end 206 of flexible wall 204 with outer peripheral wall portion 306 crimped or otherwise deformed around at least a portion of mounting bead 214 such that a substantially fluid-tight seal can be formed between flexible spring member 200 and end member 300. Inner wall portion 304 can have an approximately planar outer surface 308 dimensioned to abuttingly engage an associated structural component (e.g., upper structural component USC). Inner wall portion 304 can also have an approximately planar inner surface 310 disposed in facing relation to spring chamber 202.

As indicated above, end member 300 can be disposed in operative engagement on or along first or upper structural component USC (FIG. 6), such as associated vehicle body BDY in FIG. 1, for example, and can be secured thereon in any suitable manner. For example, one or more securement devices, such as mounting studs 312, for example, can be included along end member 300. In some cases, mounting studs 312 can include a section 314 dimensioned for attachment to end member wall 302 in a suitable manner, such as, for example, by way of a flowed-material joint (not shown) or a press-fit connection (not identified).

Additionally, mounting studs 312 can include a section 316 that extends axially from along section 314 and can include one or more helical threads 318. Section 316 can be dimensioned to extend through corresponding mounting holes HLS (FIG. 6) in upper structural component USC (FIG. 6) and can receive one or more securement devices (e.g., threaded nuts) 320. Mounting studs 312 can also include a section 322 that extends axially from along section 314 in a direction opposite section 316. As such, section 322 can extend into spring chamber 202 and can include one or more helical threads 324 dimensioned to receive one or more threaded nuts or other securement devices, such as, for example, may be used to secure one or more devices and/or components of end mount 700 on or along inside surface 310 of end member 300, for example.

Figure 2:
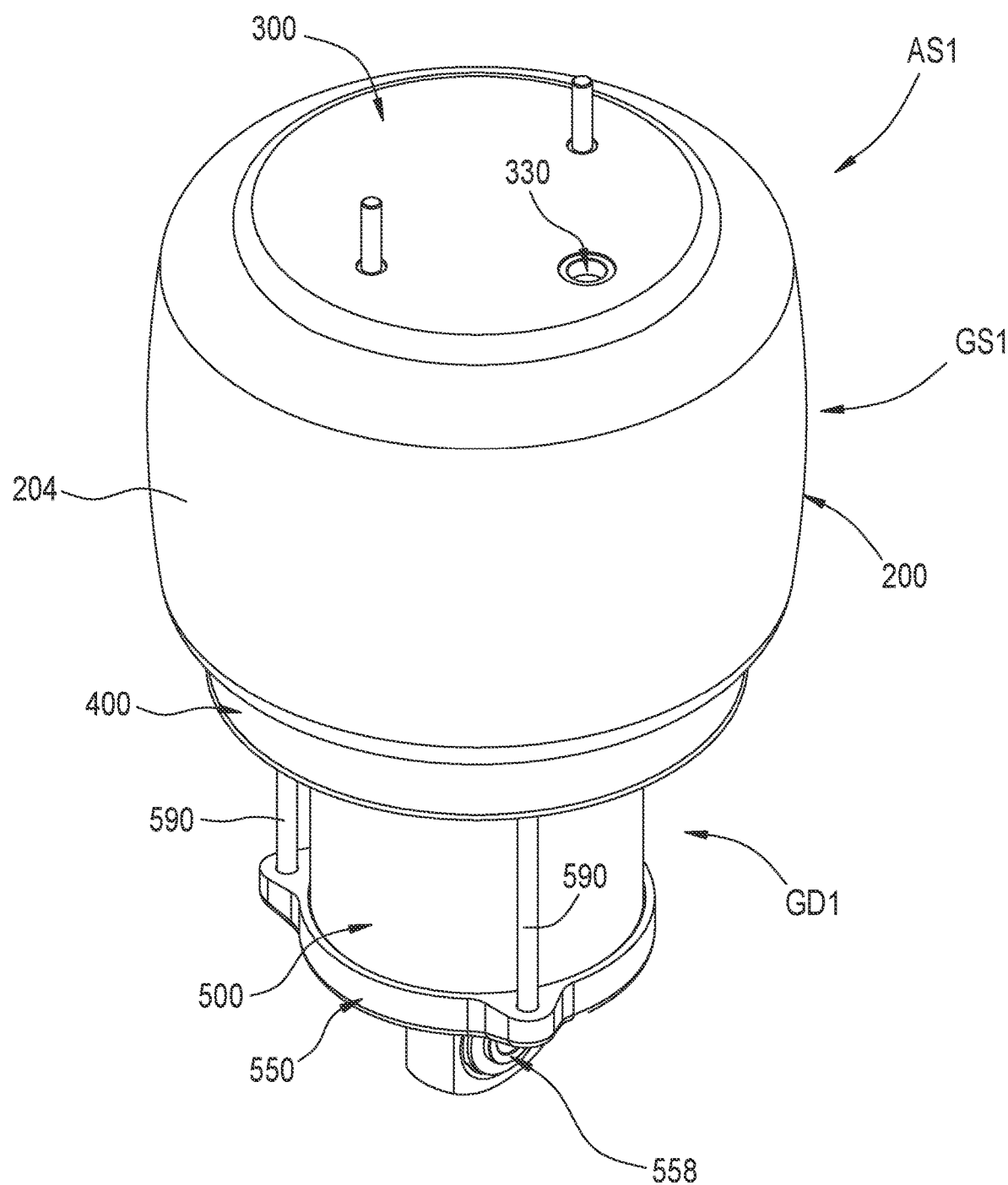
FIG. 2 is a top perspective view of one example of a gas spring and gas damper assembly.
Figure 3:
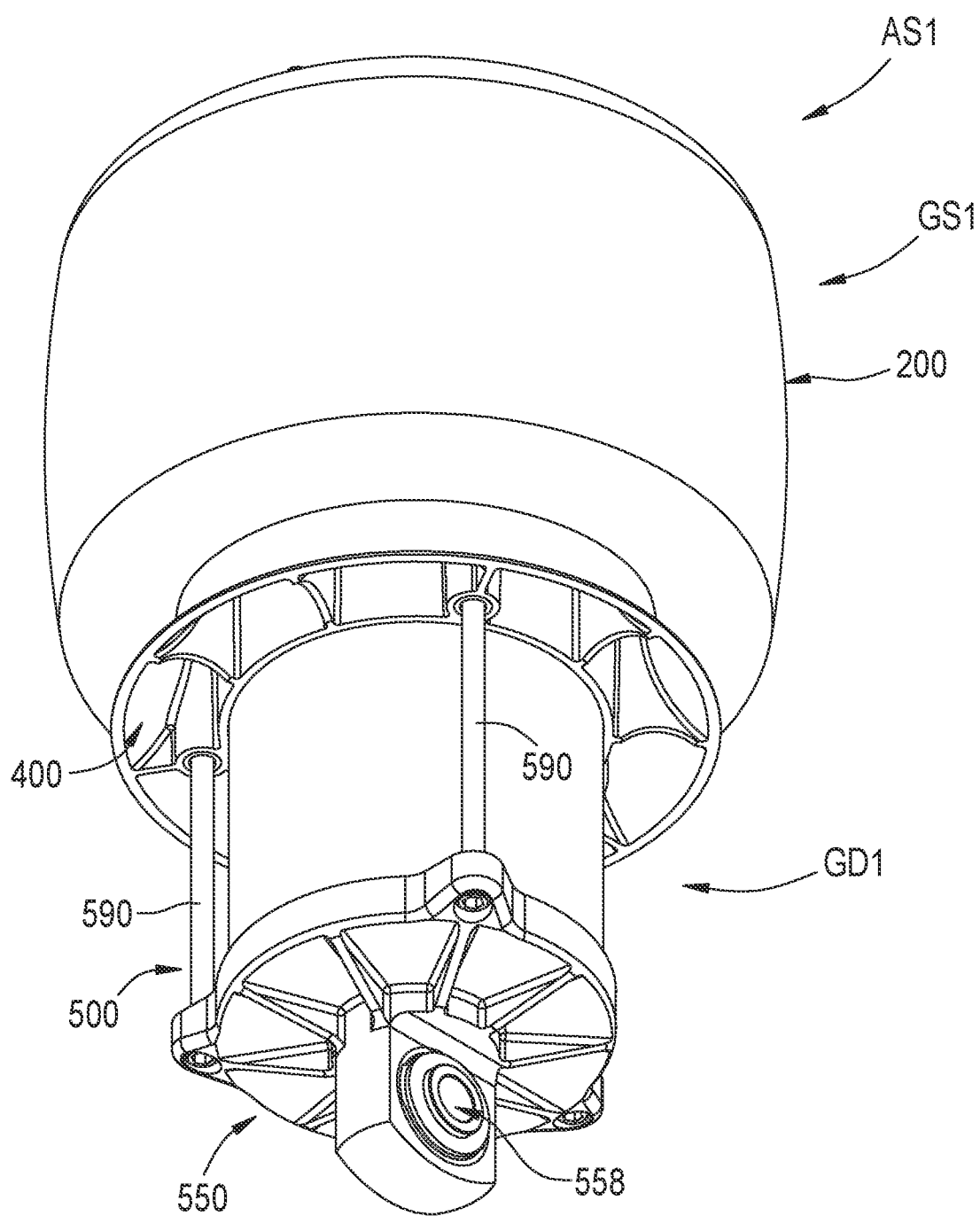
FIG. 3 is a bottom perspective view of the exemplary gas spring and gas damper assembly in FIG. 2.
Figure 4:
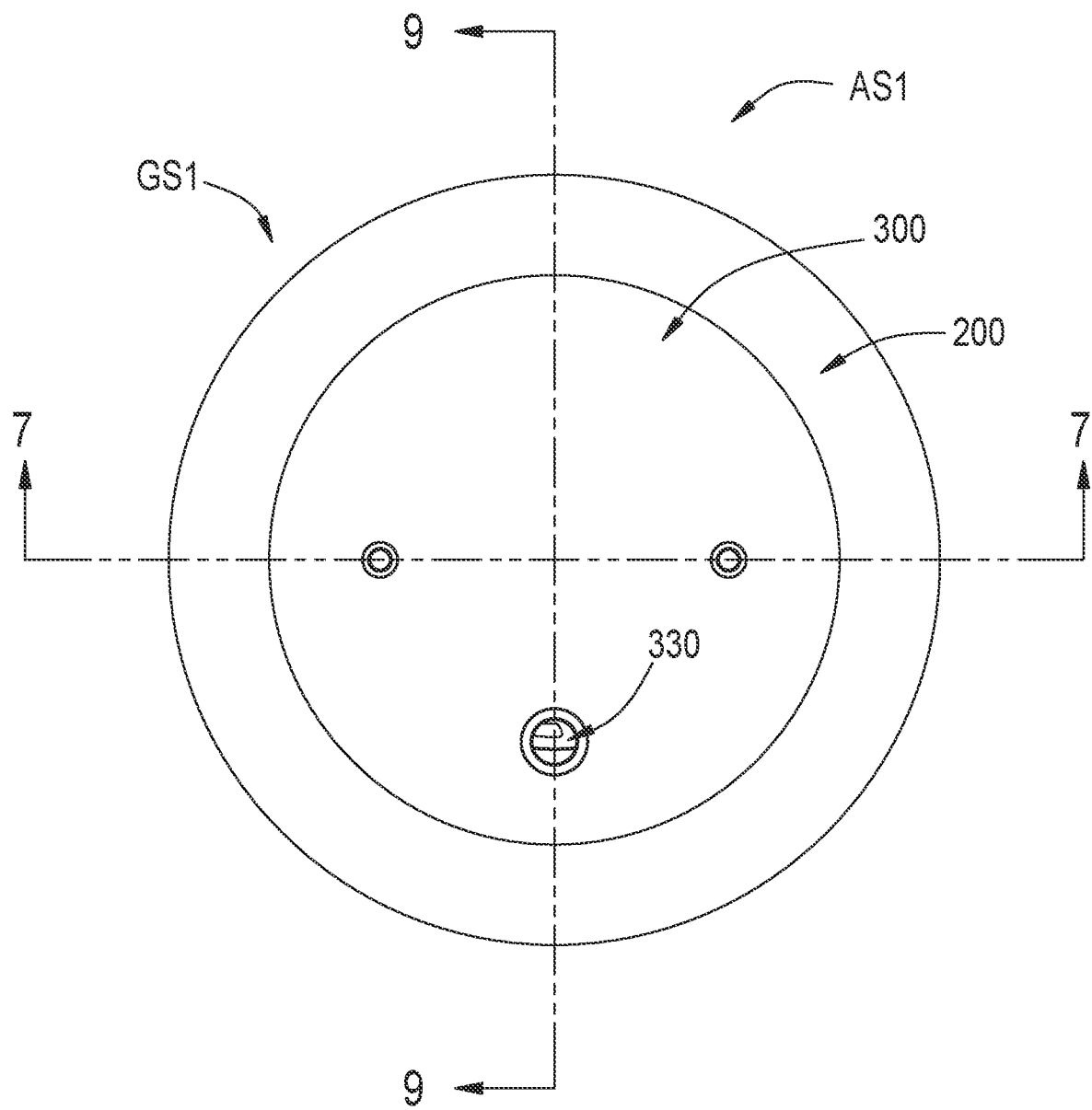
FIG. 4 is a top plan view of the exemplary gas spring and gas damper assembly in FIGS. 2 and 3.
Figure 5:
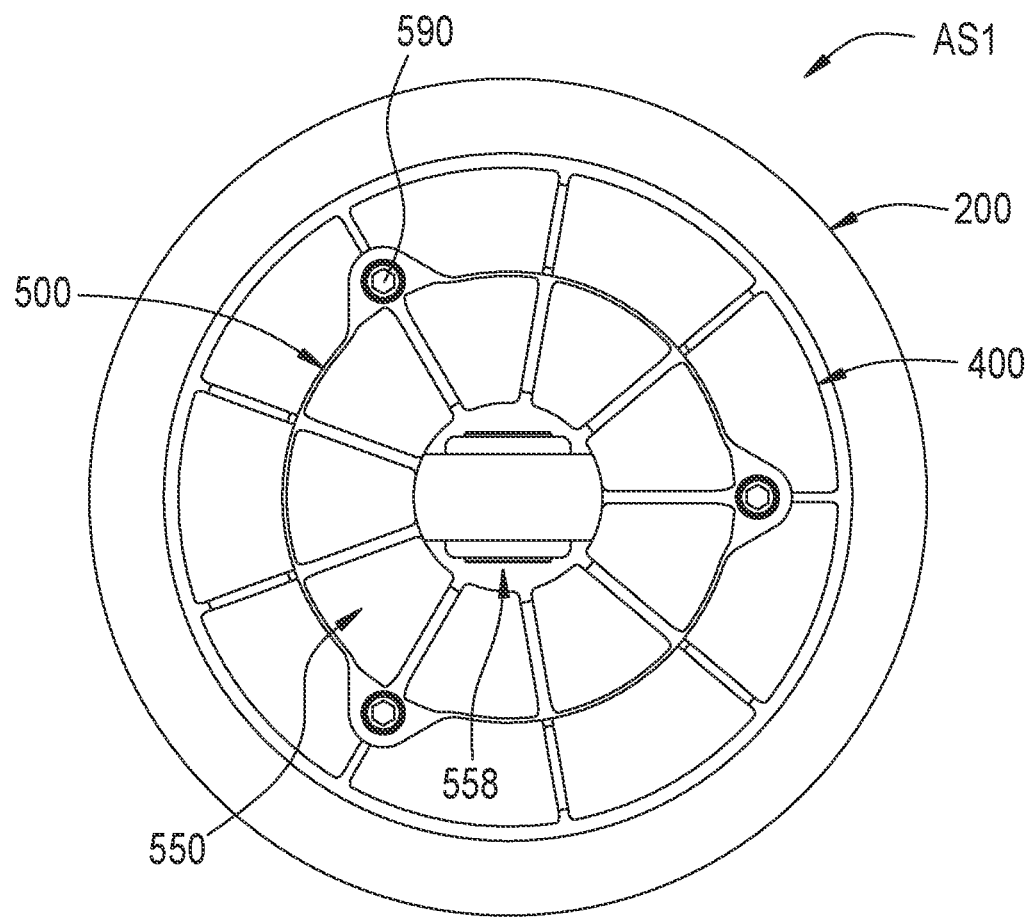
FIG. 5 is a bottom plan view of the exemplary gas spring and gas damper assembly in FIGS. 2-4.

Furthermore, one or more fluid communication ports or transfer passages can optionally be provided to permit fluid communication with the spring chamber, such as may be used for transferring pressurized gas into and/or out of the spring chamber, for example. In some cases, a transfer passage (not shown) can extend through one or more of the mounting studs. In other cases, such as is shown in FIGS. 2, 4 and 7, for example, end member 300 can include a passage fitting 326 that can be secured on or along end member wall 302 in a substantially fluid-tight manner, such as by way of a flowed-material joint 328, for example. A transfer passage 330 can extend through end member wall 302 and passage fitting 326 that is in fluid communication with spring chamber 212. It will be appreciated, however, that any other suitable fluid communication arrangement could alternately be used.

End member 400 is shown as being disposed in axially-spaced relation to end member 300, and as including features associated with a type of end member commonly referred to as a piston (or a roll-off piston). It will be recognized that a wide variety of sizes, shapes, profiles and/or configurations can and have been used in forming end members of the type and kind referred to as pistons or roll-off pistons, such as end member 400, for example. As such, it will be appreciated that the walls and/or wall portions of the end member can be of any suitable shape, profile and/or configuration, such as may be useful to provide one or more desired performance characteristics, for example, and that the profile shown in FIGS. 2-11 and 13-18 is merely exemplary.

End member 400 can extend lengthwise between opposing ends 402 and 404 that are axially spaced from one another. End member 400 can include an end member wall 406 that can have a first or outer side wall portion 408 that extends in a generally axial direction and includes an outside surface 410 and an inside surface 412. End member 400 can also include a second or inner side wall portion 414 that also extends in a generally axial direction. Inner side wall portion 414 is spaced radially inward from outer side wall portion 408 and includes an outside surface 416 and an inside surface 418. In a preferred arrangement, inside surface 418 of inner side wall portion 414 can at least partially define an inner cavity 420 within end member 400.

In the arrangement shown in FIGS. 2-11 and 13-18, end member 400 includes an outer cavity 422 extending into the end member between inside surface 412 of outer side wall portion 408 and outside surface 416 of inner side wall portion 414. In some cases, one or more support wall portions 424 can extend between and operatively interconnect the outer and inner side wall portions. Additionally, in some cases, one or more bosses or projections can be provided on or along the end member wall, such as may be suitable for including one or more securement devices and/or securement features. In the exemplary arrangement shown in FIGS. 2-11 and 13-18, for example, end member wall 406 can include boss wall portions 426 that can be formed or otherwise disposed along one or more of outer side wall portion 408, inner side wall portion 414 and/or support wall portions 424, for example. In some cases, one or more securement features (e.g., threaded passages) can extend into or be otherwise formed on or along the boss wall portions. In other cases, one or more securement devices 428, such as threaded metal inserts, for example, can be at least partially embedded within one of more of boss wall portions 426. It will be appreciated, however, that other configurations and/or arrangements could alternately be used.

End member wall 406 can also include an end wall portion 430 that can extend across and/or between any combination of one or more of outer side wall portion 408, inner side wall portion 414 and/or support wall portions 424. End wall portion 430 can be oriented transverse to axis AX and can at least partially form a closed end of inner cavity 420 of the end member. Additionally, end wall portion 430 can include opposing surfaces 432 and 434. As indicated above, it will be appreciated that the one or more end members of the gas spring and gas damper assembly can be operatively connected or otherwise secured to the flexible spring member in any suitable manner. In the case of end member 400, end member wall 406 can, for example, include an outer surface 436 that extends peripherally about axis AX and is dimensioned to receive mounting bead 216 disposed along end 208 of the flexible wall 204 such that a substantially fluid-tight seal can be formed therebetween. In some cases, a retaining ridge 438 can project radially outward beyond outer surface 436 and can extend peripherally along at least a portion thereof, such as may assist in retaining end 208 of flexible wall 204 in abutting engagement on or along the end member.

In an assembled condition, outer surface 210 of flexible wall 204 can be disposed in abutting engagement with outside surface 410 of outer side wall portion 408. In such an arrangement, flexible wall 204 of flexible spring member 200 can form a rolling lobe 220 along outside surface 410 of outer side wall portion 408. As gas spring and gas damper assembly AS1 is displaced between compressed and extended conditions, rolling lobe 220 can be displaced along outer surface 410 in a generally conventional manner.

In some cases, a gas spring and gas damper assembly in accordance with the subject matter of the present disclosure can include one or more elongated gas damping passages through which pressurized gas can flow to generate pressurized gas damping to dissipate kinetic energy acting on the gas spring and gas damper assembly. It will be appreciated that such one or more elongated gas damping passages can be of any suitable size, shape, configuration and/or arrangement. Additionally, it will be appreciated that any number of one or more features and/or components can be used, either alone or in combination with one another, to form or otherwise establish such one or more elongated gas damping passages.

Additionally, in some cases, a gas spring and gas damper assembly in accordance with the subject matter of the present disclosure can include one or more elongated gas damping passages fluidically connected between the spring chamber and one or more damping chambers or damping chamber portions. In such constructions, pressurized gas damping performance exceeding that provided by conventional gas damping orifice designs can be achieved through the use of such one or more elongated gas damping passages, particularly with respect to a given or otherwise predetermined range of frequencies of vibration or other dynamic input.

Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermine range of frequencies.

Furthermore, in some cases, a gas spring and gas damper assembly in accordance with the subject matter of the present disclosure can include one or more elongated gas damping passages in fluid communication between the spring chamber and one or more damping chambers or damping chamber portions. Differential pressure between the volumes can induce gas flow along at least a portion of the length of the elongated gas damping passage. It will be appreciated that such movement of the pressurized gas within and/or through an elongated gas damping passage can act to dissipate kinetic energy acting on the assembly and/or system.

It will be appreciated that the cross-sectional area and overall length of the elongated gas damping passage can be dimensioned, sized and/or otherwise configured to generate gas flow having sufficient mass and sufficient velocity to achieve the desired level of pressurized gas damping. Additionally, in a preferred arrangement, the elongated gas damping passages can be dimensioned, sized and/or otherwise configured such that one or more performance characteristics, such as peak Loss Stiffness, for example, of the system occur at approximately a desired or target frequency or otherwise within a desired or targeted frequency range. Non-limiting examples of targeted frequency ranges can include vibrations from 1-7 Hz, vibrations from 8-14 Hz and vibrations from 15-25 Hz.

In the exemplary construction shown in FIGS. 7-10 and 13-18, end member wall 406 of end member 400 can include a plurality of recesses 440 that can extend into end member wall 406 from along surface 432. Recesses 440 are shown as being disposed in peripherally spaced relation to one another about axis AX. The recesses are also shown as being spaced radially outward from the axis toward outer surface 436 and varying in size and shape relative to one another. In a preferred arrangement, recesses 440 are blind recesses and include a bottom surface 442 such that the recesses do not extend or otherwise form a passage through end member wall 406.

End member wall 406 of end member 400 can include an opening or passage 444 extending through end wall portion 430 between surfaces 432 and 434. In a preferred arrangement, passage 444 can be oriented in approximately co-axial alignment with axis AX. Also, in a preferred arrangement, passage 444 can be dimensioned to receive and permit one or more components of gas damper assembly GD1 to extend through end wall portion 430, as discussed in greater detail below.

End member 400 can also include a passage or port 446 extending into and at least partially through end wall portion 430 of end member wall 406 from along surface 432. In a preferred arrangement, passage 446 is disposed radially outward of opening 444 and adjacent or otherwise toward outer surface 436 of end wall portion 430. End member 400 can further include an elongated damping passage 448 extending into, through or otherwise along at least a portion of end wall portion 430 of end member wall 406. In a preferred arrangement, elongated damping passage 448 has a first end 450 disposed in fluid communication with port 446 and a second end 452 disposed radially inward of port 446. In other cases, the passage or port could be disposed radially inward adjacent or otherwise toward passage 444 with the second end of the elongated damping passage disposed radially outward of the first end.

In either case, it will be appreciated that elongated damping passage 448 can be of any suitable shape, form, configuration and/or arrangement. In a preferred arrangement, elongated damping passage 448 can have a spiral-like or similar configuration. In such case, the elongated damping passage can be at least partially formed by a passage surface 454 that has a cross-sectional profile. In some cases, the cross-sectional profile can vary along the length of the elongated damping passage. In a other cases, however, the cross-sectional profile can be of an approximately uniform size, shape and configuration along the length of the elongated damping passage, such as is shown in FIGS. 7-10 and 16-18, for example. The cross-sectional profile is taken from an orientation that is normal, perpendicular or at least transverse to the spiral-like path of the elongated damping passage. That is, the cross-sectional profile is oriented transverse to axis AX and is substantially-continuously rotated about the axis with the cross-sectional profile substantially-continuously displaced radially outward from adjacent axis AX to form the spiral-like configuration. In a preferred arrangement, such rotation of the cross-sectional profile of passage surface 454 can occur in an approximately single plane such that the spiral-like configuration of elongated damping passage 448 is disposed in a common plane that is oriented transverse to longitudinal axis AX.

In some cases, the cross-sectional profile of passage surface 454 can be endless or otherwise fully enclosed. In such cases, the corresponding elongated damping passage can be substantially-entirely embedded within the end wall portion of the end member wall. In other cases, the cross-sectional profile of passage surface 454 can be open (i.e., not fully enclosed). In such cases, the corresponding elongated damping passage can be open along one or more surfaces of end wall portion 430 of end member wall 406. For example, the cross-sectional profile of passage surface 454 is shown as having an approximately U-shaped cross-sectional configuration. As such, elongated damping passage 448 is formed within end wall portion 430 of end member wall 406 as an open channel that is accessible from along surface 434 of the end wall portion. It will be appreciated, however, that other configurations and/or arrangements could alternately be used. For example, a cross-sectional profile in a C-shaped configuration could be used.

With reference, now, to gas damper assembly GD1, damper housing 500 is operatively engaged with end member 400 and at least partially defines a damping chamber 502 on, along and/or within at least a portion of end member 400. Additionally, damper housing 500 secured on or along end member 400 such that forces and loads acting on one of upper and lower structural components USC and LSC can be transmitted or otherwise communicated to the other of upper and lower structural components USC and LSC at least partially through gas spring and gas damper assembly AS1.

Damper housing 500 can include or be otherwise formed from any combination of one or more components and/or devices. For example, damper housing 500 can include a housing sleeve 504 that can be at least partially formed from a sleeve wall 506 that extends axially between opposing ends 508 and 510. Sleeve wall 506 can extend peripherally about axis AX and can, in some case, have an approximately uniform wall thickness. Additionally, in some cases, sleeve wall 506 can have an approximately circular cross-sectional profile such that the inner sleeve is approximately cylindrical in overall shape. It will be appreciated, however, that other configurations and/or arrangements could alternately be used. Additionally, sleeve wall 506 includes an outer surface 512 that extends substantially-continuously around and along housing sleeve 504. In a preferred arrangement, sleeve wall 506 is dimensioned to be received within inner cavity 420 of end member 400 with outer surface 512 disposed in facing relation to inside surface 418 of inner side wall portion 414. Sleeve wall 506 can also include an inner surface 514 that extends substantially-continuously around and along housing sleeve 504 and can at least partially define damping chamber 502.

As discussed above, gas spring and gas damper assembly AS1 is displaceable, during use in normal operation, between extended and compressed conditions. During such displacement pressurized gas flow between spring chamber 202 and damping chamber 502 through elongated damping passage 448 generates pressurized gas damping. In cases in which the cross-sectional profile of the elongated damping passage can be endless or otherwise fully enclosed such that the corresponding elongated damping passage is substantially-entirely embedded within the end wall portion of the end member wall. In other cases, the cross-sectional profile of elongated damping passage 448 can be open or otherwise not fully enclosed. In such cases, damper housing 500 can include an end plate 516 that can extend across and at least partially enclose elongated damping passage 448.

As shown in FIGS. 7-10 and 12, for example, end plate 516 can take the form of a substantially planar wall having an outer peripheral edge 518 and opposing side surfaces 520 and 522. End plate 516 can also include an inner peripheral edge 524 that at least partially defines a hole or opening 526 extending therethrough. In a preferred arrangement, hole 526 can be positioned approximately centrally on end plate 516 and can be dimensioned to receive and permit one or more components of gas damper assembly GD1 to extend through end wall portion 430, as discussed in greater detail below. End plate 516 can also include a passage or port 528 extending therethrough that is dimensioned for fluid communication with second end 452 of elongated damping passage 448. To aid in aligning port 528 with second end 452 of the elongated damping passage during assembly and maintaining such an alignment during use, end plate 516 can include one or more indexing or alignment features that operatively engage one or more other features and/or components of end member 400 and/or damper housing 500. For example, end member 400 could include one or more projections 456 or other indexing features that extend axially outwardly from along surface 434 of end wall portion 430. End plate 516 can include one or more indexing holes 530 that extend through the end plate and are cooperative with projections 456 to orient and align end plate 516 relative to end wall portion 430 of end member wall 406. Additionally, or as an alternative, one or more holes or openings could be included on or along the end wall portion of the end member wall, and one or more projections could be included on or along the end plate. In any case, cooperative engagement of alignment or indexing features (e.g., projections 456) of end member 400 with alignment or indexing features (e.g., indexing holes 530) of end plate 516 can aid in assembly and assist in ensuring that port 528 and second end 452 of elongated damping passage 448 are at least approximately aligned and in fluid communication with one another.

It will be appreciated that end plate 516 can be secured on or along surface 434 of end wall portion 430 of end member wall 406 in any suitable manner and/or through the use of any combination of one or more features and/or components. For example, end plate 516 can be disposed between end member 400 and housing sleeve 504 such that surface 520 is disposed in facing relation with surface 434 of end wall portion 430. In such case, end 508 of housing sleeve 504 can abuttingly engage the end plate along outer peripheral edge 518 to retain the end plate in position relative to the end wall portion of the end member wall.

Additionally, or in the alternative, damper housing 500 can include a support ring 532 that can be secured on or along end wall portion 430 of end member wall 406 in operative engagement with end plate 516 to at least partially retain the end plate on or along surface 434 of the end wall portion. Support ring 532 can include an annular wall with a first outer surface portion 534 having a first cross-sectional size or dimension that is cooperative with passage 444 in end wall portion 430 of end member wall 406. Support ring 532 can also include a second outer surface portion 536 that is spaced axially from the first outer surface portion and has a second cross-sectional size or dimension that is greater than the first cross-sectional size or dimension of first outer surface portion 534 such that a shoulder surface portion 538 extends radially therebetween.

Support ring 532 can be installed on end wall portion 430 of end member wall 406 with first outer surface portion 534 at least partially disposed within passage 444 and can be secured on the end wall portion in any suitable manner, such as by way of a threaded connection, a press-fit connection and/or a flowed-material joint, for example. In such case, support ring 532 can at least partially secure end plate 516 on or along end wall portion 430. For example, first outer surface portion 534 can extend through opening 526 in end plate 516 such that shoulder surface portion 538 can abuttingly engage the end plate along inner peripheral edge 524. Support ring 532 can also include an inner surface 540 that at least partially defines a passage or opening 542 extending through support ring 532 between opposing end surfaces 544 and 546. In an installed condition, passage 542 dimensioned to receive and permit one or more components of gas damper assembly GD1 to extend through end wall portion 430, as discussed in greater detail below.

In cases in which the cross-sectional profile of passage surface 454 is open or otherwise not fully enclosed, it may be desirable substantially inhibit or at least reduce pressurized gas transfer between adjacent rings or other sections of elongated damping passage 448 along surface 434. It will be appreciated that inhibiting or at least reducing such undesirable pressurized gas transfer may promote pressurized gas flow along elongated damping passage 448 and, thus, provide improved gas damping performance. It will be appreciated that such undesirable pressurized gas transfer can be inhibited or otherwise reduced in any suitable manner and through the use of any suitable components, features and/or elements. As one example, one or more sealing elements could be disposed between surface 434 of end wall portion 430 and surface 520 of end plate 516 to at least partially form a substantially fluid-tight seal therebetween. As another example, a flowed material joint could be formed between the surface of the end wall portion and the surface of the end plate. Such sealing arrangements are collectively schematically represented in FIG. 8 by dashed lines 548.

With reference, now, to FIGS. 2-7, 9, 11 and 19-22, damper housing 500 can also include an end cap 550 operatively disposed along end 510 of housing sleeve 504 and secured thereto such that gas spring and gas damper assembly AS1 can function to transfer forces and loads between upper and lower structural components USC and LSC, as discussed above. End cap 550 can be configured to secure gas spring and gas damper assembly AS1 on or along an associated structural component, such as lower structural component LSC, for example. It will be appreciated any suitable combination of feature, elements and/or components can be used to form such a connection. As one example, the end cap can include a spherical bearing or other similar component operatively connected between the end cap mount and the associated structural component (e.g., lower structural component LSC). As another example, end cap 550 can include an end cap wall 552 that includes a passage (not numbered) formed therethrough generally transverse to axis AX. End cap wall 552 can function as an outer support element and an inner support element 554 can be disposed within the passage. An elastomeric connector element 556 can be permanently attached (i.e., inseparable without damage, destruction or material alteration of at least one of the component parts) between end cap wall 552 and inner support element 554 to form an elastomeric bushing 558 suitable for pivotally mounting assembly AS1 on or along the associated structural component.

End cap wall 552 can include a base wall portion 560 oriented approximately transverse to axis AX and a side wall portion 562 that extends axially from along base wall portion 560 toward a distal edge 564. Base wall portion 560 can have a base surface 566 and side wall portion 562 can have an inner side surface 568. Base wall portion 560 and side wall portion 562 can at least partially define an end cap cavity 570 that is dimensioned to receive end 510 of housing sleeve 504 with outer surface 512 disposed in facing relation to inner side surface 568 of side wall portion 562. In some cases, damper housing 500 can also include an end plate 572 in the form of a substantially planar wall having an outer peripheral edge 574 and opposing side surfaces 576 and 578. It will be appreciated that end plate 572 can be secured on or along end cap 550 in any suitable manner and/or through the use of any combination of one or more features and/or components. For example, end plate 572 can be disposed between end cap 550 and housing sleeve 504 such that side surface 578 is disposed in facing relation with base surface 566 of end cap wall 552. In such case, end 510 of housing sleeve 504 can abuttingly engage end plate 572 along outer peripheral edge 574 to retain the end plate in position relative to end cap wall 552 of the end cap.

In a preferred arrangement, spring chamber 202 and damping chamber 502 are in fluid communication with one another through elongated damping passage 448 and any associated ports or passages. As such, it may be desirable to maintain spring chamber 202 and damping chamber 502 in fluidic isolation with respect to an external atmosphere ATM. In such cases, gas damper assembly GD1 substantially fluid-tight seals can be formed in any suitable manner between end member 400 and components of the gas damper assembly and/or between two or more components of gas damper assembly GD1. For example, one or more sealing elements 580 can be fluidically disposed between inner side wall portion 414 of end member wall 406 and housing sleeve 504 such that a substantially fluid-tight seal is formed therebetween. It will be appreciated that sealing elements 580 can be secured on, along or otherwise between such components in any suitable manner. For example, one or more annular grooves 582 can extend into inner side wall portion 414 from along inside surface 418 thereof that are dimensioned to receive and retain the sealing elements. As another example, one or more sealing elements 584 can be fluidically disposed between side wall portion 562 of end cap wall 552 and housing sleeve 504 such that a substantially fluid-tight seal is formed therebetween. It will be appreciated that sealing elements 584 can be secured on, along or otherwise between such components in any suitable manner. For example, one or more annular grooves 586 can extend into side wall portion 562 from along inner side surface 568 thereof that are dimensioned to receive and retain the sealing elements.

Additionally, end cap wall 552 can include one or more passages 588 formed therethrough. Passages 588 can be oriented in approximate alignment with axis AX. Additionally, in a preferred arrangement, passages 588 can be disposed in approximate alignment with securement devices 428 of boss wall portions 426 on end member 400. In such case, securement devices 590 (e.g., threaded fasteners) can extend through passages 588 and into engagement with securement devices 428 to attach and secure end cap 550 on or along at least one of end member 400 and housing sleeve 504.

In some cases, one or more jounce bumpers can be included to inhibit contact between one or more features and/or components of assembly AS1. For example, a jounce bumper 592 can be disposed within a portion of damping chamber 502, such as by securement on or along second outer surface portion 536 of support ring 532, for example, to substantially inhibit contact between a component of damper rod assembly 600 and one or more of end member 400, end plate 516 and support ring 532 during a full rebound condition of assembly AS1. Additionally, or in the alternative, a jounce bumper 594 can be disposed within a portion of damping chamber 502, such as by securement on or along a component of damper rod assembly 600, for example, to substantially inhibit contact between components of the damper rod assembly and end cap 550 and/or end plate 572 during a full jounce condition of assembly AS1.

Damper rod assembly 600 includes an elongated damper rod 602 and a damper piston 604. Damper rod 602 extends longitudinally from an end 606 to an end 608. End 606 of damper rod 602 can include a securement feature dimensioned for operatively connecting the damper rod on or along end member 300. As one example, damper rod 602 can include one or more helical threads disposed along end 606. Damper piston 604 can be disposed along end 608 of damper rod 602 and can be attached or otherwise connected thereto in any suitable manner. For example, the damper piston could be integrally formed with the damper rod. As another example, end 608 of damper rod 602 could include a securement feature, such as one or more helical threads, for example. In such case, damper piston 604 could be provided separately and could include a passage or hole (not numbered) into which end 608 of damper rod 602 can be secured.

In a preferred arrangement, a blind passage or hole can be used to assist in maintaining fluidic isolation across damper piston 604.

In an assembled condition, damper rod assembly 600 is disposed along gas spring assembly GS1 such that damper piston 604 is received within damping chamber 502 of damper housing 500. In such case, damper rod 602 can extend through the passage 542 formed by support ring 532 and such that end 606 of damper rod 602 is disposed out of damping chamber 502. In such cases, support ring 532 can function as a bearing or bushing element operative to reduce frictional engagement on or along damper rod 602. In some cases, a sealing element (not shown) and/or a wear bushing (not shown) can optionally be included on or along the support ring.

Additionally, it will be appreciated that damper piston 604 separates damping chamber 502 into damping chamber portions 502A and 502B disposed along opposing sides of the damper piston. In some cases, a sealing element 610 can be disposed between an outer peripheral wall 612 of damper piston 604 and inner surface 514 of housing sleeve 504. It will be recognized, however, that in some cases significant frictional forces may be generated by the sealing arrangements described above in connection with the interface between damper piston 604 and inner surface 514 as well as in connection with the interface between an outer surface 614 of damper rod 602 and support ring 532. In some cases, it may be desirable to avoid or at least reduce such frictional forces (or for other reasons) by forgoing the use of sealing elements along either or both interfaces. In such cases, one or more friction reducing bushings or wear bands can, optionally, be disposed therebetween. Furthermore, in some cases, damper rod 602 can take the form of a hollow rod that includes an inner surface 616.

It will be appreciated, that the movement of associated structural components relative to one another, as described above, can be due to variations in load conditions and/or result from road inputs and/or other impact conditions (e.g., jounce conditions), as is well understood by those of skill in the art. Additionally, it will be recognized and appreciated that gas spring and gas damper assemblies, such as assembly AS1, for example, and/or components thereof will typically move relative to one another in a curvilinear, rotational, arcuate, angular or other non-linear manner. As such, a pivotal mount, such as elastomeric bushing 558, for example, can be used to permit some movement of gas spring and gas damper assembly AS1 relative to lower structural component LSC. In many cases, a gas spring is also capable of accommodating non-linear movement of the upper and lower structural components relative to one another. However, in constructions in which an elongated damping rod or other similar component extends through the spring chamber and operatively connects the end members of the gas spring, a mounting assembly can be included that permits pivotal motion between at least one of the end members and the elongated damping rod to accommodate the non-linear movement of the associated structural components relative to one another.

One example of an end mount assembly 700 is shown in FIGS. 7 and 9 as being secured along end member 300 and operatively connected to end 606 of elongated damper rod 602. End mount assembly 700 can include a mounting bracket 702 that can be secured on or along end member 300 in a suitable manner. For example, mounting bracket 702 can operatively engage section 322 of mounting studs 312 and can be secured thereon by suitable securement devices, such as threaded fasteners 704 operatively engaging helical threads 324, for example. Mounting bracket 702 can at least partially define a mounting cavity 706 with end member 300. End mount assembly 700 can also include an inner mounting element 708 dimensioned for securement on or along end 606 of damper rod 602. It will be appreciated that inner mounting element 708 can be of any suitable size, shape and/or configuration. As one example, inner mounting element 708 can include an element wall 710 with a connector portion 712 dimensioned for securement to the damper rod and a flange portion 714 projecting radially outward from connector portion 712. Flange portion 714 has a first side 716 facing toward connection portion 712 and a second side 718 facing away from the connector portion and toward end member 300.

End mount assembly 700 can include a first plurality of bushing elements 720 disposed along first side 716 of flange portion 714 of the inner mounting element. In a preferred arrangement, bushing elements 720 are disposed in peripherally-spaced relation to one another about axis AX and/or about first side 716 of flange portion 714. End mount assembly 700 can also include a second plurality of bushing elements 722 disposed along second side 718 of flange portion 714 of the inner mounting element. Again, in a preferred arrangement, bushing elements 722 are disposed in peripherally-spaced relation to one another about axis AX and/or about second side 718 of the flange portion of the inner mounting element. In a preferred arrangement, a common quantity of bushing elements 720 and 722 can be used with the bushing elements disposed in an approximately uniform spacing or pattern about axis AX and/or along the respective side of the flange portion of inner mounting element 708. Additionally, in a preferred arrangement, bushing elements 720 and 722 can be arranged on opposing sides of flange portion 714 in an interleaved or otherwise alternating pattern or configuration with respect to one another. It will be appreciated, however, that other configurations and/or arrangements could alternately be used.

In some cases, end mount assembly 700 can, optionally, include a third plurality of bushing elements 724 disposed along one side of the flange portion of the inner mounting element. In the arrangement shown in FIGS. 7 and 9, for example, bushing elements 724 are disposed along second side 718 of flange portion 714. Bushing elements 724 are shown as being disposed in peripherally-spaced relation with one another about axis AX and/or along the second side of the flange portion. Additionally, bushing elements 724 are shown as being positioned radially inward relative to bushing elements 722 with bushing elements 724 interleaved or otherwise disposed between adjacent ones of bushing elements 722.

It will be appreciated that bushing elements 720 and 722 as well as bushing elements 724, if included, can be formed from any suitable material or combination of materials. In a preferred arrangement, bushing elements 720 and 722 as well as bushing elements 724, if included, can be formed from an elastomeric material, such as a natural rubber, a synthetic rubber and/or a thermoplastic elastomer. As one example, such an elastomeric material could have a Shore A durometer within a range of approximately 50 to approximately 90.

It will be appreciated that bushing elements 720 and 722 as well as bushing elements 724, if included, can be secured on or along flange portion 714 of inner mounting element 708 in any suitable manner. In some cases, one or more of the bushing elements can be removably attached to the flange portion of the inner mounting element. In a preferred arrangement, however, some or all of bushing elements 720 and 722 as well as bushing elements 724, if provided, can be permanently attached (i.e., inseparable without damage, destruction or material alteration of at least one of the component parts) to flange portion 714. It will be appreciated that such permanent joints or connections can be formed by way of any one or more processes and/or can include the use of one or more treatments and/or materials. Non-limiting examples of suitable processes can include molding, adhering, curing and/or vulcanizing processes.

In some cases, bushing elements 720 and 722 as well as bushing elements 724, if included, can be disposed within one or more pockets or recesses formed within the inner mounting element. In such cases, the combination of bushing elements and recess walls can be configured to provide a desired combination of spring rate, deflection and/or other performance characteristics. In the arrangement shown in FIGS. 7 and 9, inner mounting element 708 can include a first plurality of recesses 726 that extend into flange portion 714 from along first side 716. In a preferred arrangement, recesses 726 are dimensioned to receive and engage bushing elements 720. Additionally, or in the alternative, inner mounting element 708 can include a second plurality of recesses 728 can extend into flanged portion 714 from along second side 718. In a preferred arrangement, recesses 728 are dimensioned to receive and engage bushing elements 722.

Additionally, in a preferred arrangement, the quantity of recesses 726 and 728 can, at a minimum, correspond to the quantity of bushing elements 720 and 722 included in end mount assembly 700. Furthermore, recesses 726 and 728 can be disposed in an approximately uniform spacing or pattern about axis AX and/or along the respective side of the flange portion of inner mounting element 708. Further still, in a preferred arrangement, recesses 726 and 728 can be arranged on opposing sides of flange portion 714 in an interleaved or otherwise alternating pattern or configuration with respect to one another, as discussed above in connection with bushing elements 720 and 722. It will be appreciated, however, that other configurations and/or arrangements could alternately be used.

During use, end mount assembly 700 can permit damper rod 602 to pivot or otherwise move by displacing inner mounting element 708 relative to mounting bracket 702. Such movement of inner mounting element 708 can compress one or more of bushing elements 720 into abutting engagement with mounting bracket 702 and can urge one or more of bushing elements 722 into abutting engagement with end member 300. As displacement of inner mounting element 708 by damper rod 602 increases, bushing elements 720 and 722 begin to compress. As the compression continues to increase, one or more of bushing elements 724 can also contact end member 300 thereby increasing the spring rate and/or reducing further deflection of inner mounting element relative to mounting bracket 702.

Figure 23:
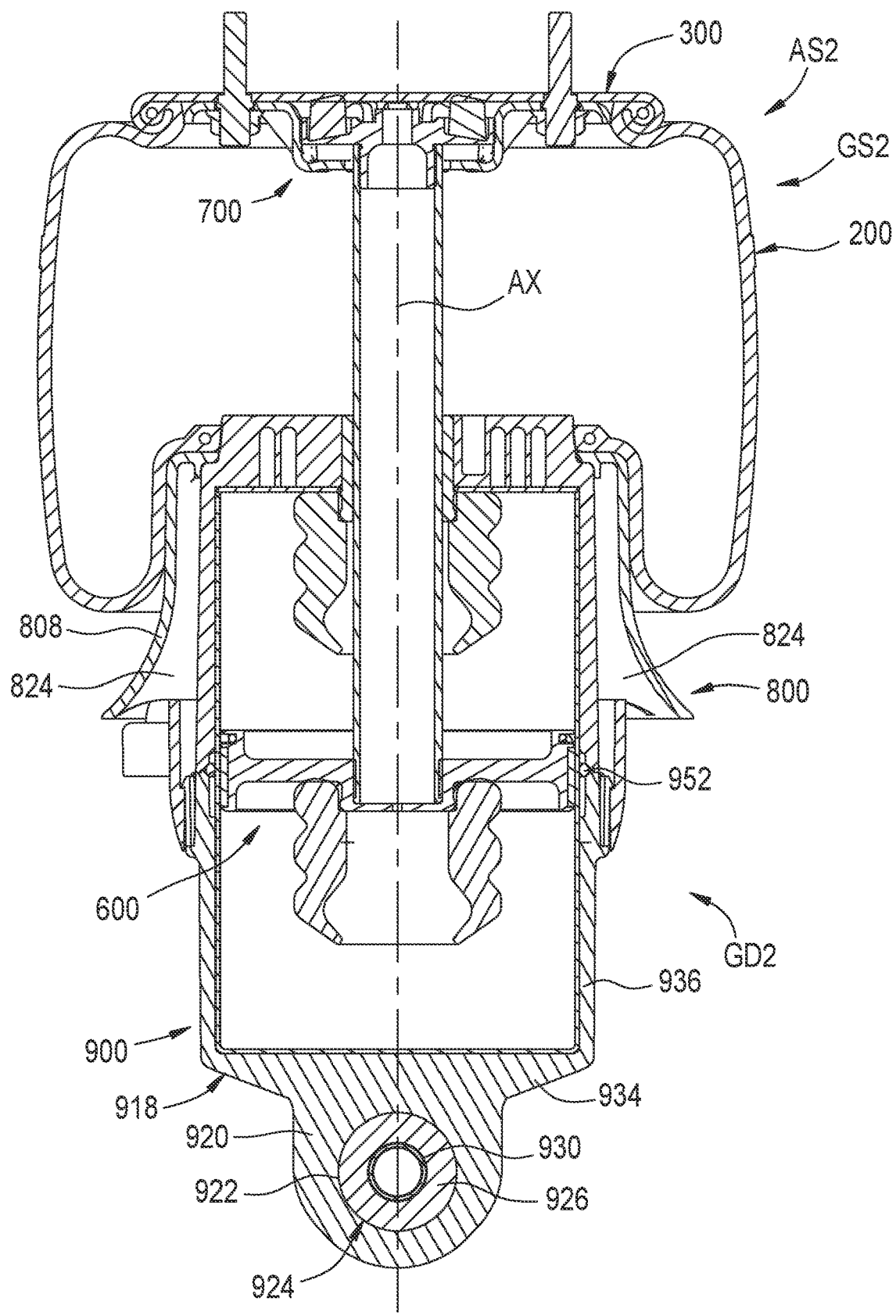
FIG. 23 is a cross-sectional side view of another example of a gas spring and gas damper assembly.
Figure 24:
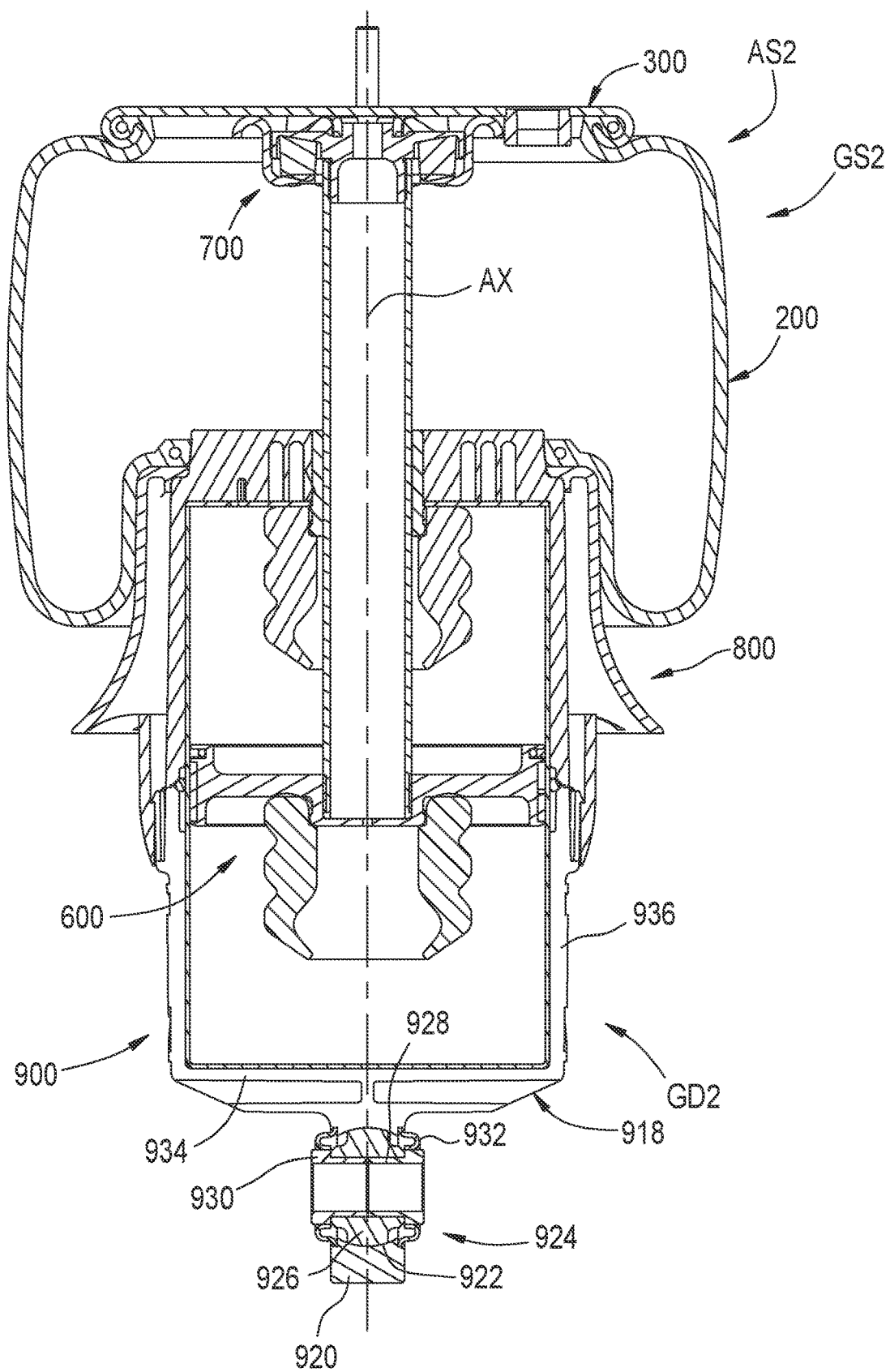
FIG. 24 is a perpendicular cross-sectional side view of the exemplary gas spring and gas damper assembly in FIG. 23.
Figure 25:
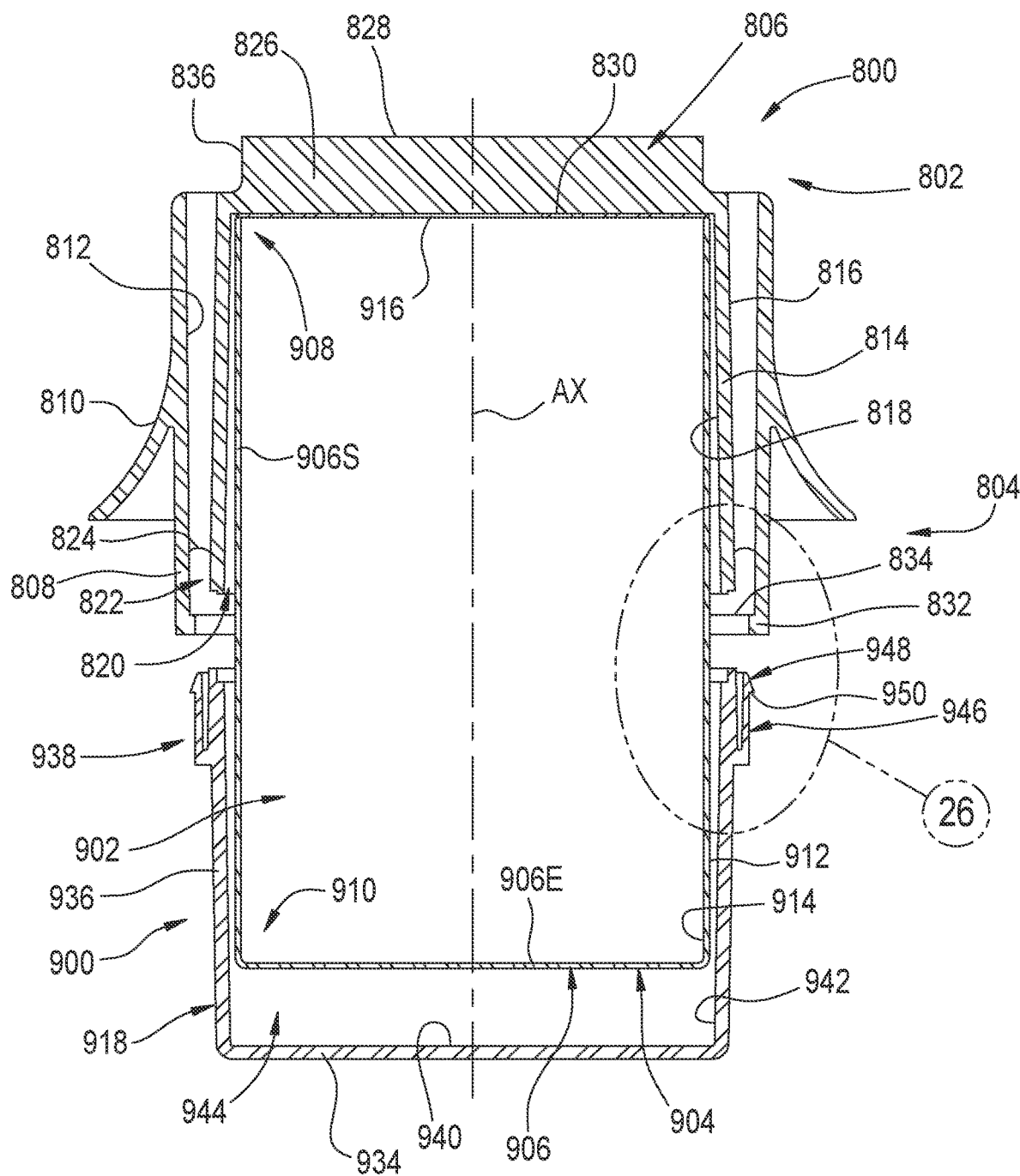
FIG. 25 is a cross-sectional side view of an end member assembly such as in FIGS. 23 and 24, shown prior to assembly.
Figure 26:
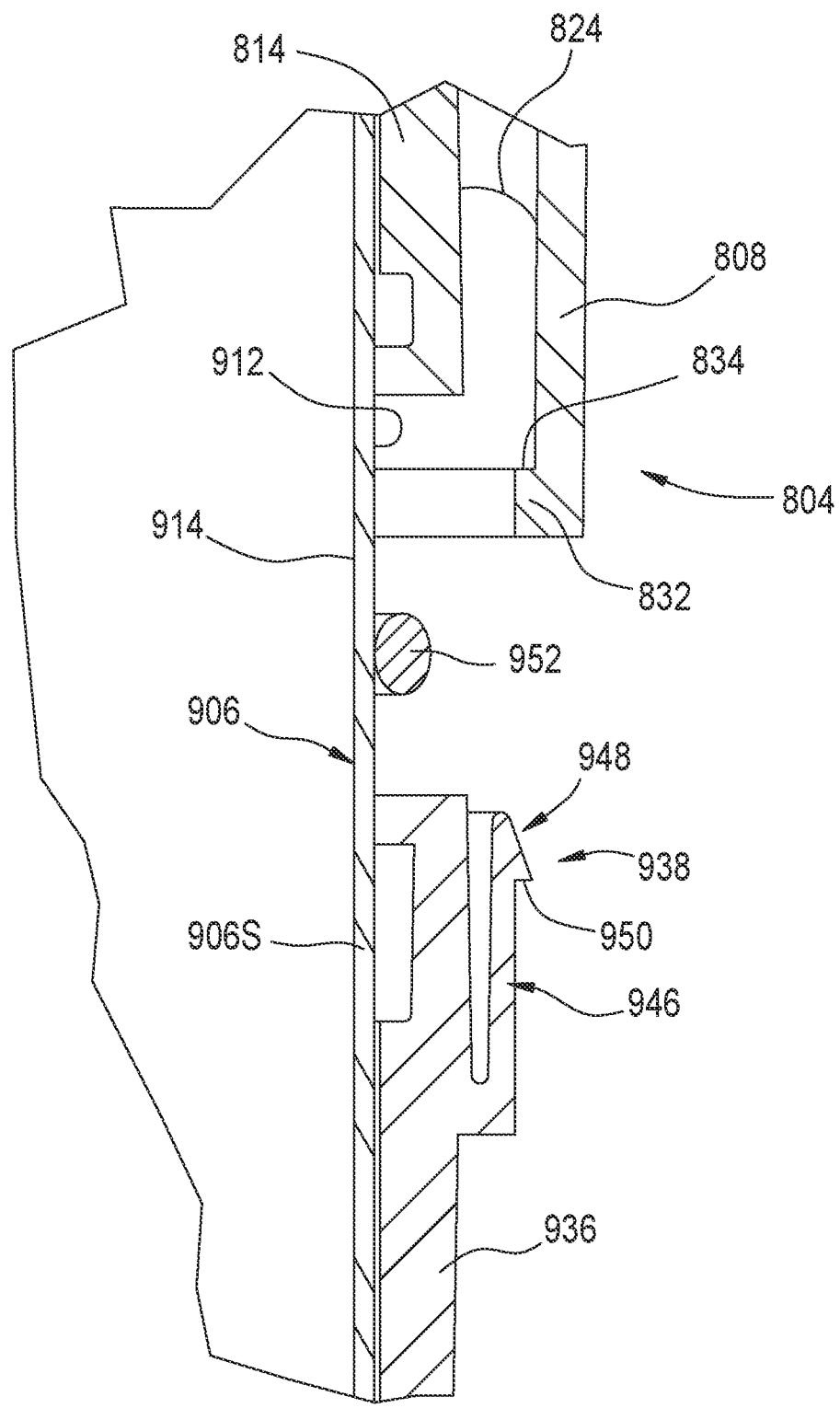
FIG. 26 is an enlarged view of the portion of the end member assembly in FIGS. 23-25 identified as Detail 26 in FIG. 25.
Figure 27:
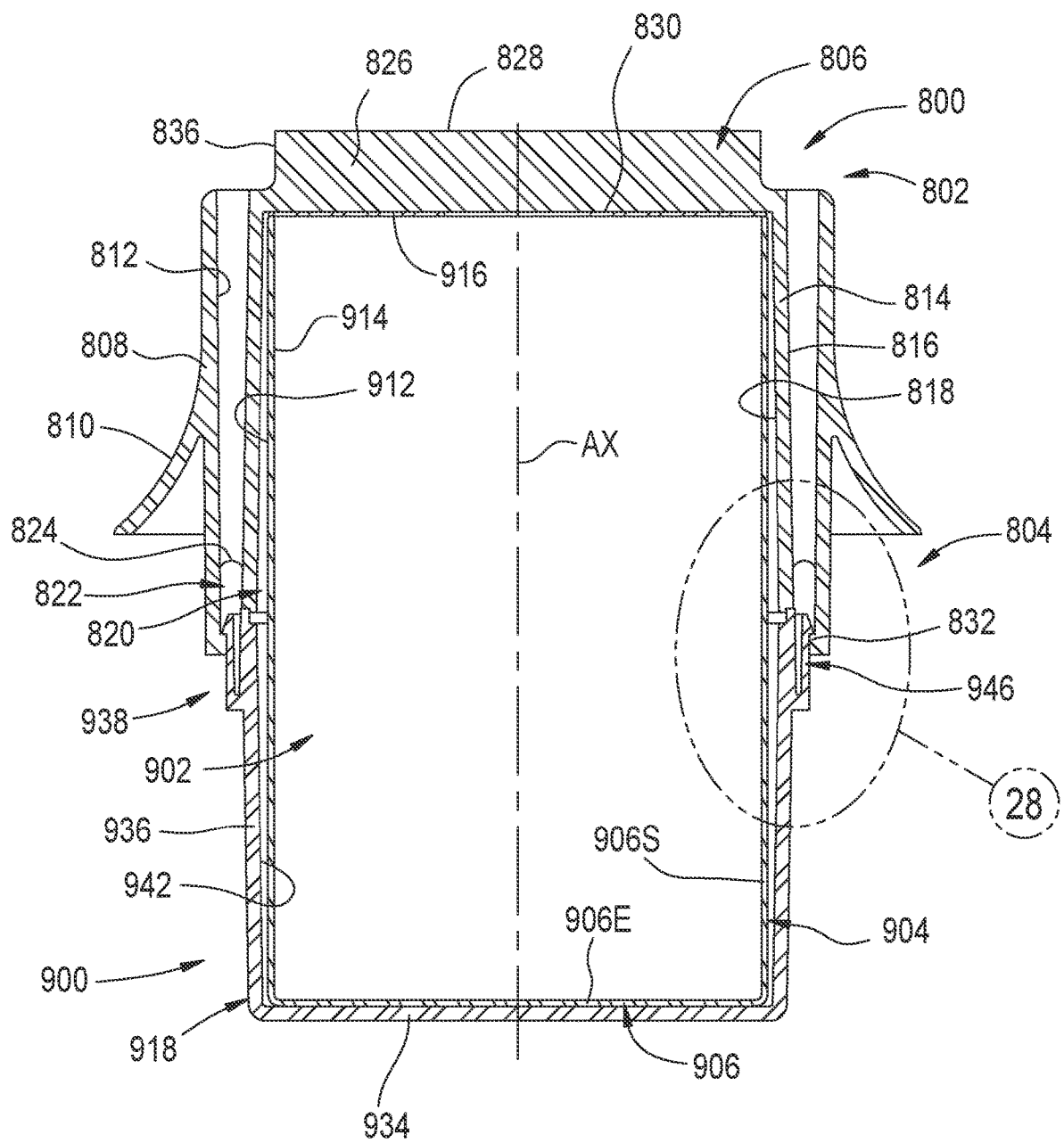
FIG. 27 is a cross-sectional side view of the end member assembly in FIGS. 23-26 shown in an assembled condition.
Figure 28:
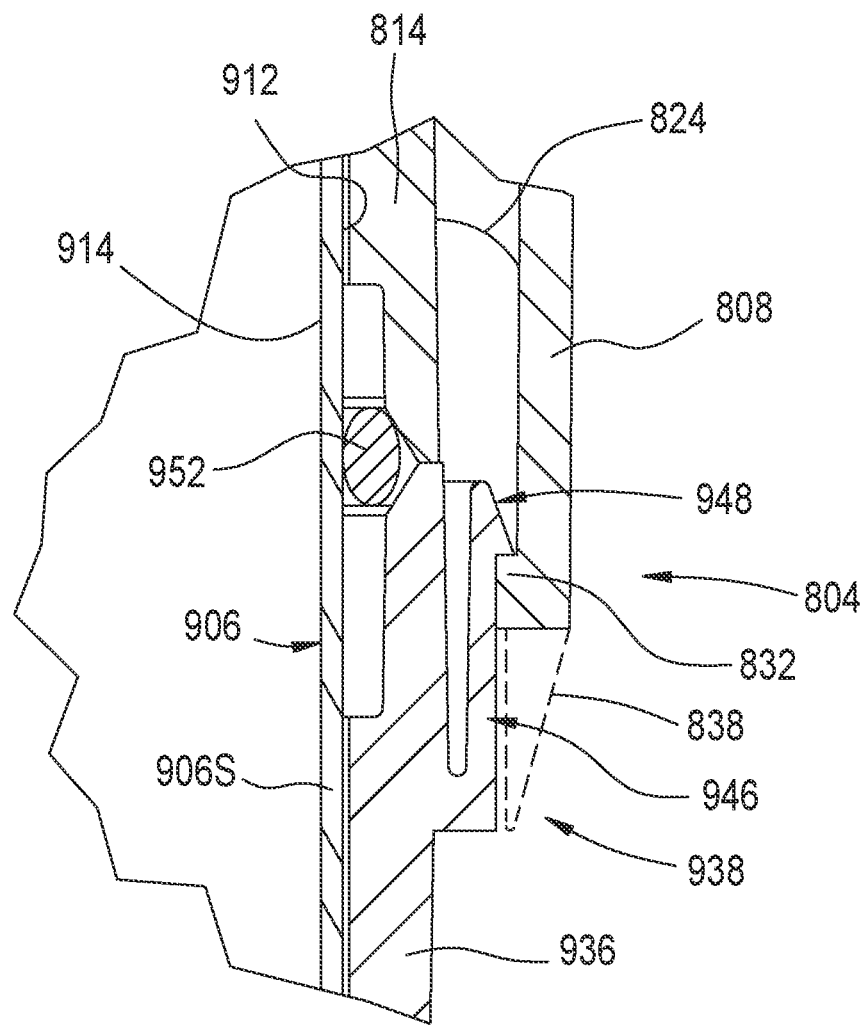
FIG. 28 is an enlarged view of the portion of the end member assembly in FIGS. 23-27 identified as Detail 28 in FIG. 27.
Figure 29:
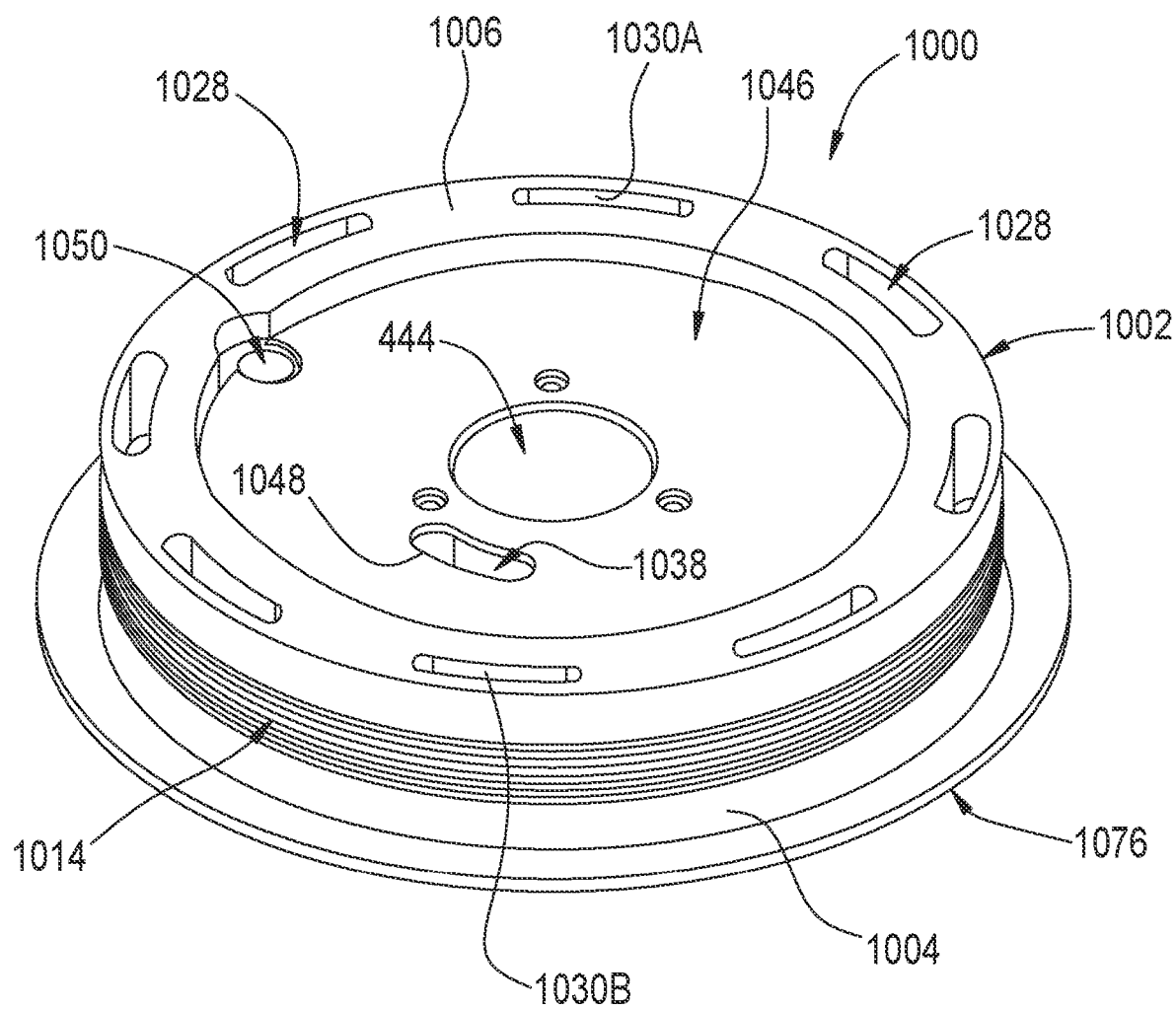
FIG. 29 is a top perspective view of one example of an inertia-actuated valve assembly in accordance with the subject matter of the present disclosure dimensioned for use in operative association with an end member of a gas spring and gas damper assembly.
Figure 30:
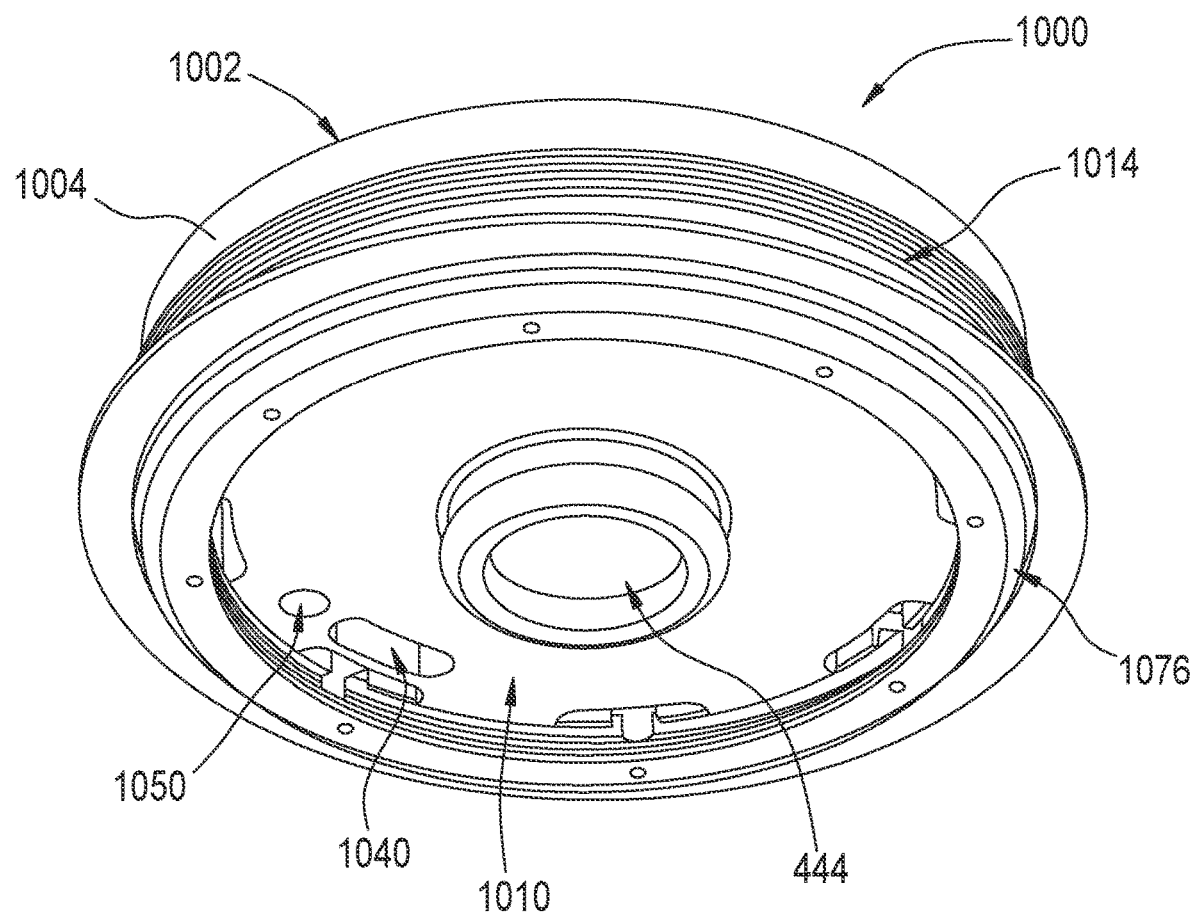
FIG. 30 is a bottom perspective view of the exemplary valve assembly shown in FIG. 29.
Figure 31:
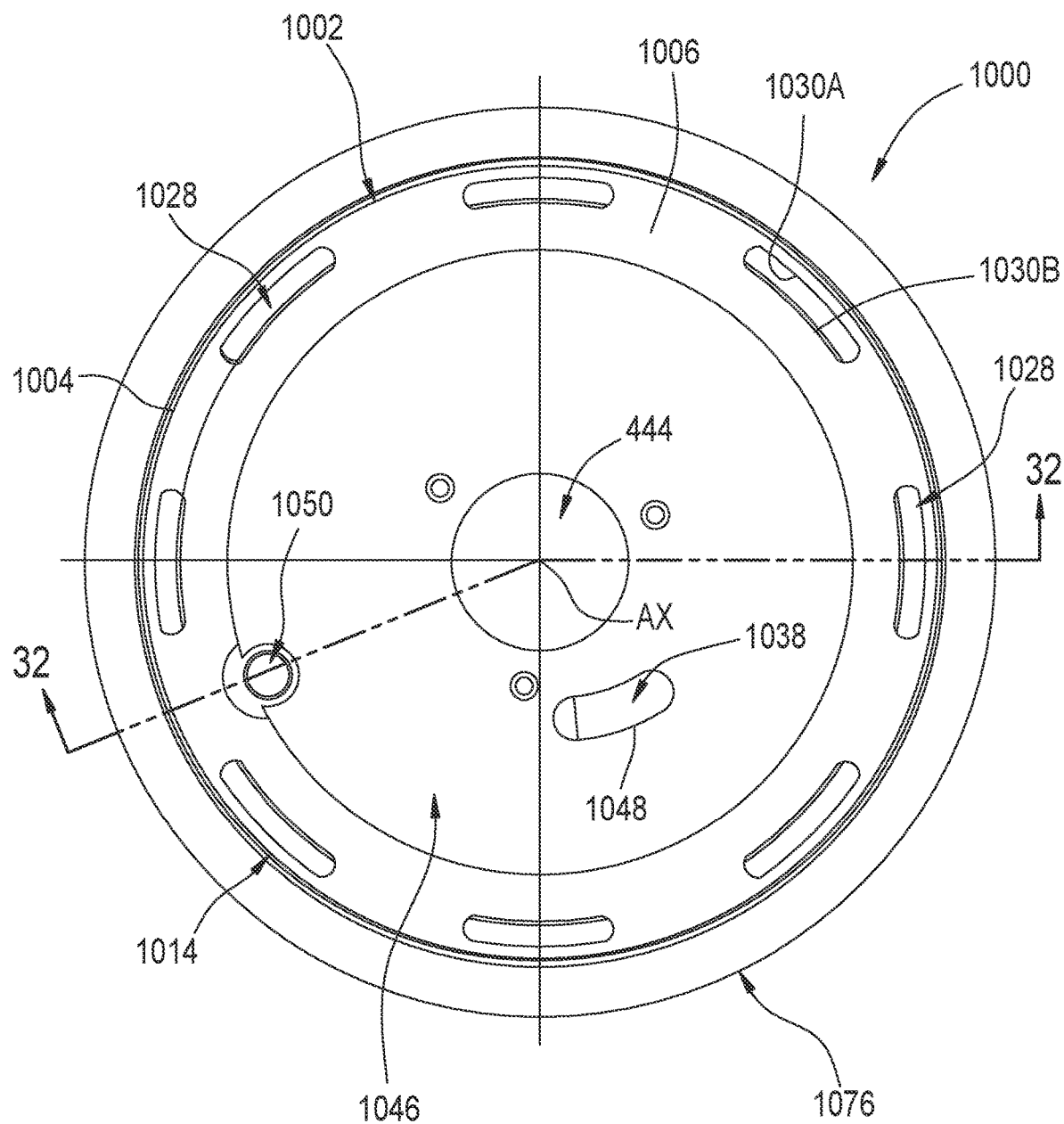
FIG. 31 is a top plan view of the exemplary valve assembly shown in FIGS. 29 and 30.

Another example of a gas spring and gas damper assembly AS2, such as may be suitable for use as one or more of gas spring and gas damper assemblies 102 in FIG. 1, for example, is shown in FIGS. 23-28. Gas spring and gas damper assembly AS2 is shown as including a gas spring (or gas spring assembly) GS2, such as may correspond to one of gas springs 104 in FIG. 1, for example, and a gas damper (or gas damper assembly) GD2, such as may correspond to one of gas dampers 106 in FIG. 1, for example. Gas spring assembly GS2 and gas damper assembly GD2 can be operatively secured to one another and fluidically coupled with one another in any suitable manner, such as is described hereinafter, for example. A longitudinal axis AX extends lengthwise along assembly AS2, as shown in FIGS. 23 and 24.

Gas spring assembly GS2 can include a flexible spring member 200, such as has been previously described in detail, that can extend peripherally around axis AX and can be secured between opposing end members (or end member assemblies) 300, such as has been previously described in detail, and 800 in a substantially fluid-tight manner such that a spring chamber 202 is at least partially defined therebetween. Gas damper assembly GD2 can include a damper housing 900 that is operatively supported on or along end member 800 and a damper rod assembly 600, such as has been previously described in detail, that is operatively associated with damper housing 900. An end mount 700, such as has been previously described in detail, can operatively connect damper rod assembly 600 with end member 300.

End member 800 can extend lengthwise between opposing ends 802 and 804 that are axially spaced from one another. End member 800 can include an end member wall 806 that can have a first or outer side wall portion 808 that extends in a generally axial direction and includes an outside surface 810 and an inside surface 812. End member 800 can also include a second or inner side wall portion 814 that also extends in a generally axial direction. Inner side wall portion 814 is spaced radially inward from outer side wall portion 808 and includes an outside surface 816 and an inside surface 818. In a preferred arrangement, inside surface 818 of inner side wall portion 814 can at least partially define an inner cavity 820 within end member 800.

In the arrangement shown in FIGS. 23-28, end member 800 includes an outer cavity 822 extending into the end member between inside surface 812 of outer side wall portion 808 and outside surface 816 of inner side wall portion 814. In some cases, one or more support wall portions 824 can extend between and operatively interconnect the outer and inner side wall portions. End member wall 806 can also include an end wall portion 826 that can extend across and/or between any combination of one or more of outer side wall portion 808, inner side wall portion 814 and/or support wall portions 824. End wall portion 826 can be oriented transverse to axis AX and can at least partially form a closed end of inner cavity 820 of the end member. Additionally, end wall portion 826 can include opposing surfaces 828 and 830. End member wall 806 can also include one or more engagement features disposed on or along end member 800, such as along end 804 thereof. As one example, one or more receiver wall portions 832 can extend radially inward from along outer side wall portion 808 adjacent end 804. It will be appreciated that in some constructions a single, annular receiver wall portion could be provided. Alternately, a plurality of peripherally-spaced receiver wall portions could be included. In either case, the one or more receiver wall portions can at least partially define a retaining shoulder or shoulder surface portion 834 oriented transverse to axis AX and facing toward end 802 of end member 800.

As indicated above, it will be appreciated that the one or more end members of the gas spring and gas damper assembly can be operatively connected or otherwise secured to the flexible spring member in any suitable manner. In the case of end member 800, end member wall 806 can, for example, include an outer mounting surface 836 that extends peripherally about axis AX and is dimensioned to receive mounting bead 216 disposed along end 208 of the flexible wall 204 such that a substantially fluid-tight seal can be formed therebetween, such as has been described above. In an assembled condition, outer surface 210 of flexible wall 204 can be disposed in abutting engagement with outside surface 810 of outer side wall portion 808. In such an arrangement, flexible wall 204 of flexible spring member 200 can form a rolling lobe 220 along outside surface 810 of outer side wall portion 808. As gas spring and gas damper assembly AS2 is displaced between compressed and extended conditions, rolling lobe 220 can be displaced along outer surface 810 in a generally conventional manner.

With reference, now, to gas damper assembly GD2, damper housing 900 is operatively engaged with end member 800 and at least partially defines a damping chamber 902 on, along and/or within at least a portion of end member 800. Additionally, damper housing 900 can be secured on or along end member 900 such that forces and loads acting on one of upper and lower structural components USC and LSC can be transmitted or otherwise communicated to the other of upper and lower structural components USC and LSC at least partially through gas spring and gas damper assembly AS2.

Damper housing 900 can include or be otherwise formed from any combination of one or more components and/or devices. For example, damper housing 900 can include a housing sleeve 904 that can be at least partially formed from a sleeve wall 906 that extends axially between opposing ends 908 and 910. Sleeve wall 906 can include a side wall portion 906S that extends peripherally about axis AX and an end wall portion 906E that is oriented transverse to axis AX. In a preferred arrangement, side wall portion 906S can at least partially define an opening (not numbered) along end 908 and end wall portion 906E can substantially-entirely close end 910 of the housing sleeve. Additionally, in some cases, side wall portion 906E can have an approximately circular cross-sectional profile such that the inner sleeve is approximately cylindrical in overall shape. It will be appreciated, however, that other configurations and/or arrangements could alternately be used. Additionally, side wall portion 906S of sleeve wall 906 can include an outer surface 912 that extends substantially-continuously around and along housing sleeve 904. In a preferred arrangement, at least side wall portion 906S of sleeve wall 906 can be dimensioned to be received within inner cavity 820 of end member 800 with outer surface 912 disposed in facing relation to inside surface 818 of inner side wall portion 814. Side wall portion 906S of sleeve wall 906 can also include an inner surface 914 that extends substantially-continuously around and along housing sleeve 904 and can at least partially define damping chamber 902.

As discussed above in connection with assembly AS1, gas spring and gas damper assembly AS2 is displaceable, during use in normal operation, between extended and compressed conditions. During such displacement pressurized gas flow between spring chamber 202 and damping chamber 902 through an elongated damping passage, such as passage 448 described above, can generate pressurized gas damping. In cases in which the cross-sectional profile of the elongated damping passage can be endless or otherwise fully enclosed such that the corresponding elongated damping passage is substantially-entirely embedded within the end wall portion of the end member wall. In other cases, the cross-sectional profile of the elongated damping passage can be open or otherwise not fully enclosed. In such cases, damper housing 900 can include an end plate 916 that can extend across and at least partially enclose the elongated damping passage, such as has been described above in detail in connection with end member 400 and damper housing 500.

Damper housing 900 can also include a base 918 operatively disposed along end 910 of housing sleeve 904 and secured to end member 800 such that gas spring and gas damper assembly AS2 can function to transfer forces and loads between upper and lower structural components USC and LSC, as discussed above. Base 918 can be configured to secure gas spring and gas damper assembly AS2 on or along an associated structural component, such as lower structural component LSC, for example. It will be appreciated any suitable combination of feature, elements and/or components can be used to form such a connection. As one example, base 918 can include a base wall portion 920 that includes a pivotal mounting surface portion 922 that at least partially defines a passage (not numbered) formed through base wall portion 920 that is oriented generally transverse to axis AX. In a preferred arrangement, base wall portion 920 is formed from a material that has properties sufficient for pivotal mounting surface portion 922 to function as an outer race for a spherical bearing assembly 924 formed along base 918. In which case, a spherical bearing element 926 can be disposed within the passage formed by pivotal mounting surface portion 922. Spherical bearing element 926 can include an outer surface portion (not numbered) disposed in abutting engagement with pivotal mounting surface portion 922 and an inner surface portion 928 that at least partially defines a passage through the spherical bearing element. In some cases, spherical bearing assembly 924 can, optionally, include inner support elements 930 and/or sealing elements 932 disposed in operative association with spherical bearing element 926.

Base 918 can include an end wall portion 934 oriented approximately transverse to axis AX and a side wall portion 936 that extends axially from along end wall portion 934 toward a distal edge 938. End wall portion 934 can have an end surface 940 and side wall portion 936 can have an inner side surface 942. End wall portion 934 and side wall portion 936 can at least partially define a base cavity 944 that is dimensioned to receive end 910 of housing sleeve 904 with outer surface 912 disposed in facing relation to inner side surface 942 and end wall portion 906E facing toward end surface 940 of end wall portion 934. In a preferred arrangement, base 918 can include one or more securement features disposed on or along side wall portion 936 toward distal edge 938 thereof that are operative to engage and secure base 918 on or along end member 800. As one example, one or more retaining fingers 946 can project axially from along side wall portion 936 toward a cantilevered free end 948 having shoulder or shoulder surface portion 950 dimensioned to abuttingly engage shoulder surface portions 834 of receiver wall portions 832 of end member 800.

In some cases, a plurality of retaining fingers 946 can be used, such as may be disposed in peripherally-spaced relation to one another about longitudinal axis AX, for example. In an assembled condition of end member 800 and base 918, the end member and the base can be oriented in approximate alignment with one another (e.g., in approximately coaxial relation). Additionally, in an assembled condition, the end member and base can be positioned relative to one another in an axial direction such that such that receiver wall portion(s) 832 and retaining finger(s) 946 are axially co-extensive with one another. In this manner, the end member and the base can be secured together in an assembled condition in which inner cavity 820 and base cavity 944 at least partially form an assembly cavity (not numbered) that can be substantially contiguous and within which housing sleeve 904 can be substantially entirely encapsulated or otherwise contained. In some cases, outer side wall portion 808 of end member 800 can include a protective skirt wall portion 838 (FIG. 28) that extends axially beyond receiver wall portions 832 a distance sufficient to at least partially cover retaining fingers 946, such as to substantially inhibit inadvertent biasing of the retaining fingers in a radially inward direction.

In a preferred arrangement, spring chamber 202 and damping chamber 902 are in fluid communication with one another through the elongated damping passage (e.g., passage 448) and any associated ports or passages. As such, it may be desirable to maintain spring chamber 202 and damping chamber 902 in fluidic isolation with respect to an external atmosphere ATM. In such cases, gas damper assembly GD2 can include one or more substantially fluid-tight seals that can be formed in any suitable manner between end member 800 and components of the gas damper assembly and/or between two or more components of gas damper assembly GD2. For example, one or more sealing elements 952 can be fluidically disposed between inner side wall portion 814 of end member wall 806, side wall portion 936 of base 918 and/or outer surface 912 of housing sleeve 904 such that a substantially fluid-tight seal is formed therebetween. It will be appreciated that sealing elements 952 can be secured on, along or otherwise between such components in any suitable manner.

Gas spring devices, such as are used in suspension systems of vehicles, for example, generally designed to operate at a predetermined design pressure and a predetermined design height, as is well understood in the art. Additionally, such gas spring devices generally operate at a certain spring rate for a given load and corresponding design height or position of the gas spring. In some applications, a first spring rate may be preferred for most operating conditions with a second spring rate desired for certain other conditions of use. For example, it may be desirable for a gas spring of a suspension system of a vehicle to operate at a first spring rate during normal-to-moderately rough driving conditions but at a second, reduced spring rate upon experiencing harsh impacts, such as may be associated with incurring a discontinuity in the roadway surface (e.g., a pothole), for example. In many cases, a distinction can be made with respect to driving conditions as a function of the magnitude with which suspension system components are accelerated in a direction transverse to the direction of travel (e.g., downward toward or upward away from a road surface). Inertia-actuated valve assemblies in accordance with the subject matter of the present disclosure can be used in connection with gas spring assemblies, gas spring and damper assemblies and/or gas spring and gas damper assemblies to provide dual spring rate functionality for high-acceleration events while retaining otherwise conventional performance characteristics that may be desirable under normal-to-moderate driving conditions. As a non-limiting example, high-acceleration events can include displacements in a generally vertical direction that occur at an acceleration of greater than at least approximately 2.5 times the nominal acceleration due to gravity (i.e., 32.2 feet per second squared). In some cases, a high-acceleration threshold value of greater than at least approximately 3 times the nominal acceleration due to gravity can be used.

As shown in FIGS. 29-33, an inertia-actuated valve assembly 1000 in accordance with the subject matter of the present disclosure can be operatively disposed between a spring chamber (e.g., spring chambers 202 of gas spring assemblies GS1 and/or GS2) and another gas volume (e.g., damping chambers 502 and/or 902 respectively of gas damper assemblies GD1 and GD2). It will be appreciated that an inertia-actuated valve assembly in accordance with the subject matter of the present disclosure can be operatively disposed between any two of the foregoing and/or other gas chambers in any suitable manner. For example, an inertia-actuated valve assembly in accordance with the subject matter of the present disclosure could be formed as a part one or more walls and/or wall portions of one of end members 400 and/or 800, for example. For example, one of the walls or wall portions of the end member could at least partially form a valve housing or other component of an inertia-actuated valve. In the alternative, an inertia-actuated valve assembly in accordance with the subject matter of the present disclosure could be provided separately, and operatively disposed on or along one or more walls and/or wall portions of one of end members 400 and/or 800, for example. As a non-limiting example, the valve assembly could be secured on one of the end members in fluid communication between the spring and end member chambers.

During use, inertia-actuated valve assembly 1000 can be maintained in a normally-closed condition in a suitable manner, such as by way of one or more biasing elements acting thereon, for example. The valve assembly can open when the associated suspension system experiences an acceleration that meets or exceeds a predetermined acceleration threshold at or above which the inertia-actuated valve assembly is configured to open. More specifically, the acceleration acting on a corresponding valve mass generates an acceleration force that overcomes the force of the biasing element(s) that maintain the valve assembly in a normally-closed condition. As discussed above, such high-acceleration events can include acceleration values from at least approximately 2.5 times the nominal acceleration due to gravity to as much as approximately 15 times the acceleration due to gravity or more, and often induce or are otherwise coupled with large suspension movements. This is in comparison to relative to acceleration levels experienced by suspension system components during normal-to-moderately rough driving conditions, which commonly experience acceleration levels significantly less than 2 times the nominal acceleration due to gravity and undergo substantially smaller suspension movements.

An inertia-actuated valve assembly in accordance with the subject matter of the present disclosure will preferably have a high flow rate in the open condition to allow rapid transfer of gas from one chamber to another under high-acceleration conditions, such as have been described above. In particular, such inertia-actuated valve assemblies (e.g., valve assembly 1000) can be beneficial when used in connection with gas spring assemblies that have relatively high spring rates for large accelerations and/or movements as well as gas spring and gas damper assemblies that utilize elongated damping passages to generate pressurized gas damping. Non-limiting examples can include suspension system 100 and gas spring and gas damper assemblies AS1 and AS2. In some cases, an inertia-actuated valve assembly in accordance with the subject matter of the present disclosure could be used between an existing gas spring chamber and another volume, such as an existing end member or damping chamber, for example.

In some cases, gas spring and gas damper assemblies in accordance with the subject matter of the present disclosure can include one or more inertia-actuated valve assemblies (e.g., valve assembly 1000) as well as one or more elongated damping passages (e.g., passage 448). In some cases, such gas spring assemblies, gas spring and damper assemblies and/or gas spring and gas damper assemblies in accordance with the subject matter of the present disclosure can include one or more of a variety of other, optional features and/or components, such as guide rods, electronic sensors, electronic flow control devices and structural features (e.g., ribs and gussets). In some cases, an inertia-actuated valve assembly in accordance with the subject matter of the present disclosure can have an annular overall shape and/or configuration that can envelope one or more of the foregoing and/or other features. An inertia-actuated valve assembly in accordance with the subject matter of the present disclosure can also be operative to maximize or otherwise promote gas transfer through the valve assembly in an open condition as well as permit packaging of the foregoing and/or other features and/or components within or in operative association with the valve assembly.

One example of an inertia-actuated valve assembly 1000 in accordance with the subject matter of the present disclosure is shown in FIGS. 29-35. It will be appreciated that such inertia-actuated valves are, in an installed condition, disposed in fluid communication between two pressurized gas chambers. In the arrangement shown in FIG. 32-35, for example, inertia-actuated valve assembly 1000 is illustrated as being fluidically disposed between spring chamber 202 and end member or damping chambers 502/902. Additionally, as described above, valve assembly 1000 can, in some cases, be provided separate and apart from the other features and/or components of the associated gas spring device (e.g., separately from end members 400/800). In such cases, the inertia-actuated valve assembly can be secured on or along any one or more walls and/or wall portions of an associated end member or other gas spring component in any suitable manner. Additionally, in such cases, a valve assembly in accordance with the subject matter of the present disclosure can have an approximately annular shape and/or configuration that approximates an annular recess or opening of an end member into which the valve assembly can at least partially fit. In other cases, one or more features and/or components of inertia-actuated valve assembly 1000 can be formed in, on or otherwise as a part of one or more walls and/or wall portions of the associated end member. Whether provided as a separate component or as portion of an end member, valve assembly 1000 can include a valve housing and a valve body that is at least partially received within the valve housing. In representing both the construction in which the valve assembly is a separate component and the construction that is formed as a part of an associated end member, the valve housing is identified in FIGS. 29-35 by reference numbers that respectively represent valve housing 1002 as a separate component and valve housing 406 and 806 as portions of end member walls. For purposes of clarity and ease or reading, valve housing is referred to hereinafter in connection with item number 1002. However, it is to be recognized and appreciated that reference to valve housings 406 and/or 806 are equally applicable.

Valve assembly 1000 has a longitudinal axis AX, and valve housing 1002 extends peripherally about the longitudinal axis to an outer side surface portion 1004 that can, in some cases, at least partially define an outer peripheral extent of the inertia-actuated valve assembly, such as when provided as a separate component, for example. Valve housing 1002 can have an end surface portion 1006 disposed along a side 1008 of the valve assembly and an end surface portion 1010 disposed along a side 1012 of the valve assembly. Valve housing 1002 can also include one or more securement features 1014 disposed thereon or therealong, such as one or more helical threads, for example. Valve housing 1002 can further include a groove 1016 that extends into the valve housing from along side 1012 such that the groove has an open end 1018 disposed along end surface portion 1010. In some cases, the groove can have extend only part way around the periphery of longitudinal axis AX such that the groove will have opposing groove ends. In other cases, groove 1016 can take the form of an endless, annular groove that extends peripherally about axis AX. Additionally, it will be appreciated that groove 1016 can have any suitable cross-sectional shape, profile and/or configuration. For example, groove 1016 can be at least partially defined by a cross-sectional profile that includes one or more side surface portions, such as side surface portions 1020A and 1020B, for example, that extend into the valve housing from along open end 1018. Groove 1016 can also be at least partially defined by a cross-sectional profile that includes one or more end surface portions 1022, 1024 and/or 1026, for example, that can, in some cases, be disposed in axially-offset relation to one another and at least partially define one or more shoulder wall portions (not numbered) of valve housing within groove 1016.

Inertia-actuated valve assemblies in accordance with the subject matter of the present disclosure, such as valve assembly 1000, for example, can include one or more passages disposed in fluid communication with groove 1016. In the arrangement shown in FIGS. 29-35, for example, one or more passages 1028 can extend into valve housing 1002 from along side 1008. As a non-limiting example, the one or more passages can be disposed or otherwise extend peripherally around axis AX and can, in some cases, be the size, shape and/or configuration of one or more elongated, arcuate slots. If a plurality of passages 1028 are included, the passages can be disposed in peripherally-spaced relation to one another about axis AX. Passages 1028 can extend into valve housing 1002 from along end surface portion 1006 into fluid communication with groove 1016. In this manner, a fluid communication pathway or flow path can extend through inertia-actuated valve assembly 1000 in an open condition thereof, such as is represented by arrow PTH in FIGS. 34 and 35, for example. Passages 1028 can be of any suitable size, shape and/or configuration, and can have any suitable cross-sectional shape, profile and/or configuration. For example, the one or more passages can be at least partially defined by a cross-sectional profile that includes one or more side surface portions 1030A and 1030B that extend from along an open end 1032 disposed along side 1008 toward an end surface portion 1034. In some cases, the one or more side surfaces portions and/or end surface portion can at least partially define one or more shoulder wall portions (not numbered) of valve housing within groove 1016.

As described above, inertia-actuated valve assemblies in accordance with the subject matter of the present disclosure (e.g., valve assemblies 1000) can be used in connection with gas spring assemblies, gas spring and damper assemblies and/or gas spring and gas damper assemblies. In the case of gas spring and gas damper assemblies, inertia-actuated valve assemblies in accordance with the subject matter of the present disclosure can, optionally, include one or more elongated damping passages such as may be operative to generate pressurized gas damping as pressurized gas flows through the inertia-actuated valve assembly between a spring chamber (e.g., spring chamber 202) and an associated second chamber (e.g., end member or damping chamber 502/902). If provided, an elongated damping passage 1036 can extend into, through or otherwise along at least a portion of valve housing 1002 of valve assembly 1000. In a preferred arrangement, however, the elongated damping passage, if provided, can extend into, through or otherwise along the valve housing in fluidic isolation from fluid communication pathway The elongated damping passage can have a first end 1038 disposed in fluid communication with spring chamber 202 and a second end 1040 disposed in fluid communication with an associated second chamber, such as one of end member or damping chambers 502/902, for example. In a preferred arrangement, the valve housing will have a maximum cross-sectional dimension (e.g., an outermost diameter), and the elongated damping passage extending therethrough will have a passage length that is greater than the maximum cross-sectional dimension of the valve housing.

Additionally, it will be appreciated that elongated damping passage 1036 can be of any suitable shape, form, configuration and/or arrangement. In some cases, elongated damping passage 1036 can have a spiral-like or similar configuration. In such cases, the elongated damping passage can be at least partially formed by a passage surface 1042 that has a cross-sectional profile. In some cases, the cross-sectional profile can vary along the length of the elongated damping passage. In other cases, however, the cross-sectional profile can be of an approximately uniform size, shape and configuration along the length of the elongated damping passage, such as is shown in FIGS. 7-10, 16-18 and 32-35, for example. The cross-sectional profile is taken from an orientation that is normal, perpendicular or at least transverse to the spiral-like path of the elongated damping passage. That is, the cross-sectional profile is oriented transverse to axis AX and is substantially-continuously rotated about the axis with the cross-sectional profile substantially-continuously displaced radially outward from adjacent axis AX to form the spiral-like configuration. In a preferred arrangement, such rotation of the cross-sectional profile of passage surface 1042 can occur in an approximately single plane such that the spiral-like configuration of elongated damping passage 1036 is disposed in a common plane that is oriented transverse to longitudinal axis AX.

In some cases, the cross-sectional profile of passage surface 1042 can be endless or otherwise fully enclosed (e.g., within valve housing 1002 and/or a portion of end member walls 406/806). In such cases, the corresponding elongated damping passage can be substantially-entirely embedded within the valve housing and/or the portion of the end member wall. In other cases, the cross-sectional profile of passage surface 1042 can be open (i.e., not fully enclosed). In such cases, the corresponding elongated damping passage can be open along one or more surfaces of valve housing 1002. For example, valve housing 1002 can, optionally, include an end surface portion 1044 disposed along side 1008 in offset relation to end surface portion 1006 such that a recess is formed along side 1008 of the valve housing. As a non-limiting example, the cross-sectional profile of passage surface 1042 is shown as having an approximately U-shaped cross-sectional configuration. As such, elongated damping passage 1036 is formed as an open channel that is accessible from along end surface portion 1044. It will be appreciated, however, that other configurations and/or arrangements could alternately be used. For example, a cross-sectional profile having semi-circular, V-shaped and/or C-shaped configurations could alternately be used. In cases in which the cross-sectional profile of elongated damping passage 1036 is open or otherwise not fully enclosed, an end or cover plate 1046 can extend across end surface portion 1044 to at least partially enclose elongated damping passage 1036. In such cases, an opening 1048 can be provided in cover plate 1046 such that first end 1038 of the elongated damping passage can be disposed in fluid communication with spring chamber 202 through opening 1048. In some cases, a port or passage 1050 can, optionally, extend through valve housing 1002 such that fluid communication between a spring chamber (e.g., spring chamber 202) and an associated second chamber (e.g., end member or damping chamber 502/902) can occur therethrough. In a preferred arrangement, elongated damping passage 1036, if provided, and/or passage 1050, if provided, are fluidically isolated from fluid communication pathway PTH that is at least partially formed by groove 1016 and passages 1028. That is, elongated damping passage 1036, if provided, and/or passage 1050, if provided, are disposed in fluid communication between spring chamber 202 and end member or damping chamber 502/902 even in a closed condition of valve assembly 1000.

An inertia-actuated valve assembly in accordance with the subject matter of the present disclosure, such as valve assembly 1000, for example, can include one or more valve bodies that are displaceable relative to the valve housing. During use, the valve body is biased into and retained in a position that results in the valve assembly being closed such that the associated spring chamber (e.g., spring chamber 202) and the associated second chamber (e.g., end member or damping chamber 502/902) are substantially isolated from one another by the valve body (e.g., through fluid communication pathway PTH). It will be appreciated, however, that other fluid communication channels, such as one or more of elongated damping passage 1036 and/or passage 1050, and remain in fluid communication between the associated spring and second chambers. It will be recognized and understood that the valve body will have a valve body mass, and that when acted upon by certain acceleration events having a magnitude below a predetermined threshold the valve body will have a tendency to move with the valve housing with the inertia-actuated valve assembly remaining in the normally-closed condition. However, when acted upon by acceleration events approximately equal to or exceeding a predetermined threshold that generates a valve body force of sufficient magnitude to overcome the biasing force urging the valve body into the normally-closed position the valve body will have a tendency to remain in an unchanged position due at least in part to its inertia. Upon a valve body force (i.e., valve body mass multiplied by magnitude of acceleration event) achieving sufficient magnitude to overcome the biasing force retaining the valve body in the normally-closed condition, the valve body will have a tendency to remain in its original position while the valve housing undergoes movement due to the acceleration event. This relative displacement results in the opening of a flow path (e.g., fluid communication pathway PTH) through the inertia-actuated valve assembly. Upon opening, pressurized gas can flow from a chamber undergoing compression (e.g., spring chamber 202) into a chamber undergoing expansion or of fixed volume (e.g., end member or damping chamber 502/902). Upon abatement of the acceleration event or a decrease in acceleration below the predetermined threshold, the biasing force will overcome the valve body force and the valve body will return to a normally-closed position.

It will be appreciated that the valve body can be of any suitable size, shape and/or configuration that is cooperative with the valve housing and/or the groove thereof. As such, the valve body can extend at least partially around axis AX within at least a portion of the groove. As one example, valve assembly 1000 can include a valve body 1052 that is dimensioned to be at least partially received within valve housing 1002, such as at least partially within groove 1016 thereof, for example. Valve body 1052 can include an end surface portion 1054 and an end surface portion 1056 that is spaced axially from end surface portion 1054. Valve body 1052 can also include a side surface portion 1058 that can at least partially define an inner peripheral extent of the valve body, as well as a side surface portion 1060 that can at least partially define an outer peripheral extend of the valve body. In some cases, the valve body can, optionally, include a side surface portion 1062 that is disposed radially between side surface portions 1058 and 1060. In such cases, an end surface portion 1064 can be disposed in offset relation to end surface portions 1054 and 1056. End surface portion 1064 can extend between and operatively connect side surface portion 1062 with one of side surface portions 1058 and 1060.

As described above, it is preferred for a valve assembly in accordance with the subject matter of the present disclosure to be primarily actuated or otherwise displaced from inertia of the valve body rather than as a result of differential pressure levels acting on opposing surfaces of the valve body. For example, it will be appreciated that during an acceleration event in which the associated gas spring is undergoing a compression (i.e., a jounce condition), pressurized gas within spring chamber 202 will experience a dynamic pressure increase due to a decrease in volume of the spring chamber as the opposing end members are displaced toward one another. Whereas, end member or damping chambers 502/902 are constructed to have a substantially fixed volume which remains substantially unchanged during such jounce motion. As such, a dynamic pressure increase can be generated in spring chamber 202 resulting in a differential pressure level between the spring chamber and end member or damping chamber 502/902. It will be appreciated that the differential-pressure force acting on the valve body at any given time will be a function of the differential pressure and the area of the valve body on which the differential pressure acts to cause displacement in the axial direction. Such area of the valve body is referred to herein as the "pressure area", and includes one or more surface portions oriented transverse to longitudinal axis AX, and it will be appreciated that it is generally desirable to minimize or at least reduce the "pressure area" to allow the valve body to remain closed while experiencing large differential pressure levels.

As described above, valve assembly 1000 substantially inhibits pressurized gas transfer through at least fluid communication pathway PTH in a closed position of valve body 1052. In some cases, one or more sealing interfaces can be fluidically disposed between valve housing 1002 and valve body 1052 at least in the closed position of the valve body. Valve assembly 1000 can include sealing interfaces 1066 and 1068 that are fluidically disposed between the valve housing and the valve body, such as along and/or otherwise between one or more end surface portions and/or side surface portions of valve housing 1002 and valve body 1052. In the exemplary arrangement shown in FIGS. 32-35, sealing interface 1066 can include a sealing element 1070 disposed in abutting engagement between any combination of two or more of side surface portions 1020A, 1030A and/or 1058 and/or end surface portions 1022, 1044 and/or 1054 in a closed position of valve body 1052. Additionally, or in the alternative, sealing interface 1068 can include a sealing element 1072 disposed in abutting engagement between any combination of two or more of side surface portions 1020B, 1030B, 1060 and/or 1062 and/or end surface portions 1026, 1034, 1056 and/or 1064 in a closed position of valve body 1052. In some cases, one or more sealing elements can be overmolded or otherwise formed or provided on or along the valve housing to at least partially form the first and second sealing interfaces. Additionally, or in the alternative, one or more sealing elements could be overmolded or otherwise formed or provided on or along the valve body. In still other cases, one or more of the sealing elements can be provided separately from the valve housing and the valve body and disposed on or along one of the valve housing and valve body and/or otherwise positioned and retained within the groove.

Figure 32:
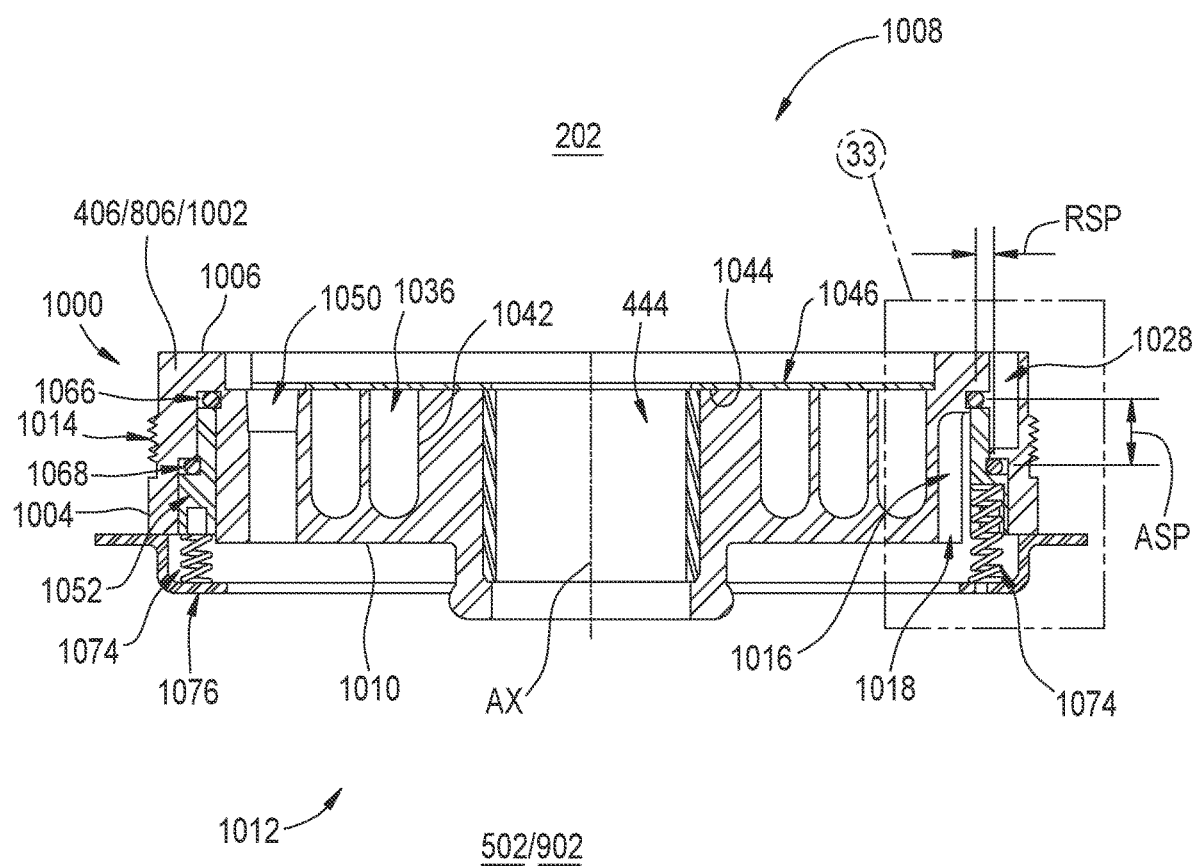
FIG. 32 is a cross-sectional side view of the exemplary valve assembly in FIGS. 29-31 taken from along line 32-32 in FIG. 31 and shown in a closed condition.
Figure 33:
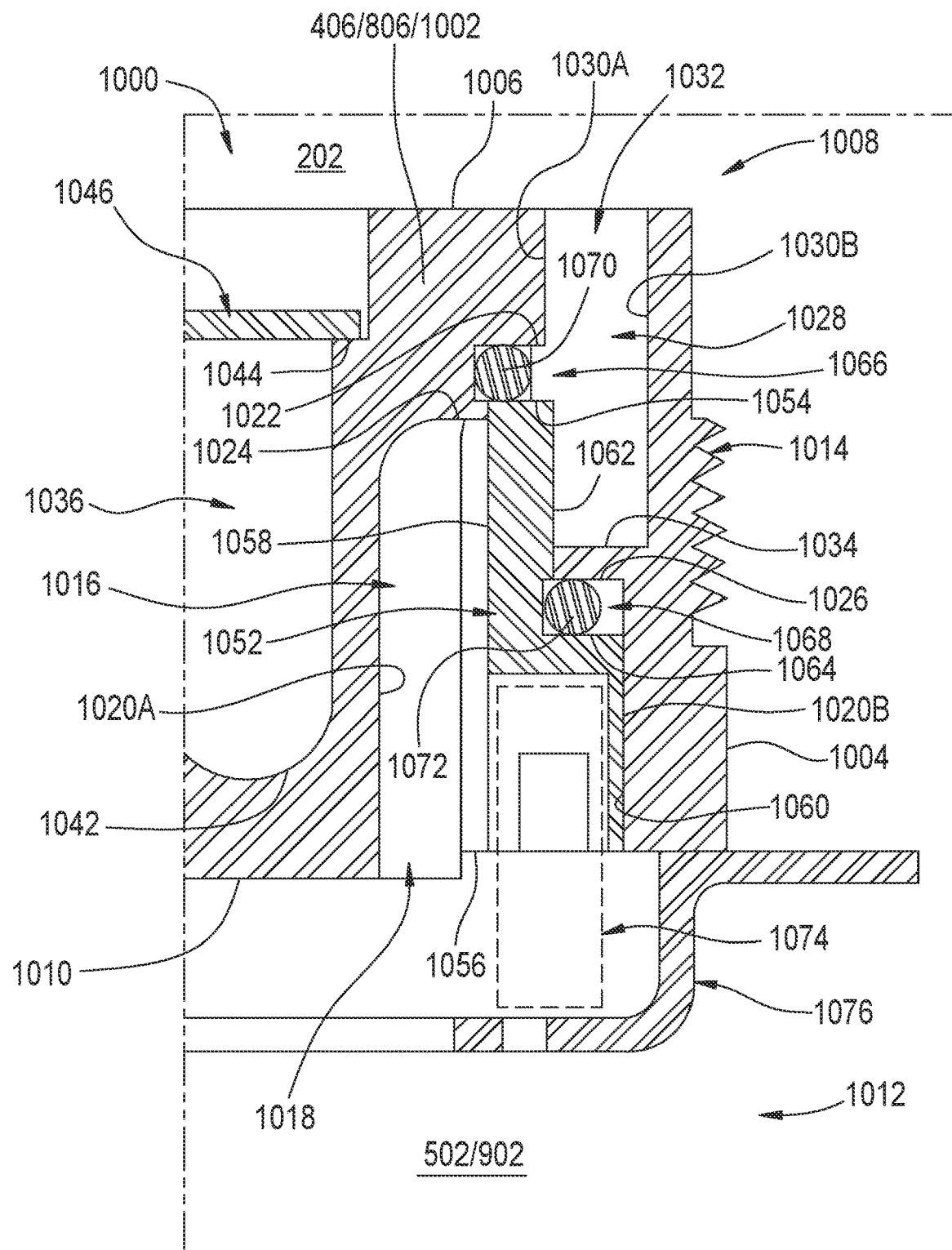
FIG. 33 is an enlarged view of the portion of the exemplary valve assembly in FIGS. 29-32 identified as Detail 33 in FIG. 32.
Figure 34:
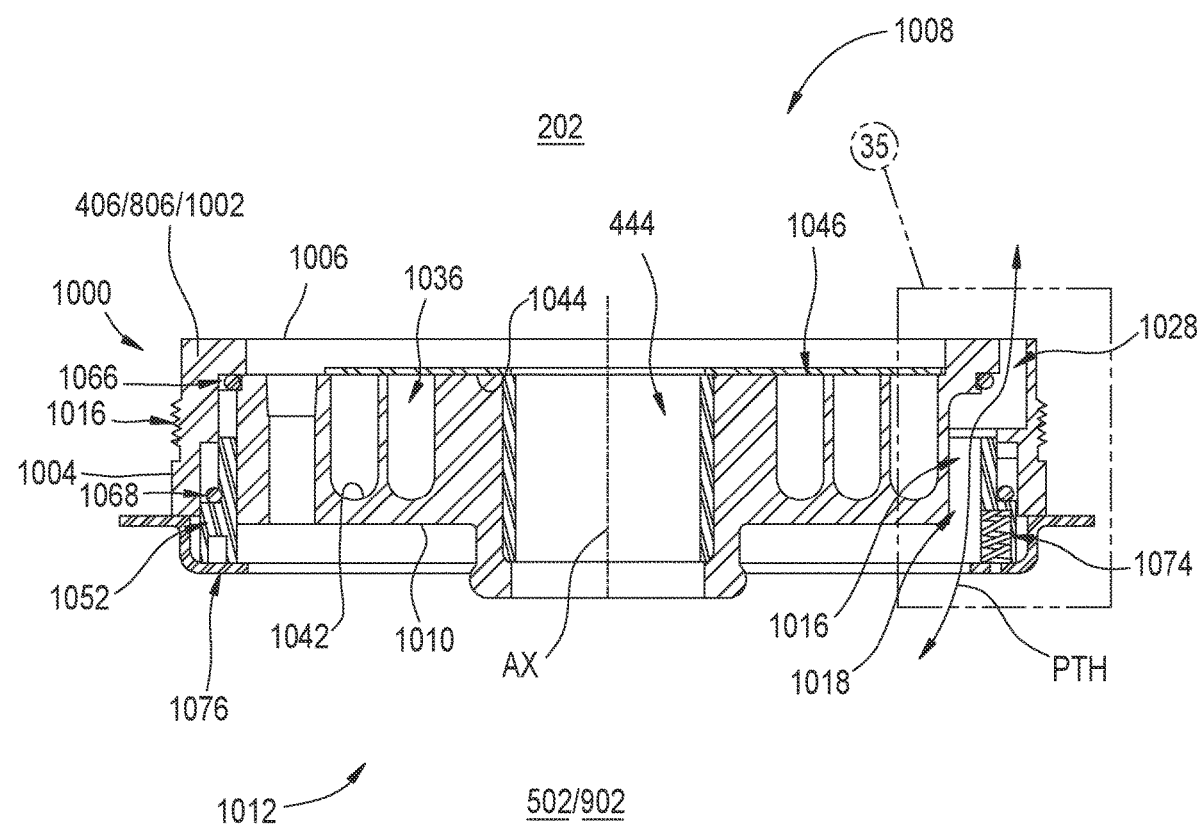
FIG. 34 is the cross-sectional side view of the exemplary valve assembly in FIG. 32 shown in an open condition.
Figure 35:
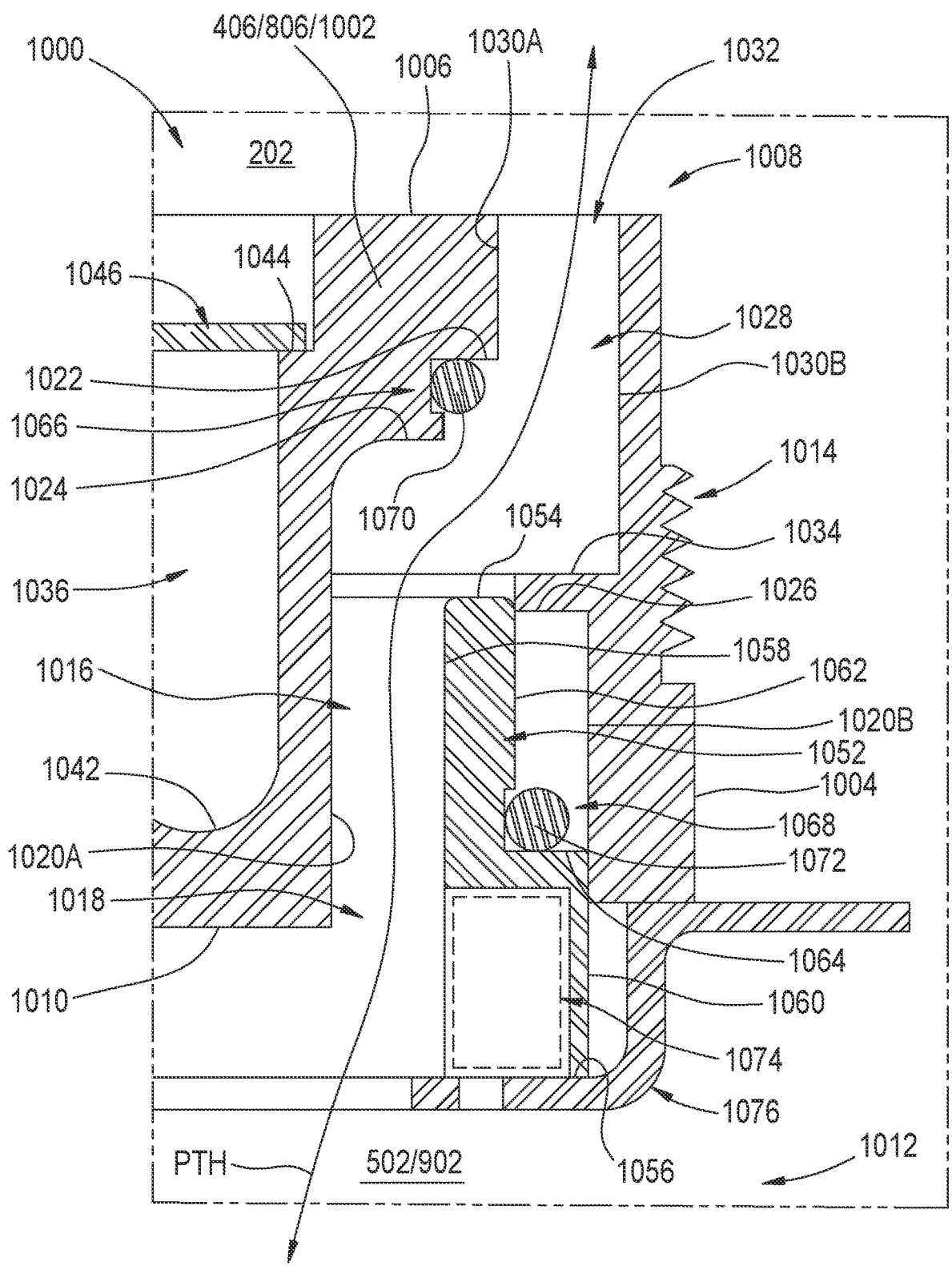
FIG. 35 is an enlarged view of the portion of the exemplary valve assembly in the open condition identified as Detail 35 in FIG. 34.

Sealing interfaces 1066 and 1068 can be disposed in axially-spaced and/or radially-spaced relation to one another, such as are represented by reference dimensions ASP and RSP in FIG. 32, for example. In some cases, a radial spacing or distance between the two sealing interfaces can be used to at least approximate the exposed area of the valve body that is oriented transverse (e.g., perpendicular) to the path of motion of valve body 1052 (i.e., in the axial direction) and which would be operative to contribute to undesirable condition of dynamic pressure-actuation of the valve assembly. As such, it will be appreciated that it is generally desirable to minimize or at least reduces this exposed area such that undesired actuation from dynamic pressure fluctuations can be minimized or at least reduced, such as may be experienced during use in normal-to-moderately rough driving conditions and having a level below a predetermined dynamic pressure threshold. In the arrangement shown in FIGS. 32-35, the total "pressure area" of valve body 1052 can include the area of end surface portion 1054 that is disposed radially outward of sealing element 1070 and the area of end surface portion 1064 that is disposed radially inward of sealing element 1072.

As described above, an inertia-actuated valve assembly in accordance with the subject matter of the present disclosure (e.g., valve assembly 1000) will preferably remain closed under certain predetermined conditions of use, such as under normal-to-moderately rough driving conditions, and will be induced to open upon experiencing acceleration events having a magnitude greater than a predetermined acceleration threshold. It will be appreciated that the dynamic pressure level within a gas chamber that is undergoing compression (e.g., spring chamber 202) during such a high-acceleration event will increase substantially. As such, it is desirable for an inertia-actuated valve assembly (e.g., valve assembly 1000) to have a flow path (e.g., fluid communication pathway PTH) that is as large as is practical in an open condition of the valve assembly to permit pressurized gas to transfer out of the gas chamber undergoing compression at a high flow rate. It will be appreciated that the minimum area through which pressurized gas can flow through the valve assembly is referred to herein as the "flow area". As one non-limiting example, the "flow area" of valve assembly 1000 can include the area between end surface portion 1022 of valve housing 1002 and end surface portion 1054 of valve body 1052. It is generally desirable to minimize "pressure area" while utilizing a "flow area" that is as large as is practical. It has been determined that an inertia-actuated valve assembly in accordance with the subject matter of the present disclosure can have a flow area-to-pressure area ratio that is within a range of from approximately one-half (0.5) to approximately four (4). In some cases, a range of approximately three-fourths (0.75) to approximately three (3) can be used.

As discussed above, valve body 1052 is urged into and maintained in a normally-closed position of valve assembly 1000. It will be appreciated that any suitable combination of one or more biasing elements can be used to urge and maintain the valve body into the normally-closed position while permitting the valve body to be displaced into an open position upon experiencing acceleration events equal to or exceeding a predetermined acceleration threshold. In the exemplary arrangement shown in FIGS. 32-35, one or more biasing element 1074 can be operatively engaged with valve body 1052 for urging the valve body toward and maintaining valve assembly 1000 in a normally-closed condition. Biasing elements 1074 can have spring rates that are tuned to the mass of valve body 1052 to allow the valve assembly to open when experiencing an acceleration event that has a magnitude approximately reaching (and/or exceeding) a predetermined acceleration threshold. That is, in a preferred arrangement, the one or more biasing elements can generate a biasing force (i.e., at least approximately equal to the sum of individual biasing forces from a plurality of biasing elements) acting on the valve body that has a magnitude that is greater than a predetermined dynamic gas pressure threshold value multiplied by the pressure area of the valve body, such as has been described above, for example. As described above, the predetermined dynamic gas pressure threshold value can correspond to an internal pressure experienced by the associated gas spring assembly during a predetermined condition of use, such as a dynamic pressure spike during a high-acceleration jounce condition, for example. The one or more biasing elements can also generate a (cumulative or total) biasing force acting on the valve body that has a magnitude that is less than or approximately equal to the valve body mass multiplied by two and one half (2.5) times the nominal acceleration due to gravity.

It will be appreciated that any combination of one or more biasing elements of any suitable type, kind and/or construction can be used, such as one or more coil spring elements, one or more wave spring elements, one or more conical disc spring elements and/or one or more solid elastomeric spring elements, for example. It will be appreciated, however, that biasing elements of other types, kinds and/or constructions could alternately be used. In the arrangement shown in FIGS. 32-35, an array of biasing elements are disposed in spaced relation to one another about longitudinal axis AX of the valve assembly. Additionally, it will be appreciated that biasing elements 1074 can be retained in operative engagement with valve body 1052 in any suitable manner, such as by way of engagement between valve body 1052 and a spring retainer plate 1076, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An inertia-actuated valve assembly dimensioned for securement along an associated end member of an associated gas spring assembly, said inertia-actuated valve assembly comprising:

a valve housing dimensioned for securement along the associated end member and in fixed relation thereto, said valve housing having a longitudinal axis and a maximum cross-sectional dimension, said valve housing including a housing wall portion extending peripherally about said longitudinal axis with a first housing side and a second housing side facing opposite said first housing side, said valve housing including a groove extending into housing wall portion from along said second side such that said groove has an open end fluidically accessible from along said second side, said valve housing including at least one flow channel extending through said housing wall portion in fluid communication with said groove from along said first side of said valve housing, and said valve housing including an elongated damping passage extending therethrough in fluid communication between said first and second sides in fluid isolation from said groove, said elongated damping passage having a passage length greater than said maximum cross-sectional dimension of said valve housing;

a valve body extending peripherally about said axis and positioned within said groove of said valve housing such that said valve body and said valve housing are axially co-extensive along at least a portion thereof, said valve body having a valve body mass and a pressure area; and, a biasing element operatively engaging at least said valve body and generating a biasing force operative to urge said valve body in a first axial direction toward said first side of said valve housing, said biasing force having a magnitude that is:

1) greater than a predetermined dynamic gas pressure threshold value multiplied by said pressure area with said predetermined dynamic gas pressure threshold value corresponding to an internal pressure experienced by the associated gas spring assembly during a predetermined condition of use; and, 2) less than or approximately equal to said valve body mass multiplied by two and one half (2.5) times the nominal acceleration due to gravity.

2. An inertia-actuated valve assembly according to claim 1, wherein said valve body is axially displaceable relative to said valve housing between a closed position and an open position such that in said open position said valve assembly has a flow area through which pressurized gas flows with a flow area-to-pressure area ratio within a range of from approximately one-half (0.5) to approximately four (4).

3. An inertia-actuated valve assembly according to claim 2, wherein said flow area-to-pressure area ratio is within a range of from approximately three-quarters (0.75) to approximately three (3).

4. An inertia-actuated valve assembly according to claim 1, wherein said groove is an annular groove, and said valve body has an annular shape dimensioned to be at least partially received within said annular groove.

5. An inertia-actuated valve assembly according to claim 1, wherein said biasing element is one of a plurality of biasing elements disposed in peripherally-spaced relation to one another about said longitudinal axis with said biasing force being at least approximately equal to the sum of individual biasing forces from said plurality of biasing elements.

6. An inertia-actuated valve assembly according to claim 1 further comprising a spring retainer plate disposed along said second side of said valve housing and operatively supporting said biasing element in abutting engagement with said valve body.

7. An inertia-actuated valve assembly according to claim 2, wherein in said closed position said valve body extends across said at least one flow channel to at least partially form a substantially fluid-tight seal thereacross with said elongated damping passage remaining in fluid communication between said first housing side and said second housing side of said valve housing, and in said open position said first housing side and said second housing side of said valve housing are disposed in fluid communication with one another through said at least one flow channel with said elongated damping passage remaining in fluid communication between said first housing side and said second housing side of said valve housing.

8. An inertia-actuated valve assembly according to claim 1, wherein said elongated damping passage has a spiral configuration with a first passage end disposed along said first side of said valve housing and a second passage end disposed along said second side of said valve housing.

9. An inertia-actuated valve assembly dimensioned for securement along an associated end member of an associated gas spring assembly, said inertia-actuated valve assembly comprising:

a valve housing dimensioned for securement in a fixed position along the associated end member, said valve housing having a longitudinal axis and including a valve housing wall portion extending peripherally about said longitudinal axis with a first housing side and a second housing side opposite said first housing side, said valve housing wall portion including a groove extending axially thereinto and at least one flow channel operatively connected in fluid communication with said groove, and said valve housing wall portion including an elongated damping passage extending therethrough in fluid communication between said first housing side and said second housing side separate from said at least one flow channel with said elongated damping passages disposed radially inward of said groove and said at least one flow channel;

a valve body extending peripherally about said axis and positioned within said groove of said valve housing wall portion such that said valve body and said valve housing wall portion are axially co-extensive along at least a portion thereof, said valve body axially displaceable between:

a first position in which said valve body extends across said at least one flow channel to at least partially form a substantially fluid-tight seal thereacross with said elongated damping passage remaining in fluid communication between said first housing side and said second housing side of said valve housing; and, a second position in which said first housing side and said second housing side of said valve housing are disposed in fluid communication with one another through said at least one flow channel with said elongated damping passage remaining in fluid communication between said first housing side and said second housing side of said valve housing; and, a biasing element operatively engaging at least said valve body and generating a biasing force operative to urge said valve body in a first axial direction toward said first position.

10. An inertia-actuated valve assembly according to claim 9, wherein said valve housing wall portion has a maximum cross-sectional dimension and said elongated damping passage has a passage length greater than said maximum cross-sectional dimension of said valve housing.

11. An inertia-actuated valve assembly according to claim 9, wherein said elongated damping passage has a spiral configuration with a first passage end disposed along said first housing side of said valve housing wall portion and a second passage end disposed along said second housing side of said valve housing wall portion.

12. An inertia-actuated valve assembly according to claim 9, wherein said at least one flow channel includes a plurality of flow channels disposed in peripherally-spaced relation to one another about said longitudinal axis.

13. An inertia-actuated valve assembly according to claim 9, wherein said elongated damping passage has a cross-sectional profile forming an open channel along said first housing side of said valve housing.

14. An inertia-actuated valve assembly according to claim 13, wherein said cross-sectional profile of said elongated damping passage has one of an approximately semi-circular configuration, an approximately U-shaped configuration, an approximately V-shaped configuration and an approximately C-shaped configuration.

15. An inertia-actuated valve assembly according to claim 13 further comprising a cover plate extending across at least a portion of said open channel to at least partially enclose said elongated damping passage.

16. An inertia-actuated valve assembly dimensioned for securement along an associated end member of an associated gas spring assembly, said inertia-actuated valve assembly comprising:
a valve housing dimensioned for securement in a fixed position along the associated end member, said valve housing having a longitudinal axis and including a housing wall portion extending peripherally about said longitudinal axis with a first housing side and a second housing side opposite said first housing side, said valve housing including a groove extending into said housing wall portion from along said second side such that said groove has an open end fluidically accessible from along said second side, said valve housing including at least one flow channel extending through said housing wall portion and in fluid communication with said groove from along said first side of said valve housing, and said housing wall portion including an elongated damping passage extending therethrough in fluid communication between said first housing side and said second housing side of said valve housing;
a valve body extending peripherally about said axis and positioned within said groove of said valve housing such that said valve body and said valve housing are axially co-extensive along at least a portion thereof, said valve body having a valve body mass and a pressure area, and said valve body axially displaceable between:
a first position in which said valve body extends across said at least one flow channel to at least partially form a substantially fluid-tight seal thereacross with said elongated damping passage remaining in fluid communication between said first housing side and said second housing side of said valve housing; and,
a second position in which said first housing side and said second housing side of said valve housing are disposed in fluid communication with one another through said at least one flow channel with said elongated damping passage remaining in fluid communication between said first housing side and said second housing side of said valve housing; and,
a biasing element operatively engaging at least said valve body and generating a biasing force operative to urge said valve body in a first axial direction toward said first side of said valve housing, said biasing force having a magnitude that is:
1) greater than a predetermined dynamic gas pressure threshold value multiplied by said pressure area with said predetermined dynamic gas pressure threshold value corresponding to an internal pressure experienced by the associated gas spring assembly during a predetermined condition of use; and,
2) less than or approximately equal to said valve body mass multiplied by two and one half (2.5) times the nominal acceleration due to gravity.

17. An inertia-actuated valve assembly according to claim 16, wherein said predetermined dynamic pressure threshold value is within a range of from approximately one and one-tenth (1.1) times to approximately two and one-quarter (2.25) times a predetermined design pressure of the associated gas spring assembly.

18. An inertia-actuated valve assembly according to claim 16 further comprising a sealing interface disposed between said housing wall portion and said valve body such that a substantially fluid-tight seal is formed therebetween in a closed condition of said valve assembly corresponding to said first position of said valve body.

19. An inertia-actuated valve assembly according to claim 18, wherein said housing wall portion includes a first end surface portion and a first side surface portion, and said valve body includes a second end surface portion and a second side surface portion respectively disposed in facing relation to said first end surface portion and said first side surface portion with said sealing interface including a sealing element disposed in abutting engagement with at least said first and second end surface portions or at least said first and second side surface portions in said closed condition of said valve assembly corresponding to said first position of said valve body.

20. An inertia-actuated valve assembly according to claim 16, wherein said housing wall portion of said valve housing has a maximum cross-sectional dimension and said elongated damping passage has a passage length substantially greater than said maximum cross-sectional dimension of said valve housing.

\* \* \* \* \*